US012685320B2

(12) United States Patent
Buschmann et al.

(10) Patent No.: US 12,685,320 B2
(45) Date of Patent: *Jul. 21, 2026

(54) FOOD PROCESSING OXIDATION TREATMENT FORUMLATIONS AND METHODS

(71) Applicant: Clean Chemistry, Inc., Longmont, CO (US)

(72) Inventors: Wayne E. Buschmann, Boulder, CO (US); Carl R. Evenson, Erie, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/221,058

(22) Filed: May 28, 2025

(65) Prior Publication Data

US 2025/0287966 A1 Sep. 18, 2025

Related U.S. Application Data

(63) Continuation of application No. PCT/US2024/029850, filed on May 17, 2024.

(Continued)

(51) Int. Cl.
*A23B 7/154* (2006.01)
*A01N 37/02* (2006.01)
(Continued)

(52) U.S. Cl.
CPC .............. *A23B 7/154* (2013.01); *A01N 37/02* (2013.01); *A01N 59/00* (2013.01); *A01P 1/00* (2021.08);
(Continued)

(58) Field of Classification Search
CPC .. A23B 7/154; A23B 4/20; A23B 4/24; A23B 7/06; A23B 7/157; A23L 5/57; A01P 1/00; A01N 37/02; A01N 59/00
(Continued)

(56) References Cited

U.S. PATENT DOCUMENTS

| | | | |
|---|---|---|---|
| 3,719,552 A | 3/1973 | Farley | |
| 3,925,234 A | 12/1975 | Hachmann et al. | |

(Continued)

FOREIGN PATENT DOCUMENTS

| | | |
|---|---|---|
| CN | 1142555 A | 2/1997 |
| CN | 102007230 A | 4/2011 |

(Continued)

OTHER PUBLICATIONS

Coyle et al.; "Peracetic Acid as an Alternative Disinfection Technology for Wet Weather Flows"; Water Environment Research; Aug. 2014; pp. 687-697.

(Continued)

*Primary Examiner* — Brent T O'Hern

(74) *Attorney, Agent, or Firm* — Holzer Patel Drennan

(57) ABSTRACT

A method for oxidation of substrates uses peracid salt compositions prepared from acyl donor, hydrogen peroxide and alkali metal hydroxide under controlled conditions to provide nonequilibrium compositions at high product yield from input feedstocks, and which are surprisingly stable prior to use. Substrates to be oxidized are contacted with a nonequilibrium treatment composition comprising such a nonequilibrium composition or a nonequilibrium adjusted composition prepared by adding one or more additives to the nonequilibrium composition prior to contacting the substrate, wherein the substrates are associated with food processing.

30 Claims, 1 Drawing Sheet

Related U.S. Application Data

(60) Provisional application No. 63/468,729, filed on May 24, 2023, provisional application No. 63/467,272, filed on May 17, 2023, provisional application No. 63/467,270, filed on May 17, 2023.

(51) Int. Cl.

| | |
|---|---|
| *A01N 59/00* | (2006.01) |
| *A01P 1/00* | (2006.01) |
| *A23B 4/20* | (2006.01) |
| *A23B 4/24* | (2006.01) |
| *A23B 7/06* | (2006.01) |
| *A23B 7/157* | (2006.01) |
| *A23L 5/00* | (2016.01) |

(52) U.S. Cl.
CPC .................. *A23B 4/20* (2013.01); *A23B 4/24* (2013.01); *A23B 7/06* (2013.01); *A23B 7/157* (2013.01); *A23L 5/57* (2016.08)

(58) Field of Classification Search
USPC ........................................................ 426/335
See application file for complete search history.

(56) References Cited

U.S. PATENT DOCUMENTS

| | | | |
|---|---|---|---|
| 4,013,575 | A | 3/1977 | Castrantas et al. |
| 4,026,798 | A | 5/1977 | Castrantas et al. |
| 4,055,505 | A | 10/1977 | Gray |
| 4,076,621 | A | 2/1978 | Hardison |
| 4,348,256 | A | 9/1982 | Bergstrom, Jr. et al. |
| 4,393,037 | A | 7/1983 | Delaney |
| 4,576,609 | A | 3/1986 | Hageman |
| 4,673,473 | A | 6/1987 | Ang |
| 4,722,773 | A | 2/1988 | Plowman et al. |
| 4,872,953 | A | 10/1989 | Smith |
| 4,952,276 | A | 8/1990 | Gidlund |
| 4,966,706 | A | 10/1990 | Gregor |
| 5,053,142 | A | 10/1991 | Sorensen et al. |
| 5,246,543 | A | 9/1993 | Meier et al. |
| 5,387,317 | A | 2/1995 | Parthasarathy et al. |
| 5,424,032 | A | 6/1995 | Christensen et al. |
| 5,431,781 | A | 7/1995 | Walsh |
| 5,472,619 | A | 12/1995 | Holzhauer et al. |
| 5,494,588 | A | 2/1996 | LaZonby |
| 5,565,073 | A | 10/1996 | Fraser et al. |
| 5,624,575 | A | 4/1997 | Meade et al. |
| 5,683,724 | A | 11/1997 | Hei et al. |
| 5,770,035 | A | 6/1998 | Faita |
| 5,785,812 | A | 7/1998 | Linsten et al. |
| 5,817,240 | A | 10/1998 | Miller et al. |
| 6,007,678 | A | 12/1999 | Linsten et al. |
| 6,015,536 | A | 1/2000 | Lokkesmoe et al. |
| 6,126,782 | A | 10/2000 | Liden et al. |
| 6,183,623 | B1 | 2/2001 | Cisar et al. |
| 6,258,207 | B1 | 7/2001 | Pan |
| 6,294,047 | B1 | 9/2001 | Chakar et al. |
| 6,387,238 | B1 | 5/2002 | Merk et al. |
| 6,569,286 | B1 | 5/2003 | Withenshaw et al. |
| 6,712,949 | B2 | 3/2004 | Gopal |
| 7,919,122 | B2 | 4/2011 | Okano et al. |
| 8,318,972 | B2 | 11/2012 | Buschmann et al. |
| 8,546,449 | B2 | 10/2013 | Harvey et al. |
| 9,363,997 | B2 | 6/2016 | Harvey et al. |
| 9,370,180 | B2 | 6/2016 | Harvey et al. |
| 9,517,955 | B2 | 12/2016 | Buschmann |
| 9,517,956 | B2 | 12/2016 | Buschmann |
| 9,551,076 | B2 | 1/2017 | Buschmann |
| 9,730,443 | B2 | 8/2017 | Harvey et al. |
| 9,737,072 | B2 | 8/2017 | Harvey et al. |
| 10,004,230 | B2 | 6/2018 | Harvey et al. |
| 10,259,729 | B2 | 4/2019 | Buschmann |
| 10,472,265 | B2 | 11/2019 | Buschmann |
| 10,501,346 | B2 | 12/2019 | Buschmann |
| 10,577,698 | B2 | 3/2020 | Buschmann |
| 10,611,656 | B2 | 4/2020 | Buschmann |
| 10,875,798 | B2 | 12/2020 | Buschmann |
| 10,875,799 | B2 | 12/2020 | Buschmann |
| 10,883,224 | B2 | 1/2021 | Buschmann |
| 10,912,321 | B2 | 2/2021 | Harvey et al. |
| 10,941,063 | B2 | 3/2021 | Buschmann |
| 11,001,864 | B1 | 5/2021 | Buschmann |
| 11,111,629 | B2 | 9/2021 | Buschmann et al. |
| 11,136,714 | B2 | 10/2021 | Buschmann |
| 11,225,755 | B2 | 1/2022 | Buschmann |
| 11,311,012 | B1 | 4/2022 | Buschmann et al. |
| 11,795,615 | B2 | 10/2023 | Buschmann et al. |
| 11,827,543 | B2 | 11/2023 | Buschmann |
| 12,215,460 | B2 | 2/2025 | Buschmann |
| 2001/0050234 | A1 | 12/2001 | Shiepe |
| 2002/0153262 | A1 | 10/2002 | Uno et al. |
| 2003/0019757 | A1 | 1/2003 | Vetrovec |
| 2003/0019758 | A1 | 1/2003 | Gopal |
| 2003/0024054 | A1 | 2/2003 | Burns |
| 2004/0035803 | A1 | 2/2004 | Cronan et al. |
| 2004/0112555 | A1 | 6/2004 | Tolan et al. |
| 2004/0134857 | A1 | 7/2004 | Huling et al. |
| 2004/0200588 | A1 | 10/2004 | Walker |
| 2005/0183949 | A1 | 8/2005 | Daly |
| 2006/0207734 | A1 | 9/2006 | Day |
| 2007/0074975 | A1 | 4/2007 | Buschmann et al. |
| 2007/0212594 | A1 | 9/2007 | Takasu et al. |
| 2007/0243449 | A1 | 10/2007 | Sotomura et al. |
| 2007/0274857 | A1 | 11/2007 | Okano et al. |
| 2009/0012346 | A1 | 1/2009 | Al Nashef et al. |
| 2009/0090478 | A1 | 4/2009 | Hollomon et al. |
| 2009/0152123 | A1 | 6/2009 | Butler et al. |
| 2009/0175956 | A1 | 7/2009 | Buschmann et al. |
| 2009/0285738 | A1 | 11/2009 | Winter et al. |
| 2009/0314652 | A1 | 12/2009 | Buschmann |
| 2010/0078331 | A1 | 4/2010 | Scherson et al. |
| 2010/0160449 | A1 | 6/2010 | Rovison, Jr. et al. |
| 2010/0176066 | A1 | 7/2010 | Budde et al. |
| 2010/0179368 | A1 | 7/2010 | Conrad |
| 2010/0320156 | A1 | 12/2010 | Olaiya et al. |
| 2011/0017066 | A1 | 1/2011 | Takeuchi et al. |
| 2011/0024361 | A1 | 2/2011 | Schwartzel |
| 2011/0123642 | A1 | 5/2011 | Wilmotte |
| 2011/0232853 | A1 | 9/2011 | Yin |
| 2012/0067532 | A1 | 3/2012 | Lee |
| 2012/0091069 | A1 | 4/2012 | Fischmann |
| 2012/0108878 | A1 | 5/2012 | Conrad |
| 2012/0145643 | A1 | 6/2012 | Pandya |
| 2012/0165407 | A1 | 6/2012 | Gupta et al. |
| 2012/0240647 | A1 | 9/2012 | Montemurro |
| 2012/0244261 | A1 | 9/2012 | Harvey et al. |
| 2012/0267315 | A1 | 10/2012 | Soane et al. |
| 2012/0322873 | A1 | 12/2012 | Atkins et al. |
| 2013/0259743 | A1 | 10/2013 | Keasler et al. |
| 2013/0264293 | A1 | 10/2013 | Keasler et al. |
| 2014/0069821 | A1 | 3/2014 | Marcin et al. |
| 2014/0072653 | A1 | 3/2014 | Buschmann |
| 2014/0131217 | A1 | 5/2014 | Buschmann |
| 2014/0131259 | A1 | 5/2014 | Goldblatt |
| 2014/0197102 | A1 | 7/2014 | Van Der Wal et al. |
| 2014/0205777 | A1 | 7/2014 | Hawkins et al. |
| 2014/0238626 | A1 | 8/2014 | Tsuji et al. |
| 2014/0374104 | A1 | 12/2014 | Seth |
| 2016/0068417 | A1 | 3/2016 | Buschmann |
| 2016/0297697 | A1 | 10/2016 | Buschmann |
| 2017/0107128 | A1 | 4/2017 | Buschmann |
| 2017/0158537 | A1 | 6/2017 | Buschmann |
| 2017/0159237 | A1 | 6/2017 | Buschmann et al. |
| 2017/0335515 | A1 | 11/2017 | Buschmann |
| 2018/0023250 | A1 | 1/2018 | Buschmann |
| 2021/0221717 | A1* | 7/2021 | Buschmann ............. C09K 8/54 |

FOREIGN PATENT DOCUMENTS

| | | | |
|---|---|---|---|
| EP | 0480469 A3 | 4/1992 |
| EP | 1618786 A1 | 1/2006 |
| FR | 2776312 A1 | 9/1999 |
| JP | 2004315519 A | 11/2004 |

(56) References Cited

FOREIGN PATENT DOCUMENTS

| JP | 2006045146 | A | 2/2006 |
|----|------------|-----|--------|
| JP | 2006045147 | A | 2/2006 |
| WO | 9402423 | A1 | 2/1994 |
| WO | 9412721 | A1 | 6/1994 |
| WO | 9739179 | A1 | 10/1997 |
| WO | 1999032710 | A1 | 7/1999 |
| WO | 2000069778 | A1 | 11/2000 |
| WO | 2008056025 | A2 | 5/2008 |
| WO | 2010059459 | A1 | 5/2010 |
| WO | 2012090124 | A2 | 7/2012 |
| WO | 2012128734 | A1 | 9/2012 |
| WO | 2013060700 | A1 | 5/2013 |
| WO | 2013064484 | A1 | 5/2013 |
| WO | 2014100828 | A1 | 6/2014 |

OTHER PUBLICATIONS

Gullichsen et al., eds.; Chemical Pulping; Papermaking Science and Technology; Book 6A; 1999; Fapet Oy; pp. A40-A41 and A616-A665.

Gullichsen et al, eds.; Chemical Pulping; Papermaking Science and Technology, Book 6A; 1999; Fapet Oy; pp. A137-A145.

Hill et al.; "Part 1: Peracetic Acid—An effective alternative for Chlorine compound Free Delignification of Kraft Pulp"; 1992; Pulping Conference; pp. 1219-1230.

Pedros et al.; "Chlorophyll fluorescence emission spectrum inside a leaf"; The Royal Society of Chemistry and Owner Societies; 2008; No. 7; pp. 498-502.

Shackford; "A Comparison of Pulping and Bleaching of Kraft Softwood and Eucalyptus Pulps"; 36th Intl. Pulp and Paper Congress and Exhibition; Oct. 13-16, 2003; Sao Paulo, Brazil; 17 pgs.

Smook, Handbook for Pulp & Paper Technologists, 1992, Chapter 4: Overview of Pulping Methodology, Chapter 7: Kraft Pulping, and Chapter 14: Secondary Fiber, Fifth printing 2001, Angus Wilde Publications, Vancouver B.C., pp. 36-44, 74-83, and 209-219.

Suihko et al.; "A study of the microflora of some recycled fibre pulps, boards and kitchen rolls"; The Journal of Applied Microbiology; 1997; vol. 83; pp. 199-207.

Suslow; "Oxidation-Reduction Potential (ORP) for Water Disinfection Monitoring, Control, and Documentation"; Univ. California; Division of Agriculture and Natural Resources; ANR Publication 8149; 5 pgs.; http://anrcatalog.ucdavis.edu; 2004; 5 pgs.

Szabo et al.; "Utilization of NaClO and $H_2$ $O_2$ as a Source of the Singlet Oxygen for the Environmental Bleaching of Pulp"; Cellulose Chem. Technol.; vol. 28; 1994; pp. 183-194.

Verween et al.; "Comparative toxicity of chlorine and peracetic acid in the biofouling control of Mytilopsis leucophaeata and Dreissena polymorpha embryos (*Mollusca, Bivalvia*)"; International Biodeterioration & Biodegradation; vol. 63, No. 4; 2009; pp. 523-528.

Xu et al.; "Isotope and surface preparation effects on alkaline dioxygen reduction at carbon electrodes"; J. Electrochemical Chemistry 410; 1996; pp. 235-242.

"pH values of Common Foods and Ingredients", Jul. 10, 2017, South Carolina, U.S.A., pp. 1-2, URL:https://www.clemson.edu/extension/food/food2market/documents/ph_of_common_foods.pdf.

* cited by examiner

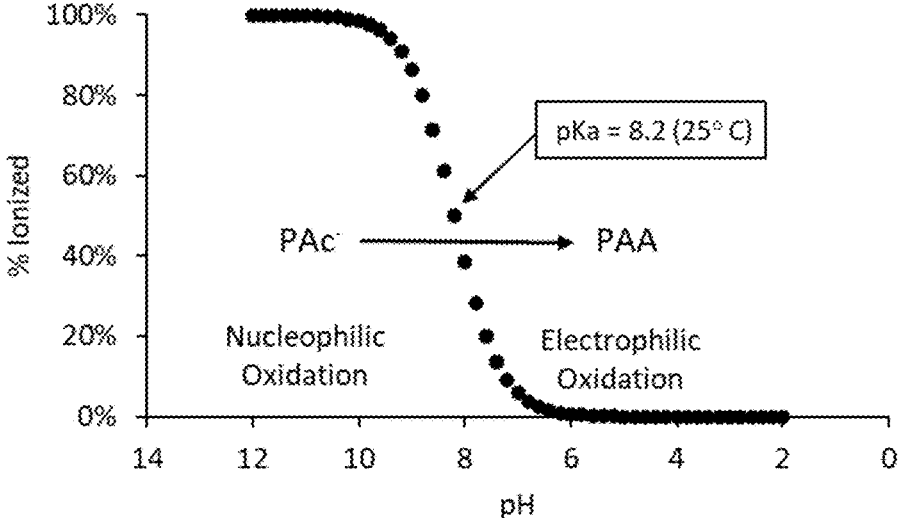

FOOD PROCESSING OXIDATION TREATMENT FORUMLATIONS AND METHODS

REFERENCE TO RELATED APPLICATIONS

This application is a continuation of international application number PCT/US2024/029850 filed May 17, 2024, which published as international publication no. WO 2024/238884 A1, and which claims a benefit of each of U.S. provisional patent application No. 63/468,729 filed May 24, 2023, U.S. provisional patent application No. 63/467,272 filed May 17, 2023, and U.S. provisional patent application No. 63/467,270 filed May 17, 2023, the entire contents of each and all of which are incorporated by reference herein for all purposes. This application claims priority pursuant to 35 U.S.C. §§ 119(a) and 365(b) to international patent application no. PCT/US2023/080217 filed Nov. 17, 2023, which published as international publication no. WO 2024/108086, the entire contents of each and both of which are incorporated by reference herein for all purposes.

This application incorporates by reference, for all purposes, each and every portion of each and all of the following: international patent application no. PCT/US2022/050317 filed Nov. 17, 2022 (published as international publication no. WO 2023/091610 A1 and which entered the national stage in the U.S. as U.S. patent application Ser. No. 18/709,869), U.S. provisional patent application No. 63/280,479 filed Nov. 17, 2021, and U.S. patent application Ser. No. 19/200,902 filed May 7, 2025.

This application incorporates by reference the entire contents of each and every international application and U.S. patent application identified herein, and each and every international publication thereof and U.S. patent application publication thereof, and each and every U.S. patent issuing therefrom.

FIELD OF THE INVENTION

This invention relates to nonequilibrium peracid salt compositions, preparation of such compositions, and oxidative treatments for food processing applications using such compositions.

BACKGROUND OF THE INVENTION

Food processing is the conversion of raw agricultural or synthesized products into food, and for any particular product consumable as a food may include few or several stages of processing. Primary food processing is a term sometimes used to refer to processing that turns raw agricultural products into food which can be eaten. Secondary food processing is a term sometimes used to refer to processing that creates food from ingredients that are ready to use, for example baking bread. Tertiary processing is a term sometimes used to refer to processing to create what is commonly referred to as "processed" food, for example potato chips or frozen meals. Cleaning and sanitizing are critical aspects at all stages of food processing, for safety and to prevent or reduce spoiling of food. Detailed procedures, cleaning frequencies and type of cleaning must be provided for all food-product contact surfaces as well as for non-product surfaces which could impact food safety. These surfaces include food surfaces, food contact surfaces and non-food contact surfaces such as equipment which can include for example overhead structures, shields, walls, ceilings, lighting devices, refrigeration units and heating, ventilation and air conditioning (HVAC) systems.

Cleaning frequency and type must be clearly defined for each process line (i.e., daily, after production runs, or more often if necessary). The objective of cleaning and sanitizing food contact surfaces is to remove food (nutrients) that bacteria need to grow, and to kill those bacteria that are present. It is important that clean, sanitized equipment and surfaces dry and are stored so as to prevent bacteria growth. All necessary contact equipment used in food processing must also be cleaned and stored in a sanitary manner. The general order for cleaning and sanitization of food product contact surfaces are: rinse, clean, rinse, sanitize and sometimes a final rinse.

Cleaning is the complete removal of food soil using detergents under recommended conditions and procedures. Food soil is defined as any unwanted matter on food contact surfaces, including food product, minerals and films. No single detergent is effective in removing all types of food soil. Types of cleaning methods include: mechanical cleaning often referred to as clean in place (CIP) which requires no disassembly or partial disassembly of equipment; clean out of place (COP) can be partially disassembled and cleaned in specialized COP pressure tanks, and manual cleaning requires total disassembly for cleaning and inspection.

Detergents and cleaning compounds are composed of mixtures of ingredients that interact with soils in a variety of ways, either physically or chemically. The primary physically-active ingredients in food processing are surface active compounds termed surfactants. Surfactants alter physical characteristics such as solubility or colloidal stability. These organic molecules have general structural characteristic where a portion of the structure is hydrophilic and a portion is hydrophobic. Such molecules function in detergents by promoting the physical cleaning actions through emulsification, penetration, spreading, foaming, and wetting. The classes of surfactants are ionic and nonionic.

Chemically active ingredients in cleaning and sanitization include alkaline detergents, acid detergents, water conditioners and oxidizing agents. These compounds modify soil components to make then more soluble and easier to remove. Enzyme-based detergents are amended with enzymes such as amylases and other carbohydrate-degrading enzymes, proteases, and lipases, are added to react with and degrade food soil surfaces.

Sanitization refers to the reduction of microorganisms to levels considered safe to prevent foodborne illness. Appropriate and approved sanitization procedures are processes, and, thus, the duration or time as well as the chemical conditions must be described. The official definition (Association of Official Analytical Chemists) of sanitizing for food product contact surfaces is a process which reduces the contamination level by 99.999% (5 logs) in 30 sec. The standard test organisms used are *Staphylococcus aureus* and *Escherichia coli*. General types of sanitization include thermal and chemical sanitization. Thermal sanitization involves the use of hot water or steam for a specified temperature and contact time. Thermal sanitization effectiveness is determined by contamination load, humidity, pH, temperature and time. Steam had limited use due to expense and challenges in regulating and monitoring contact temperature and time. Hot water sanitization through immersion, spray or circulating systems is more commonly used, however, it is a slow process and has higher energy demand and safety concerns for operators. Chemical sanitization involves the use of an approved chemical sanitizer at a specified concentration and contact time. Chemical sanitization is widely accepted, and common sanitizers include chlorine bleach, chloride dioxide, bromine, iodine and quaternary ammonium compounds, acids, alkaline cleaners, hydrogen peroxide and peroxyacetic acid (peracetic acid). Many of the commonly used sanitizers have disadvantages due to pH, corrosivity, flammability, skin irritation, aquatic toxicity and odor. Chemical sanitizers are approved by the EPA for use as no-rinse, rinse optional or rinse required food contact surface sanitizers and can be sprayed onto surfaces, circulated through equipment or foamed onto a surface or fogged into the air. A major drawback to chlorine and bromine compounds is corrosiveness to many metal and non-metal surfaces, occupational health concerns such as skin irritation and mucous membrane damage, and health and environmental toxicity concerns from halogenated disinfection byproducts (DPBs).

Food processing uses large amounts of fresh water as a vehicle for materials and chemicals used in the processing, resulting in the generation of large amounts of effluent. Water comprises approximately 95-99% of cleaning and sanitizing solutions. The industry continues to work to reduce water consumption by utilizing closed water circuits but that is limited by accumulation of contaminants, disinfection byproducts, cleaning and sanitizing residuals and pollutants in the process water. The water carries detergent and/or sanitizer to the substrate as well as carries food and contaminants away from the substrate. Water impurities and hardness usually have the greatest effect on cleaning and sanitization, as water used for cleaning and sanitization must be potable and pathogen free.

Detergents can be significant contributors to the waste discharge (effluent). Of primary concern is pH. Many publicly owned treatment works limit effluent pH to the range of 5 to 9.0. So, it is recommended that in applications where highly alkaline cleaners are used, that the effluent be mixed with rinse water (or some other method be used) to reduce the pH. Recycling of caustic soda cleaners is also becoming a common practice in larger operations. Other concerns are phosphates, which are not tolerated in some regions of the U.S., and the overall soil load in the waste stream that contributes to the chemical oxygen demand (COD) and biological oxygen demand (BOD).

Reductions in amounts of TOC (Total Organic Carbon), BOD and COD are important for process improvements. TOC is the amount carbon atoms tied up in organic compounds in a water sample, and a non-specific indicator of water quality. BOD is an analytical parameter representing the amount of dissolved oxygen consumed by aerobic bacteria growing on the organic material present in a water sample at a specific temperature over a specific time period. The BOD value is most commonly expressed in milligrams of oxygen consumed per liter of sample during 5 days of incubation at 20° C. and is often used as a surrogate of the degree of organic water pollution. COD is a measurement of the oxygen required to oxidize soluble and particulate organic matter in water. Reduction of pollutants and decreasing water usage continues to be a challenge in this processing.

Although not traditionally employed for oxidative treatments in food processing, the reactive oxygen species (ROS) of singlet oxygen is well suited for oxidation of food soils. Singlet oxygen (which is not a radical) is relatively selective towards oxidation in contrast to ozone and radicals including elemental chlorine, hydroxyl radical, hydroperoxyl radical.

Reactive oxygen species (ROS) refers to various forms or energy states of oxygen with greater activity or reactivity than molecular oxygen, $O_2$, present in air. Several ROS are found naturally occurring in the environment, play critical roles in biological systems, and have been harnessed for commercial uses. Common examples of ROS include hydroxyl radical (HO·), hydroperoxyl radical (HOO·), superoxide radical anion ($O_2 \cdot^-$), singlet oxygen ($^1O_2$), and ozone ($O_3$). In general, ROS in water are short-lived and, for commercial uses, are generated at the point of use or in-situ.

Singlet oxygen has selective oxidative reactivity and biocidal properties compared to other ROS.

One problem associated with use of singlet oxygen for oxidation treatments is that it has a very brief lifetime of only a few microseconds in water before it returns to the ground state of triplet oxygen.

Methods to produce activated nonequilibrium peracetate-ROS formulations on-demand that are suitable for generating ROS, especially singlet oxygen, were recently disclosed, including for example in WO 2014/039929 A1 and US 2016/0068417 A1. These activated nonequilibrium formulations provide enhanced oxidative power and microbial control performance relative to stabilized peracetic acid formulations containing significant concentrations of hydrogen peroxide, acetic acid, and peroxide stabilizers. The activated peracetate-ROS formulations are moderately alkaline, low odor and reduce chemical vapor exposure hazards in the workplace.

Previously disclosed peracetate-ROS formulations, such as those disclosed for example in WO 2014/039929 A1 or US 2016/0068417 A1, were produced by reaction of an alkaline hydrogen peroxide source with an acetyl donor material in a process that used a large molar excess of acetyl donor groups relative to hydrogen peroxide to ensure virtually all of the hydrogen peroxide was consumed rapidly such that the concentration of residual hydrogen peroxide would be at a low level, such as less than 3% the mass of the peracetic acid/peracetate concentration, and to minimize competing side reactions that decrease the yield and concentration of peracetate in the product solution. The use of peroxide stabilizers must also be excluded to avoid blocking reactions in the nonequilibrium peracetate formulations that produce ROS.

Such peracetate-ROS formulations must be generated rapidly with little to no hydrogen peroxide residual for efficient singlet oxygen production without the quenching of singlet oxygen activity by hydrogen peroxide and to inhibit detrimental side reactions that reduce peracetate production efficiency and product concentration.

To achieve these conditions previously, a substantial molar excess of acetyl donor groups was used to accelerate a reaction at alkaline pH which consumed hydrogen peroxide and formed peracetate at a fast rate that minimized the extent that derogatory side reactions could occur.

In previous work, it was found that attempts to reduce the molar excess of acetyl donor groups relative to hydrogen peroxide resulted in unacceptable slowing of the desired reaction to produce peracetate relative to the rate of detrimental side reactions that reduce production efficiency, product concentration, and working time of peracetate-ROS formulations. At the same time, a large molar excess of acetyl donor material can lead to other potential side reactions that result in reduced production efficiency, concentration, and working time of peracetate-ROS formulations. This situation creates a need for careful process control and, in prior work at relatively small production scales, optimizing production process controls and production system design (i.e., engineering methods) could to some degree improve the accuracy of the process to generate a more consistent product. However, these engineering methods of optimization could not overcome inherent limitations of the chemistry during production of peracetate-ROS formulations at larger scales, with consistent product qualities, working times and lower levels of by-products desirable for use in larger-scale, food processing applications.

There is a need for improved methods for oxidative treatment in food processing, and for improved nonequilibrium peracetate-ROS formulations and associated methods that can be applied in the food processing context.

SUMMARY OF INVENTION

This invention concerns new peracid salt-ROS formulations, new methods of generating peracid salt-ROS formulations, and new methods of using such peracid salt-ROS formulations with preferred formulations being peracetate-ROS formulations. Although such formulations and methods are particularly well suited for use in oxidative treatments in the food processing applications, the formulations and methods can also be applied in other oxidative treatment contexts as well.

The peracid salt-ROS formulations are nonequilibrium peracid salt compositions capable of generating ROS, and especially singlet oxygen, during use in oxidation treatments. With the present invention, it was discovered that changing the chemical feedstock ratios and initially formed product formulation to outside the ranges taught in prior art results in significant improvements to methods of generating peracetate-ROS formulations at larger production scales made by batch, semi-continuous or continuous process methods. Improvements over prior art generally include: higher production efficiency while using less acetyl donor material; more consistent product characteristics between production batches or cycles; increased working time to apply the chemistry; and lower byproduct residuals of the chemistry.

As will be appreciated, peracetic acid is one of several peracids, which are also referred to as peroxyacids. The discussions below and in the appended claims are presented primarily by reference to peracid salt-ROS formulations based on peracetic acid, which are referred to herein generally as peracetate-ROS formulations or as nonequilibrium peracetic acid salt compositions, but the principles discussed are thought to apply to peracid salt-ROS formulations based on other organic peracids, with replacement of peracetate with the corresponding salt form of an organic peracid other than peracetic acid. The peracid salt-ROS formulations, including peracetate-ROS formulations, are preferably in the salt form with an alkali metal salt, preferably sodium and/or potassium, and more preferably sodium. Discussion in the description below and the appended claims to sodium apply also to formulations including potassium instead. Peracid salt-ROS formulations are also referred to as peracid-reactive oxygen species formulations or nonequilibrium peracid salt compositions and peracetate-ROS formulations are also referred to as peracetate-reactive oxygen species formulations or nonequilibrium peracetic acid compositions.

This invention provides methods for producing peracetate-ROS formulations with a substantially reduced excess of acetyl donor material that more closely approaches a stoichiometric 1:1 ratio of hydrogen peroxide to acetyl donor groups relative to prior art preparation methods while maintaining or increasing the production efficiency of an active peracetate-ROS formulation. This invention provides peracetate-ROS formulations having advantageous properties, and which may be prepared by the noted method.

This invention reduces material consumption and associated costs for producing peracetate-ROS formulations compared to previous methods.

This invention provides methods to produce peracetate-ROS formulations with enhanced compositional and performance characteristics with greater consistency of prepared formulations than previous methods in batch, semi-continuous and continuous production processes for large scale commercial uses.

This invention provides an improved peracetate-ROS formulation that increases working time at an elevated concentration range prior to its use or dilution to a point of use concentration.

The improved formulation produced by the methods herein can be in the form of a liquid, an ice, a foam, a fog, an emulsion, a microemulsion or an aerosol. The invention also provides improved formulations for point of use applications which are appropriately formulated for application by injection, flooding, spraying, and/or circulation. The formulations of the invention are particularly advantageous for use in food process applications, but can also be employed in other applications. The formulations of the invention can be used, for example, for applications in food, dairy, beverage, and biopharma; cleaning; decontamination; remediation of soil and groundwater; cleaning of membrane filtration systems; flushing of well casings and water distribution pipes; pulp and paper processing, delignifying, bleaching, brightening, fluffing of pulp fibers and in-situ chemical oxidation, among others.

This invention provides a peracetate-ROS formulation that contains less total organic carbon (TOC) from product residues compared to previous formulations. Further this formulation has less TOC compared to equilibrium peracetic acid products.

The improvements were enabled by the discovery of a previously unknown "threshold" for the amount of excess acetyl donor relative to hydrogen peroxide as the excess acetyl donor used to prepare the peracetate ROS formulation at a high pH is reduced closer to a stoichiometric molar ratio of acetyl donor groups to hydrogen peroxide, below which threshold there was an abrupt change in reaction behavior such that undesirable side reactions were significantly and unexpectedly reduced relative to the desired reaction to form peracetate at high efficiency and with the preferred composition optimized to generate singlet oxygen. It was discovered that changing the chemical feedstock ratios to outside the ranges taught in prior art resulted in an unexpected, disproportionate change and improvement to the peracetate-ROS formulations and efficiency of preparation performance.

In previous work concerning generation of peracetate-ROS formulations, two parameters were used to control generation of the formulations, specifically the ratio of alkali to hydrogen peroxide and the hydrogen peroxide to acetyl donor ratio. Previously these ratios were presented as the ratio of hydrogen peroxide to alkali in the range of 1:1.2 to 1:2.5, now presented as alkali to hydrogen peroxide having a range of 1.2:1 to 2.5:1 and the hydrogen peroxide to acetyl donor ranges presented formerly as from 1:1.25 to 1:4, currently presented as ranging from 0.80:1 to 0.25:1. In this reaction a significant molar excess of acetyl donor over alkaline hydrogen peroxide is required to provide efficient conversion of hydrogen peroxide, the limiting reagent, to peracetate before other side reactions that reduce production efficiency become significant (e.g., less than about 88% hydrogen peroxide to peracetate conversion yield). This reaction is driven by the excess of acetyl donor.

In contrast, in the present invention three parameters are identified as critical to approach stoichiometric hydrogen peroxide to acetyl donor molar ratios for generation of peracetate-ROS formulations with more efficient use of acetyl donor and less reaction byproducts which can be quantified as total organic carbon. The primary controlling parameters are the alkali to acetyl donor ratio and the hydrogen peroxide to acetyl donor ratio. The alkali to hydrogen peroxide ratio is dependent on, and a result of, the first two controlling parameters. These controlling parameters were discovered to be of critical importance for the efficient production of singlet oxygen producing peracetate solutions approaching stoichiometric hydrogen peroxide to acetyl donor groups molar ratios (i.e., 0.80:1 to 1.0:1). This approach minimizes undesirable side reactions that reduce peracetate yield and short-term stability.

The importance of the alkali to acetyl donor molar ratio is not obvious due to its indirect relationship with product concentration, yield and stability when the acetyl donor is in significant stoichiometric excess over hydrogen peroxide and the peracetate product as disclosed in prior art. Scale up was not commercially feasible previously when using a large excess of acetyl donor material because a very large excess of sodium hydroxide over hydrogen peroxide leads to competing consumption of acetyl donor by sodium hydroxide, loss of product yield and pH outside of the previously specified range. However, the alkali to acetyl donor molar ratio discovered in the present invention provides systematic control of the yield and compositional parameters of the produced peracetate solutions when approaching stoichiometric equivalence to the peracetate product. The alkali to hydrogen peroxide ratio is dependent on, and a result of, the first two controlling parameters. The hierarchy of these parameters can be listed as 1) NaOH:acetyl donor groups molar ratio, 2) hydrogen peroxide:acetyl donor groups molar ratio and 3) NaOH:hydrogen peroxide molar ratio.

The present invention provides compositions and methods of producing a peracetate solution by a near-stoichiometric reaction between hydrogen peroxide and an acetyl donor capable of efficiently producing singlet oxygen, has improved short-term stability for improved working time, and can be used in the presence of acidulants and near-neutral pH buffered environments without significant loss to degradation reactions. A method of producing a peracetate solution using a molar ratio of alkali as sodium hydroxide to acetyl donor groups in a range of 1:1 to 1.3:1 combined with a molar ratio of hydrogen peroxide to acetyl donor groups in a range of 0.8:1 to 1:1 and where the preferred peracetate solution pH range is 12.5 to 13.5 when first made and where the peracetate concentration in solution is 1% to 8% and the residual hydrogen peroxide concentration is zero to 1400 mg/L.

One aspect of this disclosure is directed to aqueous, nonequilibrium peracetate compositions for generation of singlet oxygen for use in oxidative treatments. Such a nonequilibrium peracetate composition can comprise:

dissolved peracid anion of an alkali metal salt of a peracid at a concentration in a range of from 1.0% (weight/volume) to 8.0% (weight/volume);

pH in a range of from pH 12.0 to pH 13.5;

a concentration of dissolved hydrogen peroxide of no more than 1400 mg/L;

a 10-minute stability index ($SI_{10}$) at a temperature of 22° C. of at least 0.80, wherein the 10-minute stability index is calculated according to Equation I:

$$SI_{10} = CA_{10}/CA_0 \qquad \text{Equation I}$$

8 wherein:

$SI_{10}$ is the 10-minute stability index;

$CA_0$ is the concentration (% weight/volume) of the peracid anion determined for a first time; and $CA_{10}$ is a concentration (% weight/volume) of the peracid anion determined for a second time corresponding to 10 minutes following the first time.

Another aspect of this disclosure is directed to a method for preparing a nonequilibrium peracid salt composition in relatively stable form for short-term storage and handling prior to use to generate singlet oxygen during oxidative treatments. Such a method can comprise:

reacting components in an aqueous reaction mixture prepared from a combination of chemical feedstocks to form an aqueous nonequilibrium peracid salt composition, the chemical feedstocks comprising acyl donor with acyl donor groups, hydrogen peroxide and alkali metal hydroxide in amounts and proportions, including to account for yield losses, to prepare the nonequilibrium peracid salt composition with composition properties comprising:

dissolved peracid anion of the peracid salt at a concentration in a range of from 1.0% (weight/volume) to 8.0% (weight/volume); and pH in a range of from pH 12.0 to pH 13.5; and wherein the combination of reaction feedstocks comprises:

a first molar ratio of the alkali metal hydroxide to the acyl donor groups in a range of from 0.95 to 1.40; and a second molar ratio of hydrogen peroxide to the acyl donor groups in a range of from 0.80 to 1.10; and continuing the reacting at least until the nonequilibrium peracid salt composition is prepared including the composition properties.

Another aspect of this disclosure are directed to methods and uses of oxidative treatments of substrates. Such a method or use can comprise contacting the substrate with a nonequilibrium peracid salt composition, for example of the previously noted aspect. Such a method or use can comprise contacting the substrate with a nonequilibrium adjusted composition prepared by adding one or more additives to the nonequilibrium peracid salt composition. One or more such additives can be added to the nonequilibrium peracid salt composition after preparation of the nonequilibrium peracid salt composition by the method of preparation summarized above, or variations thereof further described below. Such one or more additives may be added after reacting feed components to prepare the nonequilibrium peracid salt composition including the desired composition properties for the nonequilibrium peracid salt composition. Examples of such one or more additives include dilution liquid (e.g., water) to dilute the peracid salt concentration and/or an acidulant to reduce the pH of the composition. An additive can provide multiple effects, such as both dilution and acidification (e.g., dilution with an acidic aqueous solution). Such dilution and/or acidification can be tailored to provide oxidation properties advantageous for different requirements of different oxidation treatment applications. The adjusted properties of the adjusted nonequilibrium composition are a consequence, at least in part, of adding the one or more additives, and are not solely due to changes that would otherwise naturally occur in the prepared nonequilibrium peracid salt composition as the nonequilibrium peracid salt composition ages after preparation and naturally reacts towards an equilibrium condition. As will be appreciated, acidification will result in conversion of some amount of peracid anion (e.g., peracetate) to the peracid form (e.g., peracetic acid), which may be more beneficial for some oxidation treatment applications. When an oxidative treatment includes contacting the objective substrate with the nonequilibrium peracid salt composition, the nonequilibrium peracid salt composition immediately prior to the contacting will preferably, but need not always, at that time have composition properties (e.g., dissolved peracid anion concentration, pH, hydrogen peroxide concentration, and/or stability index) as summarized above or discussed below for the nonequilibrium peracid salt composition as initially prepared. As will be appreciated, the longer that a nonequilibrium peracid salt composition sits prior to being applied to contact a substrate for oxidative treatment, the more likely that the properties of the composition have changed from desired properties for an initially-prepared composition. The method of preparing the nonequilibrium peracid salt composition advantageously prepares the composition with desirable oxidative potential in a relatively stable form, and in combination with the method of oxidative treatment provides particularly advantageous flexibility to adapt that oxidative potential for more effective use according to different requirements and conditions of different oxidative treatment applications.

In some embodiments the improved sodium peracetate oxidant solution can be used as-made in its alkaline form (PM3) or acidified to a lower pH (aPM3). The method of generating sodium peracetate solution offers a unique path to a pH-flexible peracetic acid containing product for a variety of uses. The PM3 form is preferred when a nucleophilic oxidant (peracetate anion) combined with an oxidant with electrophilic character (singlet oxygen) are the dominant species. The aPM3 form is preferred when an electrophilic oxidant (peracetic acid), which may be combined with hydroxyl radicals and acetoxy radicals formed at elevated process temperatures, are the dominant species. The choice between which form is dominant is determined by technical effect desired, use conditions or process conditions.

This invention is directed to methods and uses of oxidative treatments of substrates in food processing. Such a method or use can comprise contacting the substrate with a nonequilibrium peracid salt composition. The peracetate solution may provide cleaning and sanitization of a substrate. In some embodiments, the peracetate oxidant solution kills the microbial population on or in the substrate. In some embodiments, the peracetate solution reduces the biofilms and corrosion.

In some embodiments, the ROS generated by the peracetate formulation, particularly singlet oxygen, are the primary chemical species doing the cleaning and sanitization of a substrate. The direct reaction of peracetate with substrate is minimal, which contrasts with the use of conventional peracetic acid in combination with hydrogen peroxide as the primary oxidants, which have much lower performance efficiency (and therefore, higher cost) for cleaning and sanitization.

In some embodiments, the peracetate oxidant formulation produces singlet oxygen as the primary reactive oxidant species and therefore avoids damage relative to other chemical methods for sanitization. The peracetate oxidant formulation provides the first known bulk source of singlet oxygen for food sanitization generated on site.

In some embodiments, sanitization performance of the ROS-generating peracetate oxidant formulation is high, even at pH 10 or less. Applying the peracetate oxidant in high doses in a single step process is effective, but this approach can be costlier compared to multiple, lower doses of oxidant.

In some embodiments, methods to use the ROS-generating peracetate oxidant formulation more efficiently were developed to reduce operating costs of feedstocks so that it can directly compete on a cost basis when considering reducing chlorine chemicals, reducing halogenated disinfection byproducts formation and emissions, reducing effluent for treatment, and reducing capital costs relative to increasing the capacity of typical food processing.

In some embodiments, heating or thermal acceleration or activation of peracetate oxidant solutions to a temperature useful for food processing accelerates the formation of ROS (singlet oxygen) from a "parent" peracetate formulation as shown by enhanced rates of sanitization, and biocidal activity with increasing temperature. Thermal activation that accelerates ROS production rate is useful for treatment in heated environments and hot chemical sanitizing processes.

For existing food processing facilities, the peracetate oxidant technology is a relatively simple, safe and low-cost retrofit or drop-in replacement. The byproducts of the peracetate oxidant formulation do not contain chlorides and are readily biodegradable and have very little corrosivity or volatility in a closed-cycle process.

In some embodiments, the use of peracetate oxidant formulation is significantly safer to work with than large quantities of chlorine, hypochlorite, chlorine dioxide, chloramine and concentrated peracetic acid. Peracetate oxidant solutions are composed of sodium peracetate salt, which is a water soluble solid in its native form. Salts in general have significantly lower vapor pressures than liquids and gases at room temperature. A small fraction of the sodium peracetate can be present as peracetic acid, however, peracetic acid is consumed by reactions with sodium peracetate and does not reach significant concentrations in solution. Exposure to sodium peracetate solution is limited to inhalation of an aerosol or mist and exposure to liquid concentrates.

In some embodiments, a method provides for treating in food facilities. The treating may consist of cleaning and or sanitizing a primary, secondary or tertiary food process. The methods may include providing a peracetate oxidant solution. The peracetate solution may include peracetate anions and a peracid. In some embodiments, the peracetate solution may include a pH from about pH 12 to about pH 13.5. In some embodiments, the peracetate solution has a molar ratio of peracetate anions to peracid ranging from about 10,000:1 to about 40,000:1. In some embodiments, the peracetate solution has a molar ratio of peracetate to hydrogen peroxide of greater than about 16:1. In some embodiments, the peracetate oxidant solution kills the microbial population on the substrate. In some embodiments, the peracetate solution reduces the biofilms and corrosion.

In some embodiments, the peracetate oxidant is generated at, or near, the point of use as an aqueous solution due to its high activity and half-life of minutes to hours depending on concentration and use conditions. The oxidant is active long enough to serve as an oxidant and/or biocide before it is consumed or attenuates leaving benign and readily degradable residuals including oxygen, sodium acetate and glycerol.

These and other aspects of this disclosure are subject to various refinements and enhancements as discussed herein, including in the section below titled "Exemplary Implementation Combinations" and in the appended claims, and as illustrated in the drawings.

BRIEF DESCRIPTION OF THE DRAWINGS

FIG. 1 shows an ionization curve for 5.8% w/v sodium peracetate concentration at 25° C.

DETAILED DESCRIPTION

Definitions

Unless defined otherwise, all technical and scientific terms used herein have the same meaning as commonly understood by one of ordinary skill in the art.

The term "reactive oxygen species" as used herein generally refers to a species such as may include singlet oxygen ($^1O_2$), superoxide radical ($O_2 \cdot^-$), hydroperoxyl radical (HOO·), hydroxyl radical (HO·), acyloxy radical (RC(O)-O·), and other activated or modified forms of ozone (e.g., ozonides and hydrogen trioxide). Each of these ROS has its own oxidation potential, reactivity/compatibility profile, compatibility/selectivity and half-lives.

The term "substrate" as used herein generally refers to solid object surfaces, particulates and liquids amenable to contact with the improved formulation. A food processing substrate can be any substrate having contact with or containing a food, food soil, food intermediate or a derivative thereof. For example, an interior surface of a food processing vessel; a food conveyance surface (such as for example a conveyance surface of a belt conveyor, vibratory conveyor, pump or conduit); a food cutting surface; a food cutting blade surface; food blender surface; a food mincer surface; a food grinder surface; a food masher surface; a food cooking surface; a food preparation utensil surface; or combinations thereof. A food processing substrate can be or include a food product to be treated.

The term "food product" as used herein generally refers to any material intended for consumption by a human or animal, including in forms suitable for consumption as a food, in forms suitable for being prepared by a consumer (alone or in combination with other ingredients) into a consumable food, and in preliminary or intermediate forms during any stage of processing prior to achieving a consumable form. Food products include raw agricultural products (whether as harvested or in an initially synthesized form for synthesized materials) to be processed into a form for distribution or sale the food marketplace of for consumption and each intermediate form during processing to prepare such a form for distribution, sale or consumption. For example, food products include harvested vegetables in raw harvested form as well as intermediately processed forms prior to form for distribution, sale or consumption (e.g., washed, sliced, chopped, minced, mashed, blanched, parboiled, cooked, frozen, preserved, packaged and blended forms). Likewise, food products include initially butchered meat as well as intermediately processed forms prior to a form for distribution, sale or consumption (e.g., cut, preserved, packaged, partially-cooked, frozen, cooked, packaged, or mixed (with other ingredients) forms). Similarly, food products include harvested fish and seafood in raw harvested form, as well as intermediately processed forms prior to a form for sale or consumption. Typically, however, food products are inanimate, not including animals (living beings) but including carcasses.

The term "acyl group", as used herein, is a —C(O)R' group, where R is generally a hydrocarbon-based group and more specifically is an alkyl group, or aryl group (e.g., phenyl or benzyl). An acetyl group is a type of acyl group where R' is a methyl group, i.e., —C(O)CH₃. An "acyl donor", particularly an "acetyl donor", functions to transfer an acyl or particularly an acetyl group, respectively, to another chemical species. "Acyl Donor" includes, but is not limited to, an acetyl donor chosen from the group including: monoacetin, diacetin, triacetin (TA), acetylsalicylic acid, and tetraacetylethylenediamine (TAED). "Acyl donor" refers to a material that provides an acyl group for preparation of the peracetate-ROS formulations whereas "acyl donor group" refers to an acyl group on an acyl donor that is available on the acyl donor material to be transfer for preparation of the peracetate-ROS formulation.

The term "alkali" or "alkali concentrate" includes any alkali material. In a preferred embodiment, alkali is an aqueous sodium hydroxide solution, or an aqueous potassium hydroxide solution.

The term 'acidulants" includes any acid used to impart acidity to a substrate. Nonlimiting examples of acids useful in the invention may include: hydrochloric, sulfuric, acetic, formic, lactic, citric, malic, and other acids. Acids may be inorganic or organic acids.

The term "side reactions" includes any chemical reaction that occurs at the same time as the actual main reaction, but to a lesser extent. It leads to the formation of by-product, so that the yield of main product is reduced.

The term "byproducts" means any additional substance that results from a chemical reaction. Byproducts may be useful as co-solvents, pH buffers, chelating agents or stabilizers. For example, the byproduct of monoacetin, diacetin and triacetin is glycerol, a potential co-solvent that is readily biodegradable. Another example is the byproduct of TAED (tetraacetylethylenediamine) which is DAED (diacetylethylenediamine), which can act as a chelating agent for transition metal ions and potentially serve as a peroxide stabilizer. Another example of a byproduct is the carboxylic acid produced after a peracid reacts with a material in a chemical oxidation process or decomposes. Acetic acid, a byproduct of peroxyacetic acid, can serve as a co-solvent, an acidulant, a pH buffer, and a chelating agent.

The term "cleaning" in the context of food processing as used herein means the substantially complete removal of food soil, typically using detergents under recommended conditions and procedures.

The term "sanitize" means reduction of microorganisms to levels considered safe from a public health viewpoint.

The term "sterilize' refers to the statistical destruction of substantially all living organisms.

The term "disinfect" refers to inanimate objects and the destruction of substantially all vegetative cells.

The term "slurry" refers to a medium including solids dispersed in a liquid, and in food processing typically in flowable form, and includes certain food intermediates or byproducts resulting from processing for example fruits, vegetables and dairy.

The term "food processing" as used herein generally refers to any processing of a food product, from a raw harvested or initially synthesized form, prior to preparation of a food in a final form for consumption. Some examples of food processing include washing; peeling; cleaning; sanitization; slicing; chopping; mincing; mashing; cooking or partially cooking (e.g., blanching or par boiling); blending, mixing or combining with other ingredients; preserving (e.g., sterilization; sterile packaging or adding preservatives); refrigeration; freezing; and packaging. Food processing includes conversion of agriculture products to food, including so-called primary food processing to turn raw agricultural products into food which can be eaten, so-called secondary food processing to create food from ingredients that are ready to use, for example baking bread and so-called tertiary processing to creating what is sometimes referred to as "processed" food, for example potato chips or frozen meals.

The term "food contact surface" as used herein means any surfaces that come into contact with a food product or from which drainage onto a food product occurs during any stage of food processing. Food contact surfaces include, for example, cutting surfaces of counters or tables, interior surfaces of tanks and other vessels in which food is subjected to processing, surfaces of utensils (e.g., knives, spoons, mixers, spatulas, etc.) that contact food products, and surfaces of food product conveyors (e.g., belt conveyors, liquid or slurry conduits, vibratory conveyors, etc.).

The term "food additive" as used herein generally refers to any substance the affects the characteristic of any food. This includes any substance used in processing, and packaging. Additives are used to improve or maintain safety, freshness, taste, texture or appearance.

The term "pollutant" in the food processing context as used herein is generally defined as the presence in food or associated with food of toxic chemicals (elements or compounds) and/or biological contaminants which are not naturally present in food or are above their natural background levels (for those chemicals which are naturally found in some foods). These include disinfection byproducts.

References to peracid concentration (e.g., peracetate concentration) are to the concentration of the peracid anion (e.g., peracetate anion) component of the peracid salt (e.g., peracetate salt), that is excluding the mass of the metal component (e.g., sodium, potassium) of the peracid salt, on a weight/volume ratio, that is a weight (or mass) of the peracid anion to the total volume of the formulation. As will be appreciated, when a peracid-based formulation comprises the peracid component primarily in the form of a conjugate base (e.g., peracetate anion for peracetic acid-based formulation) as is the case with peracid salt-ROS formulations discussed herein having a very large molar ratio of peracid anion (e.g., peracetate anion) to peracid (e.g., peracetic acid), such as for example 10,000:1 or larger, a weight/volume concentration of the formulation measured in terms of an equivalent amount of peracetic acid will be close to the concentration of the peracid anion, and needs to be adjusted only to remove the mass of a dissociated proton.

In some embodiments the peracetate-reactive oxygen species formulation has a very alkaline pH as prepared, with the pH in a range having a lower limit selected from the group consisting of about pH 12.2, about pH 12.3, about pH 12.4 and about pH 12.5 and having an upper limit selected from the group consisting of about pH 13.5, about pH 13.2, about pH 13.0 and about pH 12.9, and with one preferred range being from about 12.5 to about 13.5 and with another preferred range being from pH 12.5 to pH 12.9. As will be appreciated, the peracid-reactive oxygen species formulations are typically aqueous compositions. Also as will be appreciated, the peracetate-reactive oxygen species formulations will be non-equilibrium compositions that will degrade over time. However, the combination of very alkaline pHs with minimal excess acyl donor groups at which the peracetate-reactive oxygen species formulations are prepared provide advantages of contributing to reduction of side reactions during preparation and slower degradation of the non-equilibrium composition until the non-equilibrium composition is subjected to a lower-pH environment, for example as would be the case when added to a liquid composition to be treated that is at a lower pH, or is contacted with a solid object surface to be treated.

In some embodiments the peracetate-ROS formulation has a peracid anion to peracid molar ratio in a range having a lower limit selected from the group consisting of about 10,000:1, about 15,000:1 and about 18,000:1 and an upper limit selected from the group consisting of about 40,000:1 and about 38,000:1. One preferred range is from 15,000 to 40,000, and a more preferred range is from 18,000 to 38,000. In one a preferred embodiment the peracid anion to peracid ratio is from about 18,970:1 to about 37,880:1. This ratio of peracid anion to peracid enables a preferred calculated pH range of about 12.5 to about 12.8 for the peracetate-ROS formulation of the present invention.

In some embodiments an alkali hydrogen peroxide solution is generated using a molar ratio of hydrogen peroxide to alkali in the range having an upper limit selected from the group consisting of 1:0.8, 1:0.9 and 1:1.0 and a lower limit selected from the group consisting of 1:1.5, 1:1.3, 1:1.2 and 1:1.18, and with one preferred range being from 1:1.0 to 1:1.2 and another preferred range being from 1:1.0 to 1:1.18.

In some embodiments the peracid salt-ROS formulation is produced by mixing the alkali hydrogen peroxide solution with an acyl donor such that the molar ratio of hydrogen peroxide to acyl donor groups, and preferably acetyl donor groups, is in a range of having a first limit (upper limit) selected from the group consisting of 1:1.0, 1:1.05, 1:1.08 or 1:1.10 and a second limit (lower limit) selected from the group consisting of 1:1.25, 1.23, 1.20, or 1.18, with one preferred range being from 1:1.0 to 1:1.23, another preferred range being from 1.1.0 to 1:1.20, yet another preferred range being from 1:1.05 (and more preferably from 1:1.08) to a selected upper limit and preferably the selected upper limit is 1.123, more preferably 1.120 and even more preferably 1.18. Any ratios described herein can be alternatively stated simply as the decimal quotient value for the ratio. For example, a ratio of 1:1.10 could alternatively be stated as 0.91 (the quotient of 1/1.10). Also, some ratios are discussed herein in an alternative format with the components of the ratios reversed, and for which the quotient value will be a reciprocal value. For example, the discussion below includes references to the molar ratio of hydrogen peroxide to acyl donor groups. As one example, a molar ratio of acyl donor groups to hydrogen peroxide of 1.20:1 (or more simply stated as a quotient value of 1.20) is the same as a molar ratio of hydrogen peroxide to acyl donor groups of 0.83:1 (or more simply stated as a quotient value of 0.83).

In some embodiments the peracetate-ROS formulation has a molar ratio of peracid anions, preferably peracetate anions, to hydrogen peroxide of greater than about 16:1.

In some embodiments a peracetate-ROS formulation, which may be considered to be in the form of a prepared concentrate, is produced with a peracetate concentration (on a peracetate basis, excluding the salt metal such as sodium or potassium) in a range having a lower limit selected from the group consisting of about 1.0% wt/vol, about 2.0% wt/vol and about 3.0% wt/vol and an upper limit selected from the group consisting of about 8.0% wt/vol, about 6.0% wt/vol and about 5% wt/vol, with one preferred concentration range being from about 2.0 wt/vol to about 6.0% wt/vol and a more preferred concentration range being from about 3.0% wt/vol to about 5% wt/vol.

In some embodiments the acyl donor is an acetyl donor, with one preferred acetyl donor being triacetin. Although much of the description herein is presented in terms of acetyl donor, the same principles apply to other acyl donors.

In some embodiments the hydrogen peroxide in the formulation is no more than, and preferably less than, 10 mg/L. The limit for level of detection for hydrogen peroxide is 10 mg/L by one common hydrogen peroxide analysis technique.

In some embodiments the production efficiency in this improved formulation can be defined as the efficiency of hydrogen peroxide use and/or efficiency of triacetin (or other acetyl donor) use relative to the theoretical limit of complete conversion to peracetic acid of a stoichiometric molar feed ratio of hydrogen peroxide to acetyl donor groups of 1:1 (which equates to a molar ratio of hydrogen peroxide to triacetin of 1:0.33 when triacetin is used to provide the acetyl donor groups). For example, peracetate may be made at a 98% conversion efficiency of hydrogen peroxide and 90% conversion efficiency of triacetin. However, this is not a limitation on the molar ratio ranges of ingredients or the product formulation. One very useful measure for evaluating production efficiency with the present invention is the conversion efficiency of hydrogen peroxide to peracetate, since the hydrogen peroxide will typically be provided in an amount equal to or no larger than, and more typically somewhat smaller than, a stoichiometric amount relative to acetyl donor groups. Under conditions with a stoichiometric or molar deficiency of hydrogen peroxide, 100% conversion efficiency of hydrogen peroxide to peracetate represents a maximum theoretical conversion efficiency, regardless of the magnitude of the molar excess of acetyl donor groups used. Surprisingly, and unexpectedly, the conversion efficiency of hydrogen peroxide is seen to increase even as the molar excess of acetyl donor groups is decreased to below a threshold molar ratio, and this surprising and unexpected result is thought to be a consequence of a marked reduction in side reactions that result in a lower yield of peracetate relative to the feed of hydrogen peroxide. In this respect, the amount of peracetate in a prepared peracetate ROS formulation is determined as an equivalent quantity of peracetic acid. Also surprisingly, even with a lower molar excess of acetyl donor groups to hydrogen peroxide, the prepared nonequilibrium peracetic acid salt compositions are prepared with very low residual levels of hydrogen peroxide, which is highly advantageous to performance of the non-equilibrium peracetic acid salt compositions for oxidation applications employing singlet oxygen, because hydrogen peroxide is a very efficient quenching agent for singlet oxygen and as residual concentrations of hydrogen peroxide increase, the practical benefit of singlet oxygen generation decreases. That residual hydrogen peroxide concentrations did not increase to unacceptable levels as molar excess of acetyl donor was decreased toward stoichiometry with hydrogen peroxide in reactants was a surprising and highly advantageous result.

Extensive testing was performed to delineate and confirm advantageous parameters for the nonequilibrium peracid salt compositions and methods of preparation.

In some embodiments the alkali:acetyl donor groups ratio is at least 1:1, and preferably somewhat larger than 1:1, on a molar basis, and preferably the alkali is sodium hydroxide.

In some embodiments, the levels of total organic carbon (TOC), biochemical oxygen demand (BOD) and chemical oxygen demand (COD) of this improved formulation are lower than the original range described in the prior art and is also an advantage over equilibrium peracetic acid.

In some embodiments the mass of chemical ingredients for generating the improved formulation range is lower than the ranges found in the prior art. For example, the hydrogen peroxide:triacetin ratio of the prior art used 2.37 to 5.19 lbs chemical feeds (100% basis) to produce 1.0 lb of peracetic acid equivalents (excluding the sodium). In contrast, the hydrogen peroxide:triacetin ratio of the present invention uses 2.00 to 2.25 lbs chemical feeds (100% basis) to produce 1.0 lb of peracetic acid equivalents (excluding the sodium). For comparison, equilibrium peracetic acid uses approximately 4.75 lbs chemical feeds (100% basis) per pound of peracetic acid. Some advantages associated with the chemistry of the peracetate ROS formulation and preparation method of the present invention are lower material, transportation and storage costs associated with smaller chemical feedstock quantities and increased safety from having less chemicals brought to and handled at a facility.

In some embodiments the improvements to the chemistry formulations used to produce the peracetate-ROS formulation of this invention enable the reliable production at high efficiency and large scale for industrial uses by batch, semi-continuous, or continuous process methods.

Technical improvements and benefits of the improved formulations include:

Higher production efficiency is achieved with low excess acetyl donor groups use.

More consistent and increased stability of product for maintaining product concentration before it decreases below the LCL (lower concentration limit) for biocidal uses.

Increased consistency of production processes to generate peracetate-ROS product formulations regarding output concentration, production efficiency, pH, and degradation rate.

Lower total organic carbon (TOC) levels in the product than previous formulation range of the prior art.

In some embodiments enhancing the peracetate product formulation with additives can be achieved with greater precision. This is due to greater purity of the peracetate product and elimination of excess hydrolysis reactions producing acetic acid and glycerin. This is a more "pure" sodium peracetate solution than prior art approaches.

In some embodiments adding triacetin after producing peracetate solution is a method for slowly producing acetic acid without degrading the peracetate concentration. This is a method for activating the peracetate solution at a moderate rate over time.

In some embodiments adding this improved formulation to a media having a pH less than about 12 results in greater oxidative activity than peracetic acid according to the oxidation-reduction potential (ORP) response or technical effect. In some embodiments adding this improved formulation to a media having a pH less than about 11, and more preferably having a pH less than about 10, results in greater oxidative activity than peracetic acid according to the oxidation-reduction potential (ORP) response or technical effect. In some embodiments adding this improved formulation to an acidic media produces greater oxidative activity than peracetic acid according to oxidation-reduction potential (ORP) response or technical effect.

A limitation of the prior peracetate formulations was a significant loss of production efficiency when the molar ratio of hydrogen peroxide to acetyl donor groups was greater than 1:1.5 when using acetyl donor materials, especially triacetin. This loss was caused in part by the slow dissolution rate of the acetyl donor material (e.g., triacetin) in water, which can result in slowing the reaction rate with alkali hydrogen peroxide and allowing side reactions to occur which reduced production efficiency. Using a greater excess of acetyl donor material increased the reaction rate with alkali hydrogen peroxide to increase production efficiency and minimize hydrogen peroxide residual in the product formulation. The "production efficiency" refers to the conversion efficiency of hydrogen peroxide to peracetate and represents a total measure of how effectively competing reactions are being minimized in the production process.

It was discovered that efficiency losses were caused substantially by chemical side reactions inherent to the prior method/formulation. One side reaction between the peracetate product and excess acetyl donor material discovered in this invention is capable of reducing the pH of the reaction solution rapidly enough during the production process to cause the desired reaction between alkaline hydroperoxyl anion and acetyl groups to slow down and even stop. If the desired reaction is slowed by an excessive reduction of pH during the production process, unreacted hydrogen peroxide (in hydrogen peroxide form) will rapidly react with the peracetate anion resulting in the degradation of the peracetate product. This issue could be minimized by increasing the amount of caustic (e.g., sodium hydroxide) added to the reaction relative to the hydrogen peroxide. However, excessive amounts of caustic would also compete in the reaction with acetyl groups thereby reducing production efficiency. Thus, controlling and limiting the chemical side reactions can improve efficiency losses.

An inherent characteristic of the chemistry is that as the production efficiency decreases, the concentration of peracetate that can be produced decreases. For example, as production efficiency decreases below 90% (% hydrogen peroxide conversion to peracetate and not lost to degradative side reactions) the concentration of peracetate that can be made in the product solution decreases to less than about 3% (as PAA) and chemical feedstock consumption and cost increase significantly. A correlation has also been observed between lower production efficiency and shorter working time due to lower product stability.

In some embodiments, the residual hydrogen peroxide concentration in the peracetate-reactive oxygen species product solution is less than about 1500 mg/L, and preferably less than 750 mg/L. In some embodiments the residual hydrogen peroxide concentration in the peracetate-reactive oxygen species product solution is less than 400 mg/L and preferably less than 10 mg/L, below the level of detection.

A key aspect of the improved formulation was discovered where a hydrogen peroxide:acetyl donor groups molar ratio of 1:1.0 to 1:1.20 (hydrogen peroxide:triacetin—molar ratio of 1:0.33 to 1:0.40) provided an abrupt change in pH behavior, production efficiency, and decay rate of the peracetate product solution in comparison to that described in prior art. The observed "threshold" of these changes can be described as a point where the amount of excess acetyl donor groups present in the production process is reduced to below a critical concentration where the rate of side reactions that compete with the desired reaction between the hydroperoxyl anion and acetyl donor are reduced more than expected in proportion to incremental changes made in the production method.

Below is a listing of major competing reactions during and/or after production of a peracetate-ROS formulation and a description of each of the reactions:

1. $HOO^- + TA \Rightarrow PAc^- + $ glycerol byproduct

2. $PAc^- + PAA \Rightarrow OAc^- + HOAc + {}^1O_2$

3. $PAc^- + H_2O_2 \Rightarrow OAc^- + {}^3O_2 + H_2O$

4. $PAc^- + TA \Rightarrow HOAc + PAc^- + $ glycerol byproduct

5. $NaOH + TA \Rightarrow NaOAc + $ glycerol byproduct

In the noted reactions, TA represents triacetin, $PAc^-$ represents peracetate anion, PAA represents peracetic acid, $OAc^-$ represents acetate anion, HOAc represents acetic acid, ${}^1O_2$ represents singlet oxygen, ${}^3O_2$ represents triplet oxygen and NaOAc represents sodium acetate.

Reaction 1 is the desired reaction for the production of peracetate in the product solution, this is a rapid mildly exothermic reaction.

Reaction 2 is desired to produce ROS once the peracetate is made and put into use, this reaction accelerates as pH decreases into a more activated pH range of less than pH 12.

Reaction 3 occurs very rapidly when there is excess hydrogen peroxide in the presence of peracetate anion and is an exothermic reaction.

Reaction 4 was discovered in this invention to be significant in rate, however, it was not obvious because it has no direct impact on peracetate concentration or reaction mixture solution temperature.

Reaction 5 occurs at a moderately rapid rate, but is slower than reaction 1 and can be minimized by using as little excess sodium hydroxide as necessary.

Reactions 3 and 4 are the most rapid and impactful side reactions that can occur during the peracetate production process. Reaction 3 causes rapid consumption of peracetate, heating of the reaction mixture and product solution, and loss of peracetate production efficiency. Reaction 3 occurs to a significant extent if process conditions cause the rate of the desired reaction 1 to slow down or an excessive amount of hydrogen peroxide residual remains in the product solution.

Reaction 4 reduces the pH of the reaction mixture causing reaction 1 to slow and reaction 3 to accelerate resulting in loss of production efficiency and concentration. Reaction 4 can lead to a premature decrease of pH in the reaction mixture, which slows or stops the reaction to form peracetate because the hydroperoxyl anion $HOO^-$ is converted to hydrogen peroxide through its acid-base equilibrium. Additionally, as the reaction solution pH decreases, the rate of reaction 2 increases and produces more singlet oxygen at the expense of consuming peracetate, which also results in shortening the product lifetime or working time. It is desirable to not promote reaction 2 until the product solution is put into use.

Table 1 below illustrates the relative impacts of the two side reactions (reaction 2 and 3) on the degradation rate of the peracetate product. Reducing or eliminating these side reactions after the peracetate production process increases the half-life or working time of the concentrated product solution before use. Reducing or eliminating these side reactions during the peracetate production process increases feedstock conversion efficiency (production efficiency) and reduces feedstock consumption per unit of peracetate product, which results in reduced production reaction byproduct residuals and total organic (TOC) in the product solution.

TABLE 1

Comparison of pH and peracetate concentration over 60 minutes for the
peracetate-ROS formulation prepared by the new method of this invention
when left to stand at room temperature as-made and when spiked with triacetin (molar
ratio of 1:1.1 PAc⁻:acetyl donor groups) or hydrogen peroxide (molar ratio
of 1:0.57 PAc⁻:hydrogen peroxide).

| | PAc⁻ pH | PAc⁻ Conc | PAc⁻ + TA pH | PAc⁻ + TA Conc | PAc⁻ + HP pH | PAc⁻ + HP Conc |
|---|---|---|---|---|---|---|
| T = 0 min | 12.8 | 4.50% | 10.7 | 4.50% | 11.5 | 4.50% |
| T = 60 min | 12.3 | 2.79% | 8.9 | 1.37% | 12.5 | 0.87% |

PAc⁻ + TA is an example of reaction 2 accelerated by reaction 4
PAc⁻ + HP (hydrogen peroxide) is an example of reaction 3

In this invention, important production process improvements are made to prevent the reduction in reaction rate of reaction 1, minimize the rate or occurrence of competing reactions, and prevent the buildup of unreacted acetyl donor material (triacetin) in the reaction mixture, reactor process or product working tank. What is unexpected in enabling these improvements is an abrupt change (reduction) in relative rates of competing reactions at a threshold ratio or concentration of acetyl donor (triacetin) outside the range cited in prior art while producing a peracetate solution capable of efficiently generating singlet oxygen with the characteristics described above. Although optimizing a continuous production process design and its components can compensate for some of these limitations, developing a method to better control the underlying chemical reactions is a more reliable method to improve production process efficiency and consistency.

Alkyl peroxide products used for water treatment, microbial control, and sanitization applications introduce a residual level of total organic carbon (TOC) into a treated water and effluents, which can potentially be a carbon substrate supporting microbial growth (COD) and biological oxygen demand (BOD). A benefit to the improved formulation is that it reduces TOC significantly for an alkyl peroxide-based product compared to prior art and especially compared to equilibrium peracetic acid formulations commonly used. The production method produces an improved peracetate-ROS formulations having measured TOC:peracetate anion mass ratio of 0.51, whereas the TOC:peracetate anion mass ratio in prior art (PAA) is in the range of 0.96 to 1.44.

Producing a peracetate-ROS formulation with a TOC:peracetate anion mass ratio of less than about 0.60 is a preferred advantage of the invention. BOD and COD measurements were also made and the improved peracetate formulation was found to have significantly lower BOD and COD measurements relative to peracetic acid.

In some embodiments, a method to produce a peracetate-reactive oxygen species formulation solution capable of efficiently generating singlet oxygen with the formulation described above.

In some embodiments, a method for generating a peracetate-reactive oxygen species formulation, comprises: generating an alkaline hydrogen peroxide solution having a molar ratio of hydrogen peroxide to alkali in a range having an upper limit selected from the group consisting of 1:0.8, 1:0.9 and 1:1.0 and a lower limit selected from the group consisting of 1:1.5, 1:1.3, 1:1.2 and 1:1.18, and with one preferred range being from 1:1.0 to 1:1.2 and another preferred range being from 1:1.0 to 1:1.18 of about 1:1.0 to about 1:1.2; mixing the alkaline hydrogen peroxide solution with an acetyl donor producing a peracid concentrate; the peracid concentrate generating the peracetate-reactive oxygen species formulation having a pH value from about pH 12.2 to about pH 13.5, and preferably from about 12.5 to about 13.5.

In some embodiments, a hydrogen peroxide:acyl donor groups ratio (or acetyl donor concentration) is beyond a threshold where competing side reactions are reduced to rates significantly less than the reaction between hydroperoxyl anion and acetyl donor. In some embodiments this molar ratio of hydrogen peroxide to acetyl donor groups is from about 1:1.0 to about 1:1.25.

In some embodiments, a method to produce a peracetate solution formulation, having a peracetate concentration of about 2% wt/vol or 5% wt/vol, wherein the production efficiency is equal to or greater than about 90% efficiency (based on hydrogen peroxide conversion to peracetate).

In some embodiments, a method to produce a peracetate solution formulation, having a peracetate concentration in a range from about 3.0% wt/vol to about 8.0% wt/vol, wherein the production efficiency is equal to or greater than about 95% efficiency (based on hydrogen peroxide conversion to peracetate).

In some embodiments, a peracetate solution formulation (>2% peracetate) with peracetate concentration that decreases less than 5% of the initial concentration within 5 to 10 minutes following its production. This formulation can be used in sanitization.

In some embodiments, a peracetate solution formulation having a TOC:peracetate mass ratio of not greater than, and preferably less than, 0.60 for use in water treatment, microbial control and sanitization.

In some embodiments a peracetate-ROS solution formulation, is a diluted formulation that is diluted to a point of use concentration having an extended working time. A preferable extended working time can be up to 120 minutes depending on the use. Uses of the diluted formulation may include for example sanitizing solutions. In some variations of such embodiments, the diluted formulation has properties of pH, molar ratio of peracetate anion to peracetic acid, and molar ratio of peracetate anion to hydrogen peroxide as described herein for the peracetate-ROS formulations.

The improved formulation can be efficiently produced in a "continuous" process as compared to the prior art feedstock ratio range wherein reducing the alkali hydrogen peroxide:triacetin molar ratio to less than 1:0.5 (a 1:1.5 hydrogen peroxide:acetyl donor groups molar ratio) did not make the desired formulation efficiently and degraded more rapidly over time.

This previous practical (ratio) limit is thought to be due to a limitation caused by the relatively low water solubility limit of the acetyl donor material (e.g., triacetin) and a slow dissolution rate into water. A slow dissolution rate allows time for undesirable competing reactions to occur that reduced the product yield and process efficiency relative to the limiting reagent, hydrogen peroxide.

However, the improved formulations have shown that competing side reactions can be significantly reduced in a specific formulation range outside of the formulation range taught in prior art while maintaining the most important features for singlet oxygen generation activity.

The ability to reduce the molar excess of acetyl donor groups to below 1.25 times the molar quantity of hydrogen peroxide while maintaining high conversion efficiency (≥90% relative to hydrogen peroxide consumption and losses) led to unexpected changes in behavior of the product formulation. One significant change is that the pH of the reaction process solution is maintained in a higher range than the formulation range of the prior art. During the reaction between the hydroperoxyl anion and acetyl donor group, if the pH drops too rapidly below about pH 12.2 (approaching the pKa of hydrogen peroxide of 11.6), the desired reaction slows down or stops. This new pH behavior provides a key benefit for keeping hydrogen peroxide substantially in its alkaline, anion form throughout the entire reaction period while in the presence of elevated concentrations of reactants and products. This is an advantage for preventing competing reactions which reduce production efficiency, make the product less stable, and produce higher residual total organic carbon (TOC).

For water treatment, the higher pH of the product concentrate made by the improved method does not significantly impact the pH of water it is added to since there is a low amount of NaOH in the product solution. Alkali pH of the product concentrate is primarily due to the sodium peracetate, which is analogous to the pH effect of other weak acids, in their conjugate base forms, having pKa greater than 7 (e.g., sodium carbonate).

In some embodiments the improved product formulation remains in an elevated pH range without decreasing rapidly during and after production. This new behavior led to the discovery of how peracetate can unexpectedly produce acetic acid by reaction with acetyl donor groups without consuming the peracetate in the product. The reaction between peracetate and acetyl donor groups presumably occurs by the peracetate acting as a nucleophile (similar to hydroxide or hydroperoxide anion), which adds to the carbonyl carbon of the acetyl group followed by displacement and water hydrolysis to form acetic acid, an alcohol byproduct of the acetyl donor molecule, and recovery of the peracetate anion.

The pH of the product solution does decrease slowly over time as a result of sodium peracetate (pKa=8.2) being consumed to form acetate and acetic acid (pKa=4.7), but not as rapidly as in the presence of excess acetyl donor groups.

The improvements to the peracetate-ROS formulation production method and formulation solves the above disadvantages. The improved method provides stoichiometric, or nearly stoichiometric, use of the acetyl donor groups relative to hydrogen peroxide. The most material-efficient and cost-efficient hydrogen peroxide:acetyl donor groups molar ratio is 1:1 and reaching this ratio could be achieved in practice while maintaining high production efficiency, minimal hydrogen peroxide residual, and high ROS activity. The improvements have led to the development of a peracetate-ROS product formulation that is different in composition and solution behavior after production, compared to the prior art. The improvements create a more consistent product produced from a continuous generation system regarding output concentration, production efficiency, pH, and degradation rate. A slower degradation rate was achieved for peracetate-ROS formulations, which provides a longer working time to use the chemistry or dilute the chemistry to a point of use concentration before significant loss in assay occurs.

Maintaining a high reaction rate between the hydroperoxyl anion and triacetin throughout the reaction process was critical to preventing other side reactions. Reducing the excess of triacetin used in the production process was beneficial to reducing the likelihood of this buildup occurring.

Maintaining a high reaction rate between the hydroperoxyl anion and triacetin throughout the reaction process was beneficial to reducing the likelihood of the buildup occurring.

An unexpected result was obtaining a high reaction rate with triacetin in which all three acetyl donor groups reacted rapidly with HOO— to form the peracetate anion in high yield in a continuous production process. And doing so without a large excess of NaOH. This is in contrast to prior art where the reaction with triacetin was slower, requiring an excess to react quickly enough to avoid undesirable side reactions. A correlation has been made between high yield or high efficiency to produce peracetate and the product solution stability.

In an embodiment technical improvements and benefits of use of the improved formulations in processing include:

Lower carbon content in the formulation product measured as BOD, and COD reflecting less carbon byproducts formed as compared to previous formulation.

Less BOD and COD in effluents to be treated prior to discharged to surface water (river). Lower effluent treatment cost and lower impact on treatment capacity of a treatment facility.

Lower VOC (minimal excess acetyl groups that can be hydrolyzed to acetic acid; higher caustic ratio to keep peracetate product and acetate byproduct in non-volatile anion form, ionized form).

No VOC emissions when used as-made in pH neutral to alkaline environments.

Provide odor control without adding VOCs.

Higher "stability index" provides longer working time and less off-gassing of oxygen before use.

Less $O_2$ gas release in a dispensing line before use (Improved stability)

Higher "stability index" enables higher product concentrations to be made that are practical to use (working time, off-gassing), which reduces equipment size/capacity and diluent water volume.

Less diluent water volume needed for making product. Diluent water is city water or non-potable water (river, recycled) that may require softening and/or filtration or other treatment.

Less acidulant needed to reduce pH of product (minimized acetate byproduct competing for acid).

Less VOC in acidified PM3 with less acetate byproduct from minimal excess acetyl groups.

Acidified sodium peracetate (aPM3) is produced by the method of generating sodium peracetate solution and adding an appropriate amount of acid to neutralize residual sodium hydroxide in solution and to transform greater than about 50% of peracetate anion to the peracetic acid form. Preferably greater than about 60% of the peracetate in the peracetic acid form, preferably greater than about 80% of the peracetate in the peracetic acid form, preferably greater than about 90% of the peracetate in the peracetic acid form, and preferably greater than about 99% of the peracetate in the peracetic acid form depending on the use application and technical effect desired. The calculated ionization curve of a 5.8% w/v sodium peracetate concentration at 25° C. is provided in FIG. 1 as an example of this pH-dependent transition, left to right, from the as-made alkaline peracetate form to the acidified peracetic acid form.

The use conditions or process conditions in which the sodium peracetate formulation is used may dictate the extent of acidification in addition to the extent of conversion of peracetate to peracetic acid. The pH of the peracetic acid solution may be adjusted to match the pH of the substrate, article, material, or process fluid it is being added to, non-limiting examples include pH balance with tissue (meat, fish, people, plants), pH that minimizes corrosion, pH that matches a fermentation process pH, pH that enhances sanitization as in a sanitizing cleanser, pH that is acidic enough to maintain or modify a process pH.

The choice of acids include mineral acids and organic acids which are a source of hydrogen ions and have an acidity constant (pKa) less than about one order of magnitude greater than that of peracetic acid (i.e., pKa less than 9.2). Examples of mineral acids include sulfuric acid, hydrochloric acid, nitric acid, hydrofluoric acid, sulfamic acid and phosphoric acid, sodium bisulfate, and ammonium bisulfate. Examples of organic acids include formic acid, acetic acid, citric acid, malic acid and lactic acid. Some phenolic materials in lignin or byproducts of delignification may also contribute acid protons with acid groups having pKa values less than 10. Hydrobromic and hydroiodic acids can be oxidized to forms of bromine and iodine by the peracid, which could be useful, but these ions are reactive and change the oxidant species composition.

In an embodiment, the as-made sodium peracetate formulation may be acidified shortly after production by combining an amount of acid (acidulant) to the sodium peracetate solution in proportion to the amount of peracetate and excess alkali to reduce the solution pH to a predetermined pH level (e.g., pH 2 to pH 8) prior to use.

In an embodiment, the as-made sodium peracetate solution may be diluted with water to a lower concentration, such as a lower use concentration, and the diluted solution acidified by combining an amount of acid (acidulant) to the diluted sodium peracetate solution in proportion to the amount of peracetate and excess alkali to reduce the solution pH to a predetermined pH level (e.g., pH 2 to pH 8) prior to use.

In an embodiment, the as-made sodium peracetate solution may be combined with a dilution fluid comprising water and an acid (acidulant) to dilute the as-made sodium peracetate concentration to a lower use concentration in a solution with a predetermined pH level (e.g., pH 2 to pH 8) prior to use.

A product differentiator is a peracetic acid (PAA) product that is pH 4 or greater, especially a near-neutral pH PAA product. Equilibrium PAA and distilled PAA are very acidic having a pH range of about 1 to about 3, typically having a pH range of less than 2. What enables a near-neutral pH product from a practical standpoint are the absence of hydrogen peroxide (avoiding decomposition losses during and after pH adjustment) and the ability to produce it as needed without storage. No conventional PAA product solution can be stored for more than several hours in this higher pH range (due to the requirement of the composition to be a non-equilibrium PAA composition in this pH range) without refrigeration, and no more than several days with refrigeration.

The peracetate oxidant solution provides several different oxidant species in a single solution including the peracetate parent oxidant and several daughter products formed in-situ including singlet oxygen, hydroperoxyl radical, superoxide radical and combined forms that impart high oxidative-reductive potentials (ORP) that are desirable for and correlated with effective microbial control. The combination of multiple oxidant species along with a high ORP can help mitigate resistance of microbes to disinfectants.

A given application may employ separate contacting events which may be the same or different and which may employ the same formulation. A given application may employ contact with more than one formulation or precursor thereof. The environment and/or substrate may, for example, be contacted with an activated liquid formulation containing reactive oxygen species. Alternatively, the environment and/or substrate may be contacted with a liquid precursor formulation that will generate reactive oxygen species on activation and the formulation is activated as or after it comes into contact with the environment or substrate.

For example, the environment or substrate may itself provide for activation, such as providing acidity that affects ROS formation rates and changes in oxidant speciation, fragmentation behavior or reactivity caused by acid-base equilibria. One or more additional steps of activation to form additional reactive species may occur after the contact of the formulation or the precursor formulation with the environment and/or substrate. For example, redox active materials or charged materials including transition metal species, unsaturated organic materials, sulfides and suspended solids can interact with and react with the parent oxidant to initiate fragmentation of the parent peracetate oxidant leading to the formation of ROS. Thermal activation can also be used to increase the formation rate of ROS, increase the fragmentation rate of the peracetate and increase overall peracetate oxidant solution's antimicrobial activity, bleaching power and reactivity with impurities or substrates. Irradiation of peracetate-containing solutions with ultraviolet light may also be used to promote activation. Contact with the environment or substrate may be controlled by addition of a selected volume or concentration of formulation to the environment or in contact with the substrate. Alternatively, contact may occur by addition, including controlled addition of the substrate to the formulation.

Contact may be combined with stirring or other agitation, with scrubbing, scraping or other abrasive method if appropriate for the environment and/or substrate. Contact may be combined with removal of precipitant or other solids present or formed in the environment or on contact with the substrate. The environment or substrate may be pre-treated prior to contact.

In food treatment processes, the as-made alkaline sodium peracetate product (PM3) is preferred in some uses while acidification of the peracetate to a substantially peracetic acid form (aPM3) is preferred in other uses. The choice between PM3 and aPM3 is then based on the technical performance provided and/or the use or process conditions the oxidant is being used in.

In an embodiment, as-made alkaline sodium peracetate product (PM3) is directly applied to water streams, poultry chill tanks, dairy tanks, fermentation process streams, cooling water process streams, brining tanks and various other environments in food processing or other processing contexts.

In an embodiment the as-made alkaline sodium peracetate product (PM3) is diluted to less than 8000 ppm (sodium peracetate), and often to less than 2600 ppm (sodium peracetate) for use in food processing including but not limited to cleaning, sanitizing hard surfaces, food sprayers, tanks, package washing, sterilizing filling, and food packaging systems, CIP and COP applications, and pre and post-harvest applications.

In an embodiment the as-made alkaline sodium peracetate product is diluted to about 1 ppm to about 8000 ppm, preferably about 2 ppm to about 4500 ppm, preferably about 3 ppm to about 2600 ppm, preferably about 5 ppm to about 1100 ppm, more preferably about 10 ppm to about 300 ppm before being added to a food processing system. The diluted formulation can be used during but not limited to cleaning, sanitizing hard surfaces, food sprayers, tanks, package washing, CIP and COP applications, pre and post harvest applications. In some implementations, the as-made sodium peracetate product is diluted to a concentration range having an upper limit of about 8000 ppm, about 4600 ppm, about 2600 ppm, about 1300 ppm, about 1100 ppm, or about 300 ppm or even about 110 ppm and a lower limit of about 1 ppm, about 2 ppm, about 3 ppm, about 5 ppm, about 10 ppm or even about 40 ppm. Some additional example ranges for a diluted formulation include sodium peracetate of about 1 ppm to about 2600 ppm, about 3 ppm to about 1300 ppm, 5 ppm to about 1100 ppm, about 10 ppm to about 300 ppm and about 40 ppm to about 110 ppm before being added to a food processing system.

In an embodiment the as-made alkaline sodium peracetate product is diluted, for example into any of the concentration ranges identified in the prior paragraph, prior to acidification. For example, in some implementations the as-made alkaline sodium peracetate product is diluted to about 1 ppm to about 8000 ppm, preferably 2 ppm to about 4500 ppm, preferably about 3 ppm to about 2600 ppm, preferably about 5 ppm to about 1100 ppm, preferably about 10 ppm to about 300 ppm prior to acidification. Following acidification, the diluted and acidified formulation can be used during but not limited to cleaning, sanitizing hard surfaces, food sprayers, tanks, package washing, CIP and COP applications, pre and post harvest applications.

In an embodiment the diluted sodium acetate formulation is used in a food sprayer line wherein the food sprayer is used in a variety of applications including for example applying coatings, flavorings, antimicrobial agents, cleaning agents, and spray drying.

In an embodiment, the alkaline peracetate solution may be acidified shortly after production by combining an amount of acid (acidulant) to the sodium peracetate solution in proportion to the amount of peracetate and excess alkali to reduce the solution pH to a predetermined pH in the range from pH 2 to pH 8 prior to use.

In an embodiment, the acidified sodium acetate solution at a near neutral pH is directly applied to hard surfaces, food line spraying, tanks, CIP and COP indications, and pre and post harvest applications.

Measurement and monitoring of pH is essential during food processing as it results in consistent well defined food products, avoids consumer health issues and meets regulatory standards. The pH can affect look, taste, smell and quality of food as well as shelf life. The general pH range is from about 1.5 to about 10, with a pH of about 3 to about pH 7 for a majority of foods and uses. A pH of about 0 to about pH 4.6 is considered very acidic. Foods at pH 4.6 and below are generally considered high-acid foods and foods at pH above pH 4.6 are generally considered low-acid foods. Measurement of pH for food and during processing is very important for proper handling. pH measurements of liquid food samples which are mostly homogenous can be mea-sured directly. Semi-solid and solid food samples or inter-mediates are blended into a uniform paste and diluted as required for pH measurements.

Microorganisms require a specific pH range for growth. The minimum, optimum, and maximum pH required for microbial growth varies depending on the microorganism. Very low or very high pH values will prevent microbial growth during food processing. However, very few foods naturally have pH values low enough to completely inhibit the growth of microorganisms, especially yeasts and molds which can tolerate lower pH ranges than most bacteria.

Food processing methods are directed to control microbial growth or inactivate microorganisms in food products during processing to lower risk of foodborne pathogens or spoilage microorganisms. This control extends to equipment and surfaces throughout the processing facility. Microorganisms including yeast, mold and bacteria are very sensitive to pH during food processing, very low or high pH values can prevent microbial growth. However, additional treatments are usually necessary to maintain microbial control such as heat processing, pH control, acidification, and preservation.

In poultry processing, the improved peracetate product can be used in various steps/stages throughout the processing.

In poultry processing, temperature reduction is really the only non-chemical method to decrease bacterial growth, specifically pathogen but also spoilage bacteria, during processing. This temperature reduction is usually performed in a series of chilling tanks.

In poultry processing, federal regulations mandates that a broiler carcass is washed and is chilled to less than 4° C. within 4 hours of slaughter. This process is the first step in the cold chain for poultry meat processing and is very important for quality meat and food safety. If not properly managed the chiller tanks can become a source of cross contamination. Water quality is very important during this stage of processing, traditionally the pH of the water in these tanks is kept at 7 or above when using peracetic acid as an antimicrobial. Currently peracetic acid is the most common antimicrobial used however, chlorine, bromine, chlorine dioxide, cetylpyridinium chloride, organic acids, trisodium phosphate are also approved for use.

In an embodiment the as-made alkaline sodium peracetate product is diluted to about 1 ppm to about 2600 ppm, about 3 ppm to about 1300 ppm, about 5 ppm to about 1100 ppm, about 10 ppm to about 300 ppm, or even about 40 ppm to about 110 ppm, prior to addition to a chill tank.

In an embodiment, the improved peracetate product is added to a chill tank to maintain a concentration of about 3 ppm to about 2600 ppm, or about 3 ppm to about 1300 ppm, and, preferably about 10 ppm to about 300 ppm, or even about 40 to 110 ppm, of improved product in a chill tank.

In an embodiment, the improved peracetate oxidant is added to water in a chill tank to wash and chill broiler carcasses reducing microbial load.

In an embodiment, the improved peracetate oxidant is added to water in a chill tank to prevent the growth of *Salmonella* and *Campylobacter*.

In an embodiment, the improved peracetate oxidant is added to water in a chill tank maintained at a pH of at least 6. The peracetate oxidant performs well at alkaline pH making it effective for antimicrobial activity.

In an embodiment, the improved peracetate oxidant is added to water in a chill tank to reduce or replace common antimicrobials.

In an embodiment, the improved peracetate oxidant product can be used in kosher food processing.

In an embodiment, the improved peracetate oxidant product can be used in various stages of egg, fruit, grain, vegetable, poultry, and meat processing.

In an embodiment, the improved peracetate oxidant product can be used in dairy processing for the production of whey and lactose.

In an embodiment, the improved peracetate oxidant product can be used for commercial sterilization of aseptic filling systems, glass and plastic/polymeric food packaging.

Disinfection by-products (DBPs) are formed when disinfectants like chlorine interact with natural organic materials in water. As water is used extensively in food processing, DBPs are produced frequently and exposure to DBPs are linked to health risks. There are several categories of DPBs in processing of fresh-cut fruits and vegetables where disinfectants, especially chlorine, can react with natural organic materials (NOM). For example, in potato flume wash water the following have been found: nitrogenous DPBs (N-DPBs, like chloramines and chlorinated nitrogen compounds), carbonaceous disinfection by products (C-DPBs, like chlorinated tannin, lignin-like phenolics, chlorophyll, carotenoids, etc.), haloacetic acids (HAAs), trihalomethanes (THMs).

In an embodiment, using an ROS-generating peracetate oxidant formulation during food processing reduces demand for chlorine chemicals, reducing halogenated disinfection byproducts formation and emissions, and reducing effluent for treatment.

In some embodiments, the improved peracetate oxidant solution can be used over a wide range of temperatures for example from about 2° to about 95° C. depending on type of food processing.

In some embodiments, a method treating substrates further comprises a method of heating or maintaining the heat of the substrate in a range from about 38° C. to about 95° C., more preferably 60° C. to about 80° C. prior to or following contacting with a peracid composition. Thermal activation that accelerates ROS production rate is useful for treating the substrate. Peracetate oxidant solution can be thermally activated to enhance its production of ROS and biocidal activity. Thermal activation is useful throughout the treatment process.

Microbial control in water is imperative to a wide variety of processing and manufacturing systems. These systems can include food processing systems. Treatment of water for microbial control in food processing loops is critical for maintaining efficient processes, protecting equipment from biofouling and biocorrosion, preventing contamination of products, reducing downtime and protecting the health of people exposed to such processes and products. Furthermore, microbial control in water recycle loops also provides odor control by minimizing fermentation, hydrogen sulfide production and algal decomposition.

Microbial control in food processing serves to control sessile bacteria helping to prevent the accumulation of biofilm deposits which cause microbiologically influenced corrosion (i.e., biocorrosion). Slime deposits are often a combination of bacteria and fungi.

Microbial control may also occur on surfaces serving to clean, sanitize and/or disinfect the surfaces of a processing or manufacturing system. Microbial control targets include aerobic and anaerobic bacteria (slime formers, acid producers, metal depositors, nitrobacteria, sulfate reducers, nitrate reducers), fungi, algae, molds, spores and yeast. Some bacteria are pathogenic, for example, *Legionella pneumophila*, which poses health risks. Some algae, such as cyanobacteria, produce algal toxins that pose potential health risks.

Compounds used for microbial control need to be effective and efficient at neutral and alkaline pH. They also need to be effective at elevated levels of suspended solids (including silt, food intermediates, oils,) and dissolved solids (including salt, scaling minerals, carbonate, dissolved metals, scale inhibitors and other additives that may be encountered in various processes).

In some embodiments, a method provides for microbial control and reduction of oxidation byproducts in food processing water treatment, using highly active peracetate oxidant solutions. For example, water reuse at a potato chip manufacturing facility was provided by achieving several treatment objectives including: microbial control and odor control with the fast acting oxidizing peracetate-singlet oxygen chemistry, clarification to reduce suspended solids, foaming potential and oxidant demand. This processing resulted in production of solids that are suitable for agricultural uses (e.g., land application, fertilizer, compost) or use in biogas generation. It also minimizes the use of volatile organic compounds in the process to reduce air emissions and worker exposure to irritating or harmful vapors. Water treatment was accomplished by a chemical-physical process incorporating the sodium peracetate-singlet oxygen oxidation chemistry as an odor control and microbial control agent. A standard coagulant and floc polymer were used to help clarify suspended materials from the water by gravity settling or air flotation.

In some embodiments, the amount of peracetate oxidant solution used is dependent on the severity of contamination, the degree of microbial control desired and residual oxidant solution necessary for effective microbial control.

In some embodiments, the contaminated substrate can be sequentially dosed with peracetate oxidant solution until the degree of microbial control desired is reached and the sequential dosing has a synergistic effect on microbial control. The reducing of the microbial load prevents bacteria in the contaminated water from becoming anaerobic and prevents the formation of sulfides, ammonia, volatile organic acids which result in reduced release of volatile materials and odor control.

In some embodiments, a method is provided for reducing the microbial load in a slurry comprising contacting a population of microbes with a peracetate oxidant solution; and mixing said slurry with the peracetate oxidant solution.

In some embodiments, oxidation chemistry may be used for treatment of food processing as well as microbial control of contaminated water, reducing biological growth, disinfecting and sanitizing. The oxidation chemistry used may have minimal impacts on pH and scaling potential of fluids. A relatively short-lived active oxidant may be a benefit for avoiding negative impacts on food product quality and for minimizing oxidant corrosivity and environmental impacts. Selectivity of the oxidation chemistry towards different materials is also desirable for efficiency of oxidant use, compatibility with a variety of materials and avoidance of unnecessary or undesirable side reactions. Oxidant solutions that generate a variety of reactive oxygen species (ROS) in their treatment environments may be good candidates for achieving some or all of these attributes.

In an embodiment, the peracetate oxidant formulation is used during various stages of potato chip production. In general the processing of potatoes consists of peeling and washing the potatoes, slicing the potatoes to a uniform thickness (generally between 1.7-1.85 mm) and size (generally between 3-7 mm), cold water washing or blanching maybe used to remove starch in order to optimize taste, dehydrating to remove excess water, frying the chips at a temperature of about 160-180° C. for 2-3 minutes, degreasing the chips with a de-oiler to remove excess oil on the chip surface to maintain taste, seasoning of potato chips, cooling and sorting of chips and packaging. A peracetate oxidant solution can be used throughout the processing including but not limited to washing the potatoes, adding to waste water from blanching, dehydrating steps to clarify the water, as well as used to clean and sanitize equipment used throughout the process. Rejected potatoes and peelings are sent to be used for animal feed and starch that is removed in the rinsing process is sold for starch processing. The improved peracetate oxidant formulation can be used as-made, diluted and/or acidified depending on the requirements of the processing step.

In some embodiments use of the improved peracetate oxidant formulation improved potato chip processing and water reuse by achieving microbial control and odor control during processing, water clarification by reducing suspended solids, foaming potential and oxidant demand, and minimization of the use of volatile organic compounds reducing air emissions and worker exposure to harmful vapors.

In some embodiments use of the improved peracetate oxidant formulation reduces microbial load in waste water, food contact surfaces, and non-contact surfaces and equipment used during the processing.

In some embodiments, microbial control in water at slightly alkaline pH was compared between peracetate oxidant, chlorine bleach, peracetic acid and chlorine dioxide. Alkaline pH is encountered in a variety of applications where microbial control and sanitization is needed, including water treatment and chill tanks in poultry processing, a type of food processing. Some oxidants are less effective at sanitizing at alkaline pH such as chlorine bleach (hypochlorite) at a pH above its pKa of 7.5. Peracetate oxidant and chlorine dioxide performed well as antimicrobial disinfectants at slightly alkaline pH compared to peracetic acid and chlorine bleach, which had the lowest performance.

In some embodiments, peracetate oxidant solution is used for cleaning and sanitization. The cleaning and sanitization of equipment used for food, beverage and dairy processing and the sanitization of packaging, bottles and containers for packaging of these products is critical for protecting consumers from illness, prevent spoilage, increase shelf life, and maintain clean equipment and facilities. Common methods of cleaning and sanitizing equipment surfaces is conducted by soaking, spraying, clean in place (CIP) and clean out of place (COP) processes. CIP processes involve the preparation of cleansers and sanitizer solutions in day tanks (often in 50-500 gallon volumes) and dispensing them into interior surfaces of pipes, filters, tanks and other processing equipment that is not disassembled for cleaning. CIP is an automated method of cleaning which is faster, less labor intensive, repeatable and has less risk of chemical exposure. Generally, CIP cleans in several ways depending on the type of equipment used, for example in pipes CIP can deliver highly turbulent, high flow-rate solutions, wherein the turbulence will dislodge food intermediates and pathogens, on a substrate surface CIP can deliver low power spray to wet a surface in the case of a lightly soiled substrate and CIP can deliver a high power spray to highly soiled surfaces and substrates. Several factors affecting CIP include temperature of cleaning solution, concentration of the cleaning solution, contact time of the cleaning solution and turbulence of cleaning solution. COP is used when pieces of equipment and utensils cannot be cleaned where they are used and must be disassembled for cleaning non limiting examples include fittings, clamps, hoses, and impellers. The disassembled equipment is taken to a cleaning station where it is cleaned and sanitized as necessary before re assembly.

In some embodiments, one preferred ROS-producing oxidant formulation is a peracetate solution. The peracetate solution may include generating an alkaline hydrogen peroxide solution from the combination of an alkali and a hydrogen peroxide concentrate, mixing the alkaline hydrogen peroxide solution with an acyl donor such that a peracetate solution concentrate is formed. In some embodiments, the peracetate solution may include peracetate anions and a peracid. In some embodiments, the peracetate solution may include a pH from about pH 12 to about pH 13.5. In some embodiments, the peracetate solution has a molar ratio of peracetate anions to peracid ranging from about 10000:1 to about 40000:1. ROS-generating peracetate oxidant solutions may contain no hydrogen peroxide, and are produced on site and on demand at alkaline pH. The peracetate oxidant solution produces multiple ROS by itself and when placed into contaminated environments. In some embodiments, the ROS most important in peracetate oxidant solutions include singlet oxygen, superoxide radical, hydroperoxyl radical, acetyloxy radical and potentially other radical fragments. When a combination of these ROS are generated together in peracetate oxidant solutions they produce an oxidative-reductive potential (ORP) response in water that may exceed 900 mV (vs standard hydrogen electrode) around pH 7. These solutions may be more convenient and effective to use than other approaches. The dominant ROS may be selectively reactive such that they are effective in a variety of environments.

EXAMPLES

Example 1: Sanitizing Solution, Example Point of Use Sanitizing Solutions Made with Acidulant A microbial challenge solution was made with an environmental water sample that was fortified to increase its natural bacteria population to about $10^7$-$10^8$ cfu/mL. The challenge solution was made by filtering a 20 mL freshwater sample from a storage pond through a 5 micron filter to remove the majority of fungus. This was added to 980 mL of EPA AOAC hard water (US EPA SOP number MB-30-02) at 400 ppm hardness, which was fortified with 0.2 g dextrose, 0.2 g nutrient blend (5% total nitrogen, 4% phosphate, 6% potash) and adjusted to pH 7.5 with hydrochloric acid. The challenge solution was left to propagate at room temperature in aerobic conditions for 4 days before use.

The microbial challenge solution was examined by microscope analysis. Live samples showed a high density of motile bacteria, filamentous bacteria, and a very low density of fungus fibrils. Gram-stained microscope samples showed high populations of gram positive rod-shaped, round, spiral and filamentous bacteria types as well as a high density of gram negative rod-shaped bacteria. Terminal endospores were also observed.

The prepared microbial challenge solution was tested for microbial activity by adding 1 mL of challenge solution to 99 mL of AOAC hard water at pH 7.5 at room temperature and mixed briefly. Thirty seconds after mixing, culturable aerobic and heterotrophic bacteria were enumerated using dip slides with agar selective for aerobic bacteria growth (Sani-Check B, Biosan Laboratories) according to product instructions. Results, summarized in Table 2, showed a bacteria density of $10^6$ cfu/mL (Control Solution in Table 2).

A 4.5% w/v peracetate solution was prepared using triacetin as acetyl donor and with a molar ratio of sodium hydroxide to acetyl donor groups of 1.05 and a molar ratio of hydrogen peroxide to acetyl donor groups of 0.95. The 4.5% peracetate solution was prepared by adding 380.1 mL of distilled water to a 1 L glass beaker containing a magnetic stir bar. The liquid contents of the beaker were stirred at a high rate for vortex mixing while 41.7 mL of 25% NaOH solution was added to the beaker. To the mixing NaOH solution in the beaker was added 57.5 mL of 17.5% hydrogen peroxide. After 60 seconds of mixing an amount of triacetin was added providing 1.05 molar equivalents of acetyl donor groups relative to hydrogen peroxide, which was 20.7 mL triacetin added to the beaker. The reaction mixture was mixed for another 60 seconds at which time the reaction was considered complete and the product solution in each beaker immediately analyzed for peracetate concentration, pH, and hydrogen peroxide residual.

Peracetate concentration was measured as peracetic acid using a standard iodometric titration method. In this method a 0.50 ml sample of the concentrated peracetate solution was diluted into about 25 mL of distilled water. To this solution was added 1 mL of an ammonium molybdate reagent (HACH part no. 193332 containing 3-7% hexaammonium heptamolybdate) followed by addition of one packet of Sulfite 1 reagent (HACH part no 220399 containing potassium iodide and starch indicator). This solution was covered and mixed gently on a magnetic stir plate for 5 minutes. The mixture was titrated to a colorless endpoint with 0.100 N sodium thiosulfate solution and the volume of titrant measured to the nearest 0.05 mL.

Residual hydrogen peroxide in the concentrated peracetate solutions was measured by selectively forming the molybdate-hydrogen peroxide complex and measuring its concentration by UV-Vis absorption spectroscopy. The absorbance value measured at 330 nm was used to determine the hydrogen peroxide concentration relative to a calibration curve of absorbance vs concentration for a series of hydrogen peroxide standard solutions at 50, 100, 200, 300 and 400 mg/L hydrogen peroxide. The indicator molybdate solution was prepared by diluting 0.40 mL of ammonium molybdate reagent (HACH part no. 193332 containing 3-7% hexaammonium heptamolybdate) to 200 mL in distilled water. The indicator molybdate solution was calibrated by measuring the 330 nm absorbance for the series of hydrogen peroxide standard solutions. Test sample preparation was designed to fill a 3.5 to 4 mL volume cuvette with 1 cm pathlength for absorbance measurement in a standard UV-Vis spectrophotometer. To prepare a sample for measurement, a 0.200 mL volume of the concentrated peracetate solution, or hydrogen peroxide standard solution, was added to 2.80 mL of the prepared molybdate indicator solution. The absorbance spectrum was measured within 2 minutes of sample preparation. The spectrum of a blank sample (distilled water added to the molybdate indicator) was subtracted from the spectra of standard solutions and unknown samples prior to obtaining the background-corrected absorbance value. The unknown hydrogen peroxide concentration was calculated from the curve fit equation for the calibration standards and the measured absorbance value. The detection limit of this procedure is approximately 10 mg/L hydrogen peroxide in 45,000 mg/L peracetate.

The solution pH was measured using a high sodium pH electrode.

A first point of use sanitizing solution (Solution 1 in Table 2) containing 500 mg/L peracetate was prepared by adding 1.11 mL of a freshly prepared 4.5% peracetate solution to 97.89 mL of AOAC hard water and the mixture adjusted to pH 7.5 with hydrochloric acid. To the sanitizing solution was added 1.0 mL of the microbial challenge solution and this was briefly mixed. At 30 seconds contact time the peracetate was quenched with 1.3 mL of 1N thiosulfate solution. The culturable bacteria survivors were measured using dip slide agar for aerobic and heterotrophic bacteria. Results, summarized in Table 2, showed culturable bacteria to be below the detection limit (less than or equal to 10 cfu/mL) demonstrating that about a 5-log reduction in culturable bacteria was achieved.

A second point of use sanitizing solution (Solution 2 in Table 2) containing 500 mg/L peracetate was prepared by adding 1.11 mL of a freshly prepared 4.5% peracetate solution to 97.89 mL of AOAC hard water and the mixture adjusted to pH 7.5 with glacial acetic acid. To the sanitizing solution was added 1.0 mL of the microbial challenge solution and this was briefly mixed. At 30 seconds contact time the peracetate was quenched with 1.31 mL of 1.00 N thiosulfate solution. The culturable bacteria survivors were measured using dip slide agar for aerobic and heterotrophic bacteria. Results, summarized in Table 2, showed culturable bacteria to be below the detection limit (less than or equal to 10 cfu/mL) demonstrating that about a 5-log reduction in culturable bacteria was achieved.

TABLE 2

| | | | |
|---|---|---|---|
| Sanitization test results in AOAC hard water, 30 second contact time. | | | |
| | Control | Solution 1 | Solution 2 |
| Peracetate Conc. (mg/L) | 0 | 500 | 500 |
| Acidulant | Hydrochloric acid | Hydrochloric acid | Acetic acid |
| pH | 7.5 | 7.5 | 7.5 |
| Culturable bacteria (cfu/mL) | $10^6$ | ≤10 | ≤10 |

Example 2: Potato Chip Processing Facility Water Treatment for Reuse

A water sample was collected from a potato chip manufacturing facility from the outlet of the starch recovery stage. The water contained settleable starch solids, had a characteristic odor and generated a stable foam when shaken or mixed rapidly in a container. Several suspected constituents were evaluated including the presence of starch, sugars, phytochemicals, microbes, enzymes, and other plant materials. A significant variety of microorganisms were identified by microscope analysis at high population densities in the water sample as received. Bacteria morphologies were diverse and included coccus, *Bacillus*, Spirillum, Spirochete, and Filamentous Forms. The Most dominant bacteria types expected in this water source include *Staphylococcus thermophilus, Lactobacillus* Sp., and *Aquaspirillum* Sp. At least two types of fungus (budding yeast and fibril forms) were identified, *Saccharomyces* Sp. and *Candida* (e.g., *humilius* and *albicans*). Starch grains were also readily visible in the water.

A summary of general water quality parameters is shown in Table 3.

TABLE 3

| Water quality parameters for a blended water sample at room temperature | |
| --- | --- |
| Parameter | Untreated Water |
| pH | 6.52 |
| ORP (mV vs SHE) | 472 |
| Conductivity (mS/cm) | 1.7 |
| Total suspended solids (mg/L) | 627 |
| Total Solids (mg/L) | 4040 |
| Total Fe (mg/L) | <0.01 |
| Mg (mg/L CaCO$_3$) | 190 |
| Ca (mg/L CaCO$_3$) | 610 |
| SO$_4^{2-}$ (mg/L) | <0.1 |
| ATP (pg/mL) | 27,250 |
| Aerobic/Heterotrophic Bact. (cfu/mL) | >10$^7$ |
| Anaerobic Acid Producing Bact. (cfu/mL) | ≥10$^8$ |
| Anaerobic Sulfate Reducing Bact. (cfu/mL) | ≥10$^8$ |
| Fungus (cfu/mL) | ≥10$^8$ |

General aerobic/heterotrophic bacteria were enumerated with dip slides (agar coated paddle) while anaerobic acid producing and sulfate reducing bacteria were cultured in serial dilution culture bottles with phenol red dextrose and API-RP30 media, respectively. Fungus was estimated by microscope analysis for its presence in the phenol red dextrose culture broth in serial dilution media bottles.

The water was expected to contain several constituents (i.e., phytochemicals) extracted from potato skins, potato flesh and other plant materials including:

phenolic acids (gallates, cinnamic acid derivatives)

anthocyanins (phenolic pigments)

carotenoids glucose and higher sugars, glucosides fatty acids (linolenic, eleostearic)

phospholipids starch proteins catalase (enzymes)

Several of these materials have the potential to consume oxidizing biocides resulting in poor microbial control and high treatment cost. The most dominant constituents identified were starch, fatty acids, phenolic acids, proteins and catalase enzyme, which had the highest oxidant demand. Starch and fatty acids were the likely cause of significant, stable foam formation in agitated samples.

Adding oxidants directly to the water as received resulted in rapid consumption of the oxidants. A qualitative comparison was made to test for the impact of catalase enzyme on hydrogen peroxide (3% solution), peracetate (2% solution), and peracetate (2% solution) pre-acidified to pH 4.0 to convert it into the peracetic acid form. The peracetate solution was prepared using triacetin as acetyl donor and with a molar ratio of sodium hydroxide to acetyl donor groups of 1.05 and a molar ratio of hydrogen peroxide to acetyl donor groups of 0.95. The pre-acidified peracetate solution was prepared by adding about 7.2 mL of 4.0 N sulfuric acid as acidulant to 100 mL of the prepared peracetate solution. A 4 mL volume of each oxidant solution was added to 40 mL of untreated water at room temperature in separate 150 mL beakers. Upon addition of hydrogen peroxide, the water immediately became effervescent and formed a thick head of stable foam approximately 1 inch thick after 4 minutes. Upon addition of peracetate, the water remained calm initially and slowly began to release some gas without foam formation after 4 minutes. Upon addition of the pre-acidified peracetate in the peracetic acid form the water became moderately effervescent and formed a thin head of foam approximately 0.25 inches thick over 4 minutes. (Note that thermal denaturing of the catalase at 70° C. for 60 minutes prevented the vigorous degradation of hydrogen peroxide.) Based on these results, the catalase enzyme was most reactive with hydrogen peroxide, moderately reactive with peracetic acid and least reactive with peracetate. This trend illustrates greater ability for oxidative treatment of contaminants and microbes with peracetate as it will persist longer in water containing catalase enzyme before degradation by the catalase enzyme.

Example 3: Water Treatment Demonstration

An oxidative treatment process was conducted on the water sample of Example 2 to remove suspended solids and dissolved contaminants, eliminate odors and control microbes to a level that allows for reuse of the water in potato wash flumes before ultimately being discharged to sewer or a treatment facility prior to environmental discharge.

A peracetate solution was prepared at a concentration of about 4.5% peracetate w/v using triacetin as acetyl donor, a molar ratio of sodium hydroxide to acetyl donor groups of 1.05 and a molar ratio of hydrogen peroxide to acetyl donor groups of 0.95. The peracetate solution was added directly to and diluted into the water sample being treated.

A 800 mL volume of the untreated water sample was mixed at 290 rpm and charged with a polyaluminum chloride coagulant solution adding 30 mg/L as aluminum. After mixing for 1 minute a 5 mg/L charge of anionic floc polymer was added. The water was mixed for 1 minute at 290 rpm and then 1 minute at 50 rpm and then mixing was stopped. The flocculated solids settled from the water column in about 1.5 minutes. 500 mL of the clarified water was decanted and then treated with a 75 mg/L charge of peracetate using the diluted non-equilibrium peracetate formulation, which increased the water's ORP to 610 mV (vs SHE). The peracetate was consumed within 15 minutes. After 60 minutes a second, 75 mg/L charge of peracetate was added to see the effect of a repeated cycle of treatment in a recycle loop. The ORP initially increased to 630 mV (vs SHE) and decreased as the peracetate was consumed within 20 minutes. Analysis of the treated water showed pH 6.8, ORP 430 mV (vs SHE), total suspended solids less than 20 mg/L, ATP reduction of 98% (a 5-8 log reduction of culturable microbes depending on type), amylose was below detection with iodine, foaming potential was nearly eliminated and odors from sulfide, volatile fatty acids, the peracetate chemistry or its byproducts were not perceptible.

The settled solids were drained of water on a filter paper and weighed before and after air drying. There was at least 98% water recovery from treatment. The solids recovered was the equivalent of about 16 pounds of air dried solids per 1000 gallons of water, representing a significant reduction in organic material that could be used for land application or biogas generation instead of being treated as biological oxygen demand in effluent.

This same water sample was tested again for odor and microbial control without clarification and removal of solids and reduction of catalase load. To enable this treatment process the peracetate product was acidified with enough excess acid to reduce the pH of the water to a point of inhibiting or denaturing the catalase enzyme.

Example 4: Poultry Dip Tank

A standardized test was conducted to simulate the use of peracetate for reducing *Salmonella* spp. on poultry as a processing method directed to control microbial growth or inactivate microorganisms in food products during processing to lower the risk of foodborne pathogens or spoilage microorganisms. The objective of this study was to determine the efficacy of peracetate treatment for reducing *Salmonella* spp. on poultry thighs in a treatment solution bath during a short contact time of 10-12 seconds, representative of a dip in poultry processing facilities. Shorter dip times allow processors to use increased concentrations of antimicrobials to provide greater pathogen reductions without causing organoleptic damage to the treated poultry. To mimic this application in a poultry processing facility, a target concentration was determined to be 750 mg/L peracetate (as PAA equivalents) in the treatment solution bath.

The inoculum used in this study was prepared from three reference strains of *Salmonella*: *S. Infantis* (Reference Strain ID: ATCC 51741), *S. Typhimurium* (Reference Strain ID: ATCC 13311), and *S. Enteritidis* (Reference Strain ID: ATCC 13076). These *Salmonella* isolates were struck for isolation onto Brilliant Green Sulfa (BGS) agar and incubated at 35+2° C. for 24 hours. Colonies from each strain were placed into individual tubes of buffered peptone water (BPW) determined using a spectrophotometer (ThermoFisher Scientific, 1700/0512). Levels were adjusted to obtain a $10^8$ CFU/mL culture for each strain individually. Equal amounts of each strain were added into a single 50 mL centrifuge tube and vortexed to create a 3-strain *Salmonella* inoculum. The inoculum level was confirmed by serially diluting in 0.85% saline, plating onto brilliant green sulfa (BGS) agar and incubating at 35° C. for 24 hours. Post incubation, colonies were counted, and log transformed reported. The *Salmonella* multi-strain inoculum was confirmed by plating to be 8.59 Log CFU/g.

Prior to inoculation, the average weight of the poultry thighs used in this study was determined to be 225 grams. Thighs were inoculated in groups of five and time allowed between inoculation so that attachment times did not overlap. Thighs were each inoculated with 200 μL of the 3-strain *Salmonella* cocktail and allowed a 15-minute attachment period prior to treatment. Treatment solution baths for the dips were prepared in sanitized five-gallon buckets, each containing three gallons of tap water. Added peracetate was mixed using a sterile, stainless-steel paddle and concentrations confirmed using a LaMotte: Hydrogen Peroxide and Peracetic Acid Titration kit. A peracetate solution was prepared at a concentration of about 4.5% peracetate w/v using triacetin as acetyl donor, a molar ratio of sodium hydroxide to acetyl donor groups of 1.05 and a molar ratio of hydrogen peroxide to acetyl donor groups of 0.95. The peracetate solution was diluted into three gallons of tap water to prepare a diluted non-equilibrium peracetate formulation containing 750 ppm peracetate, and the diluted solution was used as the solution bath for the dip treatments.

Three sets of five poultry thighs were inoculated for this study. One set was not dipped to represent an untreated control, one set was dipped into a water bath without peracetate to represent an untreated dip control, and a final set was dipped into a 750 mg/L solution of peracetate (as PAA equivalents.

For treatment, two of the three sets of five poultry thighs analyzed were placed into the dip treatments using sterile tongs. One set of sterile tongs was used to lower the inoculated thighs into the treatment dips while a second set of sterile tongs was used to remove samples from the treatment dips. The targeted dip time was 10-12 seconds (timed at 11 seconds), with mild agitation throughout using a stainless-steel paddle. Thighs were allowed to drip dry for 10 seconds before being placed into a sterile, filtered Whirl-Pak bag with 450 mL of buffered peptone water (BPW), giving a 1:3 dilution for rinsing. Samples were then stomached for two minutes at 265 RPM, serially diluted with 0.85% saline, and plated onto the BGS agar. Plates were incubated at 35±2° C. for 24 hours before colonies were counted and log transformed.

Recovered average $Log_{10}$ CFU/g values for the 3 sets of poultry thighs were measured at 5.79 for the untreated thighs, 5.03 for the for the thighs dipped in water, and 4.29 for the thighs dipped into a 750 ppm peracetate dilution. *Salmonella* reductions were significant in the peracetate sample, reducing *Salmonella* by 1.50 Log CFU/g compared to untreated samples.

Example 5: Poultry Chiller Tank Comparing Peracetate and Peracetic Acid

A standardized test was conducted to compare the antimicrobial efficacy, residual decay, and effect on solution pH of peracetate and peracetic acid in reducing *Salmonella* spp. on poultry as a processing method directed to control microbial growth or inactivate microorganisms in food products during processing to lower risk of foodborne pathogens or spoilage microorganisms. The objective of this study was to determine the efficacy of peracetate and peracetic acid treatments for reducing *Salmonella* spp. on poultry thighs in a treatment bath under conditions simulating pre-chiller and red water main chiller applications. To mimic these applications in a poultry processing facility, target concentrations were determined to be 150 ppm of either peracetate (as PAA equivalents) or peracetic acid in the simulated pre-chiller application and 75 ppm of either peracetate (as PAA equivalents) or peracetic acid in the simulated red water main chiller application. Both applications targeted a pH>8.5 to simulate the intentional alkalinity of chillers in poultry processing facilities.

The pH, temperature, and residual antimicrobial concentration (measured as either peracetate or peracetic acid) were monitored through the duration of both applications. If residual antimicrobial concentrations fell below 115 ppm in the pre-chiller application or 50 ppm in the red water main chiller application, additional peracetate as a 4.5% w/v or 28% peracetic acid would be added to bring the residual concentration back to target levels. After adding peracetic acid the pH was adjusted with sodium hydroxide to match initial value several times through the duration of the applications. The pH was not adjusted after adding the peracetate and no further peracetate was added through the duration of the applications due to its slower consumption rate.

The inoculum used in this study was prepared from three reference strains of *Salmonella*: *S. Infantis* (Reference Strain ID: ATCC 51741), *S. Typhimurium* (Reference Strain ID: ATCC 13311), and *S. Enteritidis* (Reference Strain ID: ATCC 13076). These *Salmonella* isolates were struck for isolation onto Brilliant Green Sulfa (BGS) agar and incubated at 35±2° C. for 24 hours. Colonies from each strain were placed into individual tubes of buffered peptone water (BPW) determined using a spectrophotometer (ThermoFisher Scientific, 1700/0512). Levels were adjusted to obtain a $10^8$ CFU/mL culture for each strain individually. Equal amounts of each strain were added into a single 50 mL centrifuge tube and vortexed to create a 3-strain *Salmonella* inoculum. The inoculum level was confirmed by serially diluting in 0.85% saline, plating onto brilliant green sulfa (BGS) agar and incubating at 35° C. for 24 hours. Post incubation, colonies were counted, and log transformed reported. The *Salmonella* multi-strain inoculum was confirmed by plating to be 8.59 Log CFU/g.

Prior to inoculation, the average weight of the poultry thighs used in this study was determined to be 150 grams. Thighs were inoculated in groups of 10 and time allowed between inoculation so that attachment times did not overlap. Thighs were each inoculated with 200 L of the 3-strain *Salmonella* cocktail and allowed a 10-minute attachment period prior to treatment.

Treatment solution baths were prepared in two sanitized 55-gallon totes equipped with aeration, each containing 25 gallons of tap water. The peracetate baths were made by adding peracetate concentrate without any pH adjustment. The peracetic acid baths were pH adjusted with 235 mL of 25% sodium hydroxide in the pre-chiller bath and 150 mL of 25% sodium hydroxide in the main chiller bath to approximately match the initial pH of the peracetate baths. The respective baths were then mixed using a sterile, stainless-steel paddle and concentrations confirmed using an AquaPhoenix Peracetic Acid Titration kit. The peracetate solution was prepared at a concentration of about 4.5% peracetate w/v using triacetin as acetyl donor, a molar ratio of sodium hydroxide to acetyl donor groups of 1.05 and a molar ratio of hydrogen peroxide to acetyl donor groups of 0.95. The peracetate concentrate was added to prepare a diluted non-equilibrium peracetate formulation initially containing 115 ppm peracetate for the pre-chiller bath and 75 ppm for the main-chiller bath. The same initial bath concentrations were used in the peracetic acid baths.

Tote 1 was treated to simulate a pre-chiller application, while tote 2 was treated to simulate a main chiller. The main chiller was cooled through a "red water chill system", and water was suctioned out of the chiller using ¼ inch poly-tubing connected to a transfer pump (Utilitech model #50AC-110N) being fed through 50 feet of coiled copper tubing. The copper tubing was immersed in a layered ice and rock salt bath contained in a 60-quart Igloo cooler. Water was then returned to the main chiller body through a second piece of ¼ inch polytubing. The cooler fitted with the transfer pump was housed on the exterior of the building and tubing was run into the laboratory through a window.

Seven sets of thirty poultry thighs were inoculated for this study. The first set was not placed into either tote to represent an untreated control. The second set was placed into only the pre-chiller tote without antimicrobial (peracetate or peracetic acid) to represent an untreated pre-chiller control. The third set was sequentially placed into both the pre-chiller and main chiller totes without antimicrobial to represent an untreated control for entire process. The fourth set was placed into only the pre-chiller tote with 150 ppm peracetate. The fifth set was sequentially placed into both the pre-chiller and main chiller totes with 75 and 150 ppm peracetate, respectively. The six and seventh sets mirrored the fourth and fifth but with peracetic acid instead of peracetate.

During the pre-chiller and main chiller treatments, the temperature, pH, and antimicrobial concentrations were monitored and recorded every 10 minutes. Adjustments were made to keep the antimicrobial concentrations above 115 and 75 ppm for the pre-chiller and main chiller, respectively, then pH adjusted back above 8.5. Post treatment and drip time, thighs were placed into individual filter bags with 150 mL of buffered peptone water (BPW). Samples were stomached at 265 RPM for 2 minutes and rinses dispensed into sterile specimen cups. Samples were serially diluted in 0.85% saline and plated onto BGS agar. Agar plates were incubated at 35° C. for 22-26 hours. After incubating, colonies were counted, and log transformed.

Recovered average $Log_{10}$ CFU/g values for the 7 sets of poultry thighs were measured at 5.46 for the untreated thighs, 4.76 for the for the untreated pre-chiller control, 4.13 for the untreated main chiller control, 3.71 for the peracetate pre-chiller treatment, 3.45 for the peracetate main chiller treatment, 3.65 for the peracetic acid pre-chiller treatment, and 3.45 for the peracetic acid main chiller treatment. No significant difference in the antimicrobial effectiveness of peracetic acid and peracetate was observed in these experiments.

Significant differences were observed in the degradation rates of peracetate and peracetic acid. Throughout the course of these experiments, no additional peracetate was required to maintain the minimum target concentrations in either chiller application. However, maintenance of peracetic acid above the minimum concentration in the pre-chiller application required an additional 13.0 mL of peracetic acid and 60 mL of sodium hydroxide. Further, maintenance of peracetic acid above the minimum concentration in the red water main chiller application required an additional 26.0 mL of peracetic acid and 120 mL of sodium hydroxide. Also noted were differences in odor during peracetate treatments compared to peracetic acid treatments, the peracetate totes had no detectable odor as opposed to the pungent odor of peracetic acid totes.

Exemplary Implementation Combinations

Some other contemplated example combinations related to implementation of various aspects of this disclosure, with or without additional features as disclosed above or elsewhere herein, are summarized in the numbered paragraphs presented below, and in the appended claims:

Methods of Preparation

1. A method for preparing a nonequilibrium peracid salt composition prior to use for oxidative treatment, and optionally with generation of singlet oxygen during an oxidative treatment, the method comprising:

reacting components in an aqueous reaction mixture prepared from a combination of chemical feedstocks to form an aqueous nonequilibrium peracid salt composition, the chemical feedstocks comprising acyl donor with acyl donor groups, hydrogen peroxide and alkali metal hydroxide in amounts and proportions, including to account for yield losses, to prepare the nonequilibrium peracid salt composition with composition properties comprising:

dissolved peracid anion of the peracid salt at a concentration in a range of from 1.0% (weight/volume) to 8.0% (weight/volume); and pH in a range of from pH 12.0 to pH 13.5; and wherein the combination of reaction feedstocks comprises:

a first molar ratio of the alkali metal hydroxide to the acyl donor groups in a range of from 0.95 to 1.40; and a second molar ratio of hydrogen peroxide to the acyl donor groups in a range of from 0.80 to 1.10; and continuing the reacting at least until the nonequilibrium peracid salt composition is prepared including the composition properties.

2. The method of paragraph 1, wherein the first molar ratio is at least 1.00.

3. The method of paragraph 1, wherein the first molar ratio is at least 1.02.

4. The method of paragraph 1, wherein the first molar ratio is at least 1.05.

5. The method of paragraph 1, wherein the first molar ratio is at least 1.07.

5.1 The method of paragraph 1, wherein the first molar ratio is at least 1.10.

6. The method of any one of paragraphs 1-5.1, wherein the first molar ratio is no larger than 1.30.

6.1. The method of any one of paragraphs 1-5.1, wherein the first molar ratio is no larger than 1.25.

7. The method of any one of paragraphs 1-5.1, wherein the first molar ratio is no larger than 1.20.

8. The method of any one of paragraphs 1-5.1, wherein the first molar ratio is no larger than 1.15.

9. The method of any one of paragraphs 1-5.1, wherein the first molar ratio is no larger than 1.12.

10. The method of any one of paragraphs 1-9, wherein the pH is at least 12.1.

11. The method of any one of paragraphs 1-9, wherein the pH is at least 12.2.

12. The method of any one of paragraphs 1-9, wherein the pH is at least 12.3.

13. The method of any one of paragraphs 1-9, wherein the pH is at least 12.4.

14. The method of any one of paragraphs 1-9, wherein the pH is at least 12.5.

14.1 The method of any one of paragraphs 1-9, wherein the pH is at least 12.6.

14.2 The method of any one of paragraphs 1-9, wherein the pH is at least 12.7.

15. The method of any one of paragraphs 1-14.2, wherein the pH is no larger than 13.3.

16. The method of any one of paragraphs 1-14.2, wherein the pH is no larger than 13.2.

17. The method of any one of paragraphs 1-14.2, wherein the pH is no larger than 13.1.

18. The method of any one of paragraphs 1-14.2, wherein the pH is no larger than 13.0.

19. The method of any one of paragraphs 1-14.2, wherein the pH is no larger than 12.9.

20. The method of any one of paragraphs 1-19, wherein the composition properties comprise a concentration of dissolved hydrogen peroxide of no larger than 1600 mg/L.

21. The method of any one of paragraphs 1-19, wherein the composition properties comprise a concentration of dissolved hydrogen peroxide of no larger than 1400 mg/L.

22. The method of any one of paragraphs 1-19, wherein the composition properties comprise a concentration of dissolved hydrogen peroxide of no larger than 1200 mg/L.

23. The method of any one of paragraphs 1-19, wherein the composition properties comprise a concentration of dissolved hydrogen peroxide of no larger than 1000 mg/L.

24. The method of any one of paragraphs 1-19, wherein the composition properties comprise a concentration of dissolved hydrogen peroxide of no larger than 800 mg/L.

25. The method of any one of paragraphs 1-19, wherein the composition properties comprise a concentration of dissolved hydrogen peroxide of no larger than 600 mg/L.

26. The method of any one of paragraphs 1-25, wherein the composition properties comprise a molar ratio of dissolved hydrogen peroxide to the peracid anion of no larger than $1/6$.

27. The method of any one of paragraphs 1-25, wherein the composition properties comprise a molar ratio of dissolved hydrogen peroxide to the peracid anion of no larger than $1/10$.

28. The method of any one of paragraphs 1-25, wherein the composition properties comprise a molar ratio dissolved hydrogen peroxide to the peracid anion of no larger than $1/16$.

29. The method of any one of paragraphs 1-25, wherein the composition properties comprise a molar ratio of dissolved hydrogen peroxide to the peracid anion of no larger than $1/20$.

30. The method of any one of paragraphs 1-25, wherein the composition properties comprise a molar ratio of dissolved hydrogen peroxide to the peracid anion of no larger than $1/25$.

30.1 The method of any one of paragraphs 1-30, wherein the composition as prepared is in a relatively stable form for short-term storage and handling prior to use.

31. The method of any one of paragraphs 1-30.1, wherein the composition properties comprise a 10-minute stability index ($SI_{10}$) at a temperature of 22° C. of at least 0.80, wherein the 10-minute stability index is calculated according to Equation I:

$$SI_{10} = CA_{10}/CA_0 \qquad \text{Equation I}$$

wherein:

$SI_{10}$ is the 10-minute stability index;

$CA_0$ is the concentration (% weight/volume) of the peracid anion determined for a first time; and $CA_{10}$ is a concentration (% weight/volume) of the peracid anion determined for a second time corresponding to 10 minutes following the first time.

32. The method of paragraph 31, wherein the 10-minute stability index is at least 0.83.

33. The method of paragraph 31, wherein the 10-minute stability index is at least 0.85.

34. The method of paragraph 31, wherein the 10-minute stability index is at least 0.88.

35. The method of paragraph 31, wherein the 10-minute stability index is at least 0.90.

36. The method of paragraph 31, wherein the 10-minute stability index is at least 0.92.

37. The method of paragraph 31, wherein the 10-minute stability index is at least 0.94.

38. The method of any one of paragraphs 31-37, wherein the 10-minute stability index is no larger than 1.00.

39. The method of any one of paragraphs 31-37, wherein the 10-minute stability index is no larger than 0.99.

40. The method of any one of paragraphs 31-37, wherein the 10-minute stability index is no larger than 0.98.

41. The method of any one of paragraphs 31-37, wherein the 10-minute stability index is no larger than 0.96.

42. The method of any one of paragraphs 1-41, wherein the composition properties comprise a 30-minute stability index ($SI_{30}$) at a temperature of 22° C. of at least 0.65, wherein the 30-minute stability index is calculated according to Equation 20:

$$SI_{30} = CA_{30}/CA_0 \qquad \text{Equation II}$$

wherein:

$SI_{30}$ is the 30-minute stability index;

$CA_0$ is the concentration (% weight/volume) of the peracid anion determined for a first time; and $CA_{30}$ is a concentration (% weight/volume) of the peracid anion determined for a third time corresponding to 30 minutes following the first time.

43. The method of paragraph 42, wherein the 30-minute stability index is at least 0.70.

44. The method of paragraph 42, wherein the 30-minute stability index is at least 0.73.

45. The method of paragraph 42, wherein the 30-minute stability index is at least 0.76.

46. The method of paragraph 42, wherein the 30-minute stability index is at least 0.78.

47. The method of paragraph 42, wherein the 30-minute stability index is at least 0.80.

48. The method of paragraph 42, wherein the 30-minute stability index is at least 0.82.

49. The method of any one of paragraphs 42-48, wherein the 30-minute stability index is no larger than 0.95.

50. The method of any one of paragraphs 42-48, wherein the 30-minute stability index is no larger than 0.92.

51. The method of any one of paragraphs 42-48, wherein the 30-minute stability index is no larger than 0.90.

52. The method of any one of paragraphs 42-48, wherein the 30-minute stability index is no larger than 0.88.

53. The method of any one of paragraphs 42-48, wherein the 30-minute stability index is no larger than 0.85.

54. The method of any one of paragraphs 1-53, wherein the composition properties comprise:

the 10-minute stability index recited in any of the preceding numbered paragraphs; and the 30-minute stability index recited in any of the preceding numbered paragraphs;

and wherein the 30-minute stability index is smaller than the 10-minute stability index.

55. The method of paragraph 54, wherein the 30-minute stability index is smaller than the 10-minute stability index by at least 0.05.

56. The method of paragraph 54, wherein the 30-minute stability index is smaller than the 10-minute stability index by at least 0.10.

57. The method of any one of paragraphs 54-56, wherein the 30-minute stability index is smaller than the 10-minute stability index by an amount no larger than 0.20.

58. The method of any one of paragraphs 54-56, wherein the 30-minute stability index is smaller than the 10-minute stability index by an amount no larger than 0.15.

59. The method of any one of paragraphs 1-58, wherein the second molar ratio is at least 0.83.

60. The method of any one of paragraphs 1-58, wherein the second molar ratio is at least 0.85.

61. The method of any one of paragraphs 1-58, wherein the second molar ratio is at least 0.87.

62. The method of any one of paragraphs 1-58, wherein the second molar ratio is at least 0.90.

63. The method of any one of paragraphs 1-58, wherein the second molar ratio is at least 0.92.

64. The method of any one of paragraphs 1-58, wherein the second molar ratio is at least 0.95.

65. The method of any one of paragraphs 1-64, wherein the second molar ratio is no larger than 1.05.

66. The method of any one of paragraphs 1-64, wherein the second molar ratio is no larger than 1.02.

67. The method of any one of paragraphs 1-64, wherein the second molar ratio is no larger than 1.00.

68. The method of any one of paragraphs 1-64, wherein the second molar ratio is no larger than 0.99.

69. The method of any one of paragraphs 1-64, wherein the second molar ratio is no larger than 0.97.

70. The method of any one of paragraphs 1-64, wherein the second molar ratio is no larger than 0.95.

71. The method of any one of paragraphs 1-63, wherein the second molar ratio is no larger than 0.92.

72. The method of any one of paragraphs 1-62, wherein the second molar ratio is no larger than 0.90.

73. The method of any one of paragraphs 1-72, wherein the composition properties comprise a weight ratio of total organic carbon to the peracid anion of no larger than 0.60. The weight ratio is determined as the weight, or mass, of the total amount of organic carbon in the composition (including in the peracid anion, in unreacted reactant and in byproducts) divided by the total weight, or mass, of the peracid anions in the composition. As will be appreciated, the total weight, or mass, of a peracid anion includes atomic components other than carbon, such as oxygen and hydrogen components.

74. The method of any one of paragraphs 1-72, wherein the composition properties comprise a weight ratio of total organic carbon to the peracid anion of no larger than 0.59.

75. The method of any one of paragraphs 1-72, wherein the composition properties comprise a weight ratio of total organic carbon to the peracid anion of no larger than 0.58.

76. The method of any one of paragraphs 1-72, wherein the composition properties comprise a weight ratio of total organic carbon to the peracid anion of no larger than 0.57.

77. The method of any one of paragraphs 1-72, wherein the composition properties comprise a weight ratio of total organic carbon to the peracid anion of no larger than 0.55.

78. The method of any one of paragraphs 1-72, wherein the composition properties comprise a weight ratio of total organic carbon to the peracid anion of no larger than 0.53

79. The method of any one of paragraphs 1-78, wherein the composition properties comprise a weight ratio of total organic carbon to the peracid anion of at least 0.48.

80. The method of any one of paragraphs 1-78, wherein the composition properties comprise a weight ratio of total organic carbon to the peracid anion of at least 0.50.

81. The method of any one of paragraphs 1-78, wherein the composition properties comprise a weight ratio of total organic carbon to the peracid anion of at least 0.52.

82. The method of any one of paragraphs 1-77 wherein the composition properties comprise a weight ratio of total organic carbon to the peracid anion of at least 0.54.

83. The method of any one of paragraphs 1-82, wherein the composition properties comprise a molar ratio of the peracid anion to the peracid of at least 10,000.

84. The method of any one of paragraphs 1-82, wherein the composition properties comprise a molar ratio of the peracid anion to the peracid of at least 15,000.

85. The method of any one of paragraphs 1-82, wherein the composition properties comprise a molar ratio of the peracid anion to the peracid of at least 18,000.

86. The method of any one of paragraphs 1-85, wherein the composition properties comprise a molar ratio of the peracid anion to the peracid of no larger than 40,000.

87. The method of any one of paragraphs 1-85, wherein the composition properties comprise a molar ratio of the peracid anion to the peracid of no larger than 38,000.

88. The method of any one of paragraphs 1-87, wherein the chemical feedstocks for the aqueous reaction mixture are in amounts and proportions to prepare the nonequilibrium peracid salt composition with the composition properties at a first yield of the peracid anion relative to the acyl donor groups of at least 75%.

89. The method of paragraph 88, wherein the first yield is at least 78%.

90. The method of paragraph 88, wherein the first yield is at least 80%,

91. The method of paragraph 88, wherein the first yield is at least 83%.

92. The method of paragraph 88, wherein the first yield is at least 85%.

93. The method of paragraph 88, wherein the first yield is at least 87%.

94. The method of paragraph 88, wherein the first yield is at least 89%.

95. The method of any one of paragraphs 88-94, wherein the first yield is no larger than 97%.

96. The method of any one of paragraphs 88-94, wherein the first yield is no larger than 95%.

97. The method of any one of paragraphs 88-94, wherein the first yield is no larger than 93%.

98. The method of any one of paragraphs 88-94, wherein the first yield is no larger than 90%.

99. The method of any one of paragraphs 1-98, wherein the chemical feedstocks for the aqueous reaction mixture are in amounts and proportions to prepare the nonequilibrium peracid salt composition with the composition properties at a second yield of the peracid anion relative to the hydrogen peroxide of at least 85%.

100. The method of paragraph 99, wherein the second yield is at least 88%.

101. The method of paragraph 99, wherein the second yield is the least 90%.

102. The method of paragraph 99, wherein the second yield is at least 92%.

103. The method of paragraph 99, wherein the second yield is at least 94%.

104. The method of paragraph 99, wherein the second yield is at least 96%.

105. The method of paragraph 99, wherein the second yield is at least 97%.

106. The method of any one of paragraphs 1-105, comprising the first yield of any one of paragraphs 88-98 and the second yield of any one of paragraphs 99-105, and wherein the first yield and the second yield are equal or differ by no more than 15 percentage points.

107. The method of paragraph 106, wherein the first yield and the second yield are equal or differ by no more than 12 percentage points.

108. The method of paragraph 106, wherein the first yield and the second yield are equal or differ by no more than 10 percentage points.

109. The method of paragraph 106, wherein the first yield and the second yield are equal or differ by no more than eight percentage points.

110. The method of paragraph 106, wherein the first yield and the second yield are equal or differ by no more than six percentage points.

111. The method of any one of paragraphs 106-110, wherein the first yield is larger than the second yield.

112. The method of any one of paragraphs 106-110, wherein the second yield is larger than the first yield.

113. The method of any one of paragraphs 1-112, wherein the nonequilibrium peracid salt composition is a nonequilibrium peracetic acid salt composition and the peracid anion is peracetate.

114. The method of any one of paragraphs 1-113, wherein the composition properties comprise the peracid anion at a concentration of at least 1.5% (weight/volume).

115. The method of any one of paragraphs 1-113, wherein the composition properties comprise the peracid anion at a concentration of at least 2.0% (weight/volume).

116. The method of any one of paragraphs 1-113, wherein the composition properties comprise the peracid anion at a concentration of at least 2.5% (weight/volume).

117. The method of any one of paragraphs 1-113, wherein the composition properties comprise the peracid anion at a concentration of at least 3.0% (weight/volume).

118. The method of any one of paragraphs 1-113, wherein the composition properties comprise the peracid anion at a concentration of at least 3.5% (weight/volume).

119. The method of any one of paragraphs 1-113, wherein the composition properties comprise the peracid anion at a concentration of at least 4.0% (weight/volume).

120. The method of any one of paragraphs 1-113, wherein the composition properties comprise the peracid anion at a concentration of at least 4.5% (weight/volume).

121. The method of any one of paragraphs 1-113, wherein the composition properties comprise the peracid anion at a concentration of at least 5.0% (weight/volume).

122. The method of any one of paragraphs 1-113, wherein the composition properties comprise the peracid anion at a concentration of at least 5.5% (weight/volume).

123. The method of any one of paragraphs 1-113, wherein the composition properties comprise the peracid anion at a concentration of at least 6.0% (weight/volume).

124. The method of any one of paragraphs 1-113, wherein the composition properties comprise the peracid anion at a concentration of at least 6.5% (weight/volume).

125. The method of any one of paragraphs 1-113, wherein the composition properties comprise the peracid anion at a concentration of at least 7.0% (weight/volume).

126. The method of any one of paragraphs 1-125, wherein the composition properties comprise the peracid anion at a concentration of no larger than 8.0% (weight/volume).

127. The method of any one of paragraphs 1-125, wherein the composition properties comprise the peracid anion at a concentration of no larger than 7.5% (weight/volume).

128. The method of any one of paragraphs 1-125, wherein the composition properties comprise the peracid anion at a concentration of no larger than 7.0% (weight/volume).

129. The method of any one of paragraphs 1-124, wherein the composition properties comprise the peracid anion at a concentration of no larger than 6.5% (weight/volume).

130. The method of any one of paragraphs 1-123, wherein the composition properties comprise the peracid anion at a concentration of no larger than 6.0% (weight/volume).

131. The method of any one of paragraphs 1-122, wherein the composition properties comprise the peracid anion at a concentration of no larger than 5.5% (weight/volume).

132. The method of any one of paragraphs 1-121, wherein the composition properties comprise the peracid anion at a concentration of no larger than 5.0% (weight/volume).

133. The method of any one of paragraphs 1-120, wherein the composition properties comprise the peracid anion at a concentration of no larger than 4.5% (weight/volume).

134. The method of any one of paragraphs 1-119, wherein the composition properties comprise the peracid anion at a concentration of no larger than 4.0% (weight/volume).

135. The method of any one of paragraphs 1-118, wherein the composition properties comprise the peracid anion at a concentration of no larger than 3.5% (weight/volume).

136. The method of any one of paragraphs 1-117, wherein the composition properties comprise the peracid anion at a concentration of no larger than 3.0% (weight/volume).

137. The method of any one of paragraphs 1-116, wherein the composition properties comprise the peracid anion at a concentration of no larger than 2.5% (weight/volume).

138. The method of any one of paragraphs 1-115, wherein the composition properties comprise the peracid anion at a concentration of no larger than 2.0% (weight/volume).

139. The method of any one of paragraphs 1-113, 117-124 and 130-136, wherein:

the first molar ratio is in a range of from 1.00 to 1.30;

the second molar ratio is in a range of from 0.83 to 1.00;

the composition properties comprise;

the peracid anion at a concentration in a range of from 3.0% (weight/volume) to 6.5% (weight/volume);

a 10-minute stability index ($SI_{10}$) of at least 0.85 calculated according to Equation I;

a concentration of hydrogen peroxide of no larger than 1200 mg/L; and a pH of at least 12.1; and the chemical feedstocks for the aqueous reaction mixture are in amounts and proportions to prepare the nonequilibrium peracid salt composition with the composition properties at a first yield of the peracid anion relative to the acyl donor groups of at least 80% and a second yield of the peracid anion relative to hydrogen peroxide of at least 90%.

140. The method of paragraph 139, wherein:

the first molar ratio being at least 1.02;

the second molar ratio being at least 0.85; and the composition properties comprise a pH of at least 12.3.

141. The method of either one of paragraph 139 or paragraph 140, wherein the composition properties comprise a weight ratio of total organic carbon to the peracid anion of no larger than 0.58.

142. The method of any one of paragraphs 139-141, wherein:

the first molar ratio is at least 1.05;

the second molar ratio is at least 0.87; and the composition properties comprise a pH of at least 12.4.

143. The method of any one of paragraphs 139-142, wherein the first molar ratio is no larger than 1.20.

144. The method of any one of paragraphs 139-143, wherein the second molar ratio is no larger than 0.97.

145. The method of any one of paragraphs 1-117 and 136-138, wherein:

the first molar ratio is in a range of from 1.05 to 1.30;

the second molar ratio is in a range of from 0.80 to 0.95;

the composition properties comprise;

the peracid anion at a concentration in a range of from 1.5% (weight/volume) to 3.0% (weight/volume);

a 10-minute stability index ($SI_{10}$) of at least 0.90 calculated according to Equation I;

a concentration of hydrogen peroxide of no larger than 1200 mg/L; and a pH of at least 12.3; and the chemical feedstocks for the aqueous reaction mixture are in amounts and proportions to prepare the nonequilibrium peracid salt composition with the composition properties at a first yield of the peracid anion relative to the acyl donor groups of at least 75% and a second yield of the peracid anion relative to hydrogen peroxide of at least 88%.

146. The method of any one of paragraphs 1-130, wherein:

the first molar ratio is in a range of from 1.00 to 1.30;

the second molar ratio is in a range of from 0.85 to 1.00;

the composition properties comprise;

the peracid anion at a concentration in a range of from 6.0% (weight/volume) to 8.0% (weight/volume);

a 10-minute stability index ($SI_{10}$) of at least 0.88 calculated according to Equation I;

a concentration of hydrogen peroxide of no larger than 1200 mg/L; and a pH of at least 12.2; and the chemical feedstocks for the aqueous reaction mixture are in amounts and proportions to prepare the nonequilibrium peracid salt composition with the composition properties at a first yield of the peracid anion relative to the acyl donor groups of at least 80% and a second yield of the peracid anion relative to hydrogen peroxide of at least 86%.

147. The method of any one of paragraphs 1-146, comprising mixing the reaction mixture during the reacting.

148. The method of any one of paragraphs 1-147, comprising preparing the reaction mixture, the preparing the reaction mixture comprising combining a first feedstock preparation comprising an alkaline hydrogen peroxide solution with a second feedstock preparation comprising the acyl donor;

optionally, the method comprises preparing the first feedstock preparation; and optionally, the method comprises preparing the second feedstock preparation.

149. The method of any one of paragraphs 1-148, wherein the combination of reaction feedstocks (chemical feedstocks) comprises a third molar ratio of the alkali metal hydroxide to hydrogen peroxide in a range of from 1.00 to 1.63, and optionally the alkaline hydrogen peroxide solution of the first feedstock preparation of paragraph 148 is a preparation with the alkali metal hydroxide and hydrogen peroxide in the third molar ratio.

150. The method of paragraph 149, wherein the third molar ratio is at least 1.05.

151. The method of paragraph 149, wherein the third molar ratio is at least 1.10.

152. The method of paragraph 149, wherein the third molar ratio is at least 1.15.

153. The method of paragraph 149, wherein the third molar ratio is at least 1.20.

154. The method of paragraph 149, wherein the third molar ratio is at least 1.25.

155. The method of paragraph 149, wherein the third molar ratio is at least 1.30.

156. The method of paragraph 149, wherein the third molar ratio is at least 1.35.

157. The method of paragraph 149, wherein the third molar ratio is at least 1.40.

158. The method of paragraph 149, wherein the third molar ratio is at least 1.45.

159. The method of paragraph 149, wherein the third molar ratio is at least 1.50.

160. The method of paragraph 149, wherein the third molar ratio is at least 1.55.

161. The method of any one of paragraphs 149-160, wherein the third molar ratio is no larger than 1.60.

162. The method of any one of paragraphs 149-160, wherein the third molar ratio is no larger than 1.55.

163. The method of any one of paragraphs 149-159, wherein the third molar ratio is no larger than 1.50.

164. The method of any one of paragraphs 149-158, wherein the third molar ratio is no larger than 1.45.

165. The method of any one of paragraphs 149-157, wherein the third molar ratio is no larger than 1.40.

166. The method of any one of paragraphs 149-156, wherein the third molar ratio is no larger than 1.35.

167. The method of any one of paragraphs 149-155, wherein the third molar ratio is no larger than 1.30.

168. The method of any one of paragraphs 149-154, wherein the third molar ratio is no larger than 1.25.

169. The method of any one of paragraphs 149-153, wherein the third molar ratio is no larger than 1.20.

170. The method of any one of paragraphs 1-169, wherein the acyl donor is an acetyl donor and the acyl donor groups are acetyl donor groups.

171. The method of paragraph 170, wherein the acetyl donor comprises triacetin.

172. The method of either one of paragraph 170 or paragraph 171, wherein the acetyl donor comprises acetylsalicylic acid.

172.1. The method of any one of paragraphs 1-172, wherein the nonequilibrium peracid salt composition is for oxidative treatment of a substrate.

172.2. The method of paragraph 172.1, wherein the substrate comprises a slurry, optionally in a slurry with aqueous liquid.

172.3. The method of paragraph 172.1, wherein the substrate comprises microbes.

172.4. The method of paragraph 172.1, wherein the substrate comprises an aqueous liquid, optionally water to be treated.

172.5. The method of paragraph 172.1, wherein the substrate comprises a surface of a solid object.

172.6. The method of paragraph 172.1, wherein the substrate comprises a food product to be sanitized, optionally prior to consumption of the food product or a prepared food prepared (e.g., cooked) from the food product.

172.7. The method of paragraphs 172.6, wherein the method is for sanitizing the food product for food safety and/or preservation.

172.8. The method of either one of paragraphs 172.6 or 172.7, wherein the food product comprises a vegetable.

172.9. The method of either one of paragraphs 172.6 or 172.7, wherein the food product comprises a meat.

173. The method of any one of paragraphs 170-172.9, wherein the acyl donor comprises tetraacetylethylenediamine.

173.1. The method of any one of paragraphs 1-173, wherein the prepared nonequilibrium peracid salt solution is the nonequilibrium peracid salt composition of any one of paragraphs 203-296.

Methods of Treatment

174. A method of oxidative treatment of a substrate, comprising:

preparing a nonequilibrium peracid salt composition according to the method of any one of paragraphs 1-173.1; and contacting the substrate with a nonequilibrium treatment composition, wherein the nonequilibrium treatment composition comprises:

the nonequilibrium peracid salt composition without an additive to adjust composition properties prior to the contacting; or a nonequilibrium adjusted composition prepared by adding one or more additives to the nonequilibrium peracid-based composition (the nonequilibrium peracid salt composition) prior to the contacting.

175. A method of oxidative treatment of a substrate, comprising:

contacting the substrate with a nonequilibrium treatment composition comprising:

the nonequilibrium peracid salt composition prepared according to the method of any one of paragraphs 1-173.1 and without an additive to adjust composition properties prior to the contacting; or a nonequilibrium adjusted composition prepared by adding one or more additives to the nonequilibrium peracid-based composition (the nonequilibrium peracid salt composition) prior to the contacting.

175.1. A method of oxidative treatment of a substrate, comprising:

contacting the substrate with a nonequilibrium treatment composition, wherein the nonequilibrium treatment composition comprises:

the nonequilibrium peracid salt composition of any one of paragraphs 203-297 and without an additive to adjust composition properties prior to the contacting; or a nonequilibrium adjusted composition prepared by adding one or more additives to the nonequilibrium peracid-based composition (the nonequilibrium peracid salt composition) prior to the contacting.

176. Use of nonequilibrium peracid salt composition prepared according to the method of any one of paragraphs 1-173.1 for oxidative treatment of a substrate.

176.1. The use of paragraph 176, comprising contacting the substrate with a nonequilibrium treatment composition comprising:

the nonequilibrium peracid salt composition without an additive to adjust composition properties prior to the contacting; or a nonequilibrium adjusted composition prepared by adding one or more additives to the nonequilibrium peracid salt composition prior to the contacting.

177. The method or use of any one of paragraphs 174-176.1, wherein the contacting is at a pH that is lower than a pH of the nonequilibrium peracid salt composition immediately prior to the contacting.

178. The method or use of paragraph 177, wherein the contacting is at a pH at least one-half pH unit smaller than the pH of the nonequilibrium treatment composition immediately prior to the contacting.

179. The method or use of paragraph 177, wherein the contacting is at a pH at least one pH unit smaller than the pH of the nonequilibrium treatment composition immediately prior to the contacting.

180. The method or use of paragraph 177, wherein the contacting is at a pH at least two pH units smaller than the pH of the nonequilibrium treatment composition immediately prior to the contacting.

181. The method or use of paragraph 177, wherein the contacting is at a pH at least three pH units smaller than the pH of the nonequilibrium treatment composition immediately prior to the contacting.

182. The method or use of paragraph 177, wherein the contacting is at a pH at least four pH units smaller than the pH of the nonequilibrium treatment composition immediately prior to the contacting.

183. The method or use of any one of paragraphs 174-182, wherein the substrate comprises an aqueous liquid at a pH at least one pH unit smaller than the pH of the nonequilibrium treatment composition immediately prior to the contacting.

184. The method or use of any one of paragraphs 174-182, wherein the substrate comprises an aqueous liquid at a pH at least two pH units smaller than the pH of the nonequilibrium treatment composition immediately prior to the contacting.

185. The method or use of any one of paragraphs 174-182, wherein the substrate comprises an aqueous liquid at a pH at least three pH units smaller than the pH of the nonequilibrium treatment composition immediately prior to the contacting.

186. The method or use of any one of paragraphs 174-182, wherein the substrate comprises an aqueous liquid at a pH at least four pH units smaller than the pH of the nonequilibrium treatment composition immediately prior to the contacting.

186.1. The method or use of any one of paragraphs 174-186, wherein the substrate comprises a water to be treated.

186.2. The method or use of any one of paragraphs 174-182, wherein the substrate comprises a surface of a solid object, and optionally to clean and/or sanitize the surface.

186.3. The method or use of paragraph 186.2, wherein the surface of the solid object is dry immediately prior to the contacting.

186.4. The method or use of paragraph 186.2, wherein the surface of the solid object is wet, optionally wet with an aqueous liquid, prior to the contacting.

186.5. The method or use of any one of paragraphs 174-186.4, wherein the nonequilibrium treatment composition comprises the nonequilibrium peracid salt composition without an additive to adjust composition properties prior to the contacting.

186.6. the method or use of any one of paragraphs 174-186.4, wherein the nonequilibrium treatment composition comprises the nonequilibrium adjusted composition and the method or use comprises preparing the nonequilibrium adjusted composition.

Food Processing

188. The method or use of any one of paragraphs 174-186.6, wherein the substrate comprises a food processing substrate.

Food Product 188.1. The method or use of paragraph 188, wherein the food processing substrate comprises a food product for example to be cleaned and/or sanitized.

188.1.2. The method or use of paragraph 188.1, wherein the food product comprises a vegetable, optionally cut pieces of the vegetable.

188.1.3. The method or use of paragraph 188.1.2, wherein the vegetable comprises potato, beans, beets, carrots, corn, cucumber, onion, pepper, artichoke, cabbage, celery, kale, lettuce, broccoli, asparagus, peas, radishes, rice, spinach, cauliflower, eggplant, mushrooms, truffles or turnips, or combinations thereof.

188.1.3.1. The method or use of paragraph 188.1, wherein the food product comprises a fruit.

188.1.3.2. The method of use of paragraph 188.1.3.1, where in the fruit comprises pome, apple, berries, cherries, citrus, peach, plum, olive, banana, dates, melon, persimmon, *papaya*, pineapple, or tomato, or combinations thereof.

188.1.4. The method or use of paragraph 188.1, wherein the food product comprises a meat, and optionally cut pieces of the meat.

188.1.5. The method or use of paragraph 188.1.4, wherein the meat comprises beef, lamb, veal, turkey, ham, pork, chicken, fish or seafood.

188.1.6. The method or use of any one of paragraphs 188.1-188.1.5, wherein the food product, immediately prior to the contacting, has a pH in a range of from pH 3.0 to pH 7.6.

188.1.7. The method or use of any one of paragraphs 188.1-188.1.6, wherein immediately prior to the contacting the nonequilibrium treatment composition has a pH no more than 2.0 pH units larger than the pH of the food product.

188.1.8. The method or use of any one of paragraphs 188.1-188.1.7, wherein immediately prior to the contacting the nonequilibrium treatment composition has a pH no more than 1.5 pH units larger than the pH of the food product.

188.1.9. The method or use of any one of paragraphs 188.1-188.1.8, wherein immediately prior to the contacting the nonequilibrium treatment composition has a pH no more than 1.0 pH units larger than the pH of the food product.

188.1.10. The method or use of any one of paragraphs 188.1-188.1.9, wherein immediately prior to the contacting the nonequilibrium treatment composition has a pH not less than 2.0 pH units smaller than the pH of the food product.

188.1.11. The method or use of any one of paragraphs 188.1-188.1.10, wherein immediately prior to the contacting the nonequilibrium treatment composition as a pH of not less than 1.5 pH units smaller than the pH of the food product.

188.1.12. The method or use of any one of paragraphs 188.1-188.1.11, wherein immediately prior to the contacting the nonequilibrium treatment composition has a pH of not less than 1.0 pH units smaller than the pH of the food product.

188.1.13. The method or use of any one of paragraphs 188.1-188.1.12, wherein immediately prior to the contacting the nonequilibrium treatment composition has a pH in a range of from pH 2.0 to pH 8.0.

188.1.14. The method or use of any one of paragraphs 188.1-188.1.13, wherein immediately prior to the contacting the nonequilibrium treatment composition has a pH of not larger than pH 7.0.

188.1.15. The method or use of any one of paragraphs 188.1-188.1.14, wherein immediately prior to the contacting the nonequilibrium treatment composition has a pH of not larger than pH 6.0.

188.1.16. The method or use of any one of paragraphs 188.1-188.1.15, wherein immediately prior to the contacting the nonequilibrium treatment composition has a pH of not larger than pH 5.5.

188.1.17. The method or use of any one of paragraphs 188.1-188.1.16, wherein immediately prior to the contacting the nonequilibrium treatment composition has a pH of not smaller than pH 3.0.

188.1.18. The method or use of any one of paragraphs 188.1-188.1.17, wherein immediately prior to the contacting the nonequilibrium treatment composition has a pH of not smaller than the pH 3.5.

188.1.19. The method or use of any one of paragraphs 188.1-188.1.18, wherein immediately prior to the contacting the nonequilibrium treatment composition has a pH of not smaller than pH 4.0.

188.1.20. The method or use of any one of paragraphs 188.1-188.1.19, wherein immediately prior to the contacting the nonequilibrium treatment composition has a combined concentration of peracid anion and peracid, determined as equivalent concentration of the peracid, in a range of from 1 part per million to 8000 parts per million, or in some implementations 1 part per million to 2600 parts per million. As used herein, parts per million refers to parts on a weight basis, unless otherwise stated.

188.1.20.1. The method or use of paragraph 188.1.20, wherein the combined concentration is at least 3 parts per million.

188.1.20.2. The method or use of paragraph 188.1.20, wherein the combined concentration is at least 5 parts per million.

188.1.20.3. The method or use of paragraph 188.1.20, wherein the combined concentration is at least 10 parts per million.

188.1.21. The method or use of paragraph 188.1.20, wherein the combined concentration is at least 20 parts per million.

188.1.22. The method or use of paragraph 188.1.20, wherein the combined concentration is at least 30 parts per million.

188.1.23. The method or use of paragraph 188.1.20, wherein the combined concentration is at least 40 parts per million.

188.1.24. The method or use of paragraph 188.1.20, wherein the combined concentration is at least 50 parts per million.

188.1.25. The method or use of any one of paragraphs 188.1.20-188.1.24, wherein the combined concentration is not larger than 2660 parts per million, or in some implementations not larger than 2340 parts per million.

188.1.25.1. The method or use of any one of paragraphs 188.1.20-188.1.24, wherein the combined concentration is not larger than 2000 parts per million.

188.1.26. The method or use of any one of paragraphs 188.1.20-188.1.24, wherein the combined concentration is not larger than 1300 parts per million.

188.1.27. The method or use of any one of paragraphs 188.1.20-188.1.24, wherein the combined concentration is not larger than 1100 parts per million.

188.1.27.1. The method or use of any one of paragraphs 188.1.20-188.1.24, wherein the combined concentration is not larger than 300 parts per million.

188.1.28. The method or use of any one of paragraphs 188.1.20-188.1.24, wherein the combined concentration of peracetate and peracid is not larger than 200 parts per million.

188.1.28.1. The method or use of any one of paragraphs 188.1.20-188.1.24, wherein the combined concentration is not larger than 110 parts per million.

188.1.29. The method or use of any one of paragraphs 188.1.20-188.1.24, wherein the combined concentration of peracetate and peracid is not larger than 100 parts per million.

188.1.30. The method or use of any one of paragraphs 188.1-188.1.29, wherein the contacting is at a treatment temperature in a range of from 2° C. to 95° C.

188.1.31. The method or use of paragraph 188.1.30, wherein the treatment temperature is at least 10° C.

188.1.32. The method or use of paragraph 188.1.30, wherein the treatment temperature is at least 15° C.

188.1.33. The method or use of paragraph 188.1.30, wherein the treatment temperature is at least 20° C.

188.1.34. The method or use of paragraph 188.1.30, wherein the treatment temperature is at least 38° C.

188.1.35. The method or use of paragraph 188.1.30, wherein the treatment temperature is at least 50° C.

188.1.36. The method or use of paragraph 188.1.30, wherein the treatment temperature is at least 60° C.

188.1.37. The method or use of paragraph 188.1.30, wherein the treatment temperature is at least 65° C.

188.1.38. The method or use of any one of paragraphs 188.130, wherein the treatment temperature is at least 70° C.

188.1.39. The method or use of any one of paragraphs 188.1.30-188.1.34, wherein the treatment temperature is not larger than 40° C.

188.1.40. The method any one of paragraphs 188.1.30-188.1.33, wherein the treatment temperature is not larger than 35° C.

188.1.41. The method or use of any one of paragraphs 188.130-188.1.33, wherein the treatment temperature is not larger than 30° C.

188.1.42. The method or use of any one of paragraphs 188.1.30-188.1.33, wherein the treatment temperature is not larger than 25° C.

188.1.43. The method or use of any one of paragraphs 188.1.39-188.1.1.42, wherein the contacting comprises a cold wash of the food product.

188.1.44. The method or use of any one of paragraphs 188.1.34-188.1.38, wherein treatment temperature is not larger than 85° C.

188.1.45. The method or use of any one of paragraphs 188.1.34-188.1.38, wherein the treatment temperature is not larger than 80° C.

188.1.46. The method or use of any one of paragraphs 188.1.34-188.1.38, wherein the treatment temperature is not larger than 75° C.

188.1.47. The method or use of any one of paragraphs 188.1.34-188.1.38, wherein the treatment temperature is not larger than 70° C.

188.1.48. The method or use of any one of paragraphs 188.1.34-188.1.38 and 188.1.44-188.1-47, wherein the contacting comprises a hot wash of the food product.

188.1.49. The method or use of any one of paragraphs 188.1.34-188.1.38 and 188.1.44-188.1.48, wherein the contacting comprises blanching the food product.

188.1.50. The method or use of any one of paragraphs 188.1.30-188.1.48, comprising blanching the food product, and wherein the contacting is performed prior to the blanching.

188.1.51. The method or use of any one of paragraphs 188.1.30-188.1.48, comprising blanching the food product, and wherein the contacting is performed after the blanching.

188.1.52. The method or use of any one of paragraphs 188.1.6-188.1.51, wherein the food product comprises a vegetable.

188.1.53. The method or use of paragraph 188.1.52, wherein the food product comprises a peeled vegetable.

188.1.54. The method or use of either one of paragraphs 188.1.52 or paragraph 188.1.53, wherein the vegetable comprises starch and the method or use comprises a treatment stage to remove starch from the vegetable, optionally the treatment stage comprises blanching and/or a cold wash.

188.1.55. The method or use of paragraph 188.1.54, wherein the contacting is during the treatment stage, optionally during blanching and/or during a cold wash.

188.1.56. The method or use of paragraph 188.1.54, wherein the contacting is prior to the treatment stage.

188.1.57. The method or use of paragraph 188.1.54, wherein the contacting is after the treatment stage.

188.1.58. The method or use of any one of paragraphs 188.1.6-188.1.57, wherein the food product comprises potato.

188.1.59. The method or use of any one of paragraphs 188.1-188.1.58, wherein the contacting comprises contacting the food product with the nonequilibrium treatment composition for a treatment time of at least 1 minute, or even at least 5 minutes.

188.1.60. The method or use of paragraph 188.1.59, wherein the treatment time is no longer than 120 minutes, or even no longer than 60 minutes.

188.1.61. The method or use of any one of paragraphs 188.1-188.1.60, wherein the nonequilibrium treatment composition comprises the nonequilibrium adjusted composition and the method or use comprises preparing the nonequilibrium adjusted composition.

Food Contact Surface 188.2. The method or use of paragraph 188, wherein the food processing substrate comprises a food contact surface comprising food soil, for example to clean and/or sanitize the food contact surface, and optionally the food contact surface comprises the surface of the solid object of any one of paragraphs 186.2-186.4.

188.2.1. The method or use of paragraph 188.2, wherein the food contact surface comprises a surface of food processing or preparation equipment.

188.2.2. The method or use of paragraph 188.2.1, wherein the food processing or preparation equipment surface comprises an interior surface of a food processing vessel; a food conveyance surface (such as for example a conveyance surface of a belt conveyor, vibratory conveyor, pump or conduit); a food cutting surface; a food cutting blade surface; a food blender surface; a food mincer surface; a food grinder surface; a food masher surface; a food cooking surface; a food preparation utensil surface; or combinations thereof.

188.2.3. The method or use of either one of paragraph 188.2.1 or paragraph 188.2.2, wherein the contacting comprises clean-in-place treatment of the food contact surface, and optionally with an automated procedure to provide the nonequilibrium treatment composition to the food contact surface and to drain away the nonequilibrium treatment composition after the contacting.

188.2.4. The method or use of any one of paragraphs 188.2-188.2.3, wherein the contacting comprises contacting the food contact surface with the nonequilibrium treatment composition for a treatment time of at least 1 minute, or even at least 5 minutes.

188.2.5. The method or use of paragraph 188.2.4, wherein the treatment time is no longer than 120 minutes, or even no longer than 60 minutes.

188.2.6. The method or use of either one of paragraph 188.2.4 or paragraph 188.2.5, comprising draining the non-equilibrium treatment composition from the food contact surface following the treatment time.

188.2.7. The method or use of any one of paragraphs 188.2-188.2.6, wherein the contacting comprises soaking the food contact surface with the nonequilibrium treatment composition.

188.2.8. The method or use of any one of paragraphs 188.2-188.2.7, wherein the contacting comprises spraying the nonequilibrium treatment composition on to the food contact surface.

188.2.9. The method or use of any one of paragraphs 188.2-188.2.8, wherein immediately prior to the contacting the nonequilibrium treatment composition has a pH of at least pH 9.0.

188.2.10. The method or use of any one of paragraphs 188.2-188.2.9, wherein immediately prior to the contacting the nonequilibrium treatment composition has a pH of at least pH 9.5.

188.2.11. The method or use of any one of paragraphs 188.2-188.2.10, wherein immediately prior to the contacting the nonequilibrium treatment composition has a pH of at least pH 10.0.

188.2.12. The method or use of any one of paragraphs 188.2-188.2.11, wherein immediately prior to the contacting the nonequilibrium treatment composition has a pH of at least pH 10.5.

188.2.13. The method or use of any one of paragraphs 188.2-188.2.12, wherein immediately prior to the contacting the nonequilibrium treatment composition has a pH of at least pH 11.0.

188.2.14. The method or use of any one of paragraphs 188.2-188.2.13, wherein immediately prior to the contacting the nonequilibrium treatment composition has a pH of at least pH 11.5.

188.2.15. The method or use of any one of paragraphs 188.2-188.2.14, wherein immediately prior to the contacting the nonequilibrium treatment composition has a pH of at least 12.0.

188.2.16. The method or use of any one of paragraphs 188.2-188.2.15, wherein immediately prior to the contacting the nonequilibrium treatment composition has a pH as recited for the nonequilibrium peracid salt composition in any one of paragraphs 10-19.

188.2.17. The method or use of any one of paragraphs 188.2-188.2.16, wherein immediately prior to the contacting, the nonequilibrium treatment composition has composition properties of the nonequilibrium peracid salt composition of any one of paragraphs 1-173.1 and 203-297.

188.2.18. The method or use of any one of paragraphs 188.2-188.2.8, wherein immediately prior to the contacting the nonequilibrium treatment composition has a pH of not larger than pH 9.0, and optionally in a range from pH 2.0 to pH 9.0.

188.2.19. The method or use of paragraph 188.2.18, wherein immediately prior to the contacting the nonequilibrium treatment composition has a pH as recited in any one of paragraphs 188.1.13-188.1.19.

188.2.20. The method or use of any one of paragraphs 188.2-188.2.8, 188.2.18 and 188.2.19, wherein immediately prior to the contacting, the nonequilibrium treatment composition has a combined concentration of peracid anion and peracid, determined as equivalent concentration of the peracid, as recited in any one of paragraphs 188.1.20-188.1.29.

188.2.21. The method or use of any one of paragraphs 188.2-188.2.20, wherein immediately prior to the contacting the nonequilibrium treatment composition is at a temperature in a range of from 38° C. to 95° C.

188.2.22. The method or use of paragraph 188.2.21, wherein immediately prior to the contacting the nonequilibrium treatment composition is at a temperature of at least 50° C.

188.2.23. The method or use of paragraph 188.2.21, wherein immediately prior to the contacting the nonequilibrium treatment composition is at a temperature of at least 60° C.

188.2.24. The method or use of any one of paragraphs 188.2.21-188.2.23, wherein immediately prior to the contacting the nonequilibrium treatment composition is at a temperature of not larger than 80° C.

188.2.25. The method or use of any one of paragraphs 188.2.21-188.2.24, wherein immediately prior to the contacting the nonequilibrium treatment composition is at a temperature of not larger than 70° C.

188.2.26. The method or use of any one of paragraphs 188.2-188.2.25, wherein the food contact surface comprises food soil from processing of a food product recited in any one of paragraphs 188.1.2-188.1.6.

188.2.27. The method or use of any one of paragraphs 188.2-188.2.26, wherein the nonequilibrium treatment composition comprises the nonequilibrium peracid salt composition without an additive to adjust composition properties prior to the contacting.

188.2.28. The method or use of any one of paragraphs 188.2-188.26, wherein the nonequilibrium treatment composition comprises the nonequilibrium adjusted composition and the method or use comprises preparing the nonequilibrium adjusted composition.

Food Process Water 188.3. The method or use of paragraph 188, wherein the food processing substrate comprises a food process liquid to be treated, the food process liquid comprising food soil contaminants, optionally the food process liquid is an aqueous liquid and further optionally the aqueous liquid or water of any one of paragraphs 183-186.1.

188.3.1. The method or use of paragraph 188.3, wherein food process liquid comprises drainage of used nonequilibrium treatment composition from the processing of paragraph 188.2.3.

188.3.2. The method or use of either one of paragraph 188.3 or paragraph 188.3.1, wherein the food process liquid comprises effluent liquid from contacting a food product during food processing, effluent liquid from cleaning and/or sanitization of food preparation or processing equipment or food preparation utensils, or combinations thereof, and optionally from any equipment recited in paragraph 188.2.2.

188.3.3. The method or use of any one of paragraphs 188.3-188.3.2, wherein immediately prior to the contacting the nonequilibrium treatment composition has composition properties of the nonequilibrium peracid salt composition of any one of paragraphs 1-173.1 and 203-297.

188.3.4. The method or use of any one of paragraphs 188.3-188.3.3, wherein contacting is at a treatment temperature in a range of from 38° C. to 95° C.

188.3.5. The method or use of paragraph 188.3.4, wherein the treatment temperature is at least 50° C.

188.3.6. The method or use of paragraph 188.3.4, wherein the treatment temperature is at least 60° C.

188.3.7. The method or use of paragraph 188.3.4, wherein the treatment temperature is at least 65° C.

188.3.8. The method or use of paragraph 188.3.4, wherein the treatment temperature is at least 70° C.

188.3.9. The method or use of any one of paragraphs 188.3.4-188.3.8, wherein the treatment temperature is not larger than 85° C.

188.3.10. The method or use of any one of paragraphs 188.3.4-188.3.8, wherein the treatment temperature is not larger than 80° C.

188.3.11. The method or use of any one of paragraphs 188.3.4-188.3.8, wherein the treatment temperature is not larger than 75° C.

188.3.12. The method or use of any one of paragraphs 188.3.4-188.3.8, wherein the treatment temperature is not larger than 70° C.

188.3.13. The method or use of any one of paragraphs 188.3-188.3.12, wherein immediately prior to the contacting the processing liquid has a pH in a range of from pH 2.0 to pH 10.0.

188.3.14. The method or use of paragraph 188.3.13, wherein immediately prior to the contacting the processing liquid has a pH of at least pH 3.0.

188.3.15. The method or use of paragraph 188.3.13, wherein immediately prior to the contacting the processing liquid has a pH of at least pH 4.0.

188.3.16. The method or use of paragraph 188.3.13, wherein immediately prior to the contacting the processing liquid has a pH of at least pH 5.0.

188.3.17. The method or use of paragraph 188.3.13, wherein immediately prior to the contacting the processing liquid has a pH of at least pH 6.0.

188.3.18. The method or use of paragraph 188.3.13, wherein immediately prior to the contacting the processing liquid has a pH of at least pH 6.5.

188.3.19. The method or use of any one of paragraphs 188.3.13-188.3.18, wherein immediately prior to the contacting the processing liquid has a pH of not larger than pH 9.0.

188.3.20. The method or use of any one of paragraphs 188.3.13-188.3.18, wherein immediately prior to the contacting the processing liquid has a pH of not larger than pH 8.5.

188.3.21. The method or use of any one of paragraphs 188.3.13-188.3.18, wherein immediately prior to the contacting the processing liquid has a pH of not larger than pH 8.0.

188.3.22. The method or use of any one of paragraphs 188.3.13-188.3.18, wherein immediately prior to the contacting the processing liquid has a pH of not larger than pH 7.5.

188.3.23. The method or use of any one of paragraphs 188.3-188.3.22, wherein immediately prior to the contacting the nonequilibrium treatment composition has a pH as recited in any of paragraphs 188.2.9-188.2.16 and 188.2.18-188.2.19.

188.3.24. The method or use of any one of paragraphs 188.3-188.3.23, wherein immediately prior to the contacting the nonequilibrium treatment composition has a combined concentration of peracid anion and peracid, determined as equivalent concentration of the peracid, as recited in any one of paragraphs 188.1.20-188.1.29.

188.3.25. The method or use of any one of paragraphs 188.3-188.3.24, wherein immediately prior to the contacting the nonequilibrium treatment composition is at a temperature as recited for the temperature of the contacting in any one of paragraphs 188.1.39-188.1.42.

188.3.26. The method or use of any one of paragraphs 188.3-188.3.24, wherein immediately prior to the contacting the nonequilibrium treatment composition is at a temperature as recited in any of paragraphs 188.2.21-188.2.25.

188.3.27. The method or use of any one of paragraphs 188.3-188.3.26, comprising after the contacting subjecting the processing liquid to liquid-solid separation to remove solids from the processing liquid, optionally including a liquid-solid separation technique of filtration, centrifugation, cycloning, and settling.

188.3.28. The method or use of any one of paragraphs 188.3-188.3.27, wherein the nonequilibrium treatment composition comprises the nonequilibrium peracid salt composition without an additive to adjust composition properties prior to the contacting.

188.3.29. The method or use of any one of paragraphs 188.3-188.3.27, wherein the nonequilibrium treatment composition comprises the nonequilibrium adjusted composition and the method or use comprises preparing the nonequilibrium adjusted composition.

Preparing Nonequilibrium Adjusted Composition

189. The method or use of any one of the preceding paragraphs that comprise preparing the nonequilibrium adjusted composition, including any one of paragraphs 186.6, 188.1.61, 188.2.28 and 188.3.29.

Diluting

190. The method or use of paragraph 189, wherein the preparing the nonequilibrium adjusted composition comprises:

diluting the nonequilibrium peracid salt composition, and
    optionally the nonequilibrium adjusted composition is
    a diluted nonequilibrium peracid salt composition.

191. The method or use of either one of paragraph 189 or paragraph 190, comprising contacting the substrate with the nonequilibrium adjusted composition within 120 minutes after preparation of the nonequilibrium peracid salt composition.

192. The method or use of any one of paragraph 189-191, comprising contacting the substrate with the nonequilibrium adjusted composition at least 10 minutes after preparation of the nonequilibrium peracid salt composition.

193. The method or use of any one of paragraphs 189-192, comprising applying the nonequilibrium adjusted composition to the substrate for the contacting not sooner than 20 minutes after preparation of the nonequilibrium peracid salt composition.

Acidifying

194. The method or use of any one of paragraphs 189-193, wherein the preparing the nonequilibrium adjusted composition comprises acidifying the nonequilibrium peracid salt composition, the acidifying comprising:

adding an acidulant to reduce the pH of the nonequilibrium peracid salt composition prior to the contacting, and optionally to prepare the nonequilibrium composition as an acidified nonequilibrium peracid composition.

194.1. The method of paragraph 194, wherein the acidulant comprises an inorganic acid, optionally a mineral acid.

194.2. The method of either one of paragraph 194 or paragraph 194.1, wherein the acidulant is substantially in the absence of an organic acid.

194.3. The method of any one of paragraphs 194-194.2, wherein the acidifying comprises reducing the pH of the nonequilibrium peracid salt composition to prepare the nonequilibrium adjusted composition at a pH of not larger than pH 9.0.

194.4. The method of paragraph 194.3, wherein the pH of the nonequilibrium adjusted composition is not larger than pH 8.0.

194.4.1. The method of paragraph 194.3, wherein the pH of the nonequilibrium adjusted composition is not larger than pH 7.0.

194.5. The method of paragraph 194.3, wherein the pH of the nonequilibrium adjusted composition is not larger than pH 6.0.

194.6. The method of paragraph 194.3, wherein the pH of the nonequilibrium adjusted composition is not larger than pH 5.5.

194.7. The method of paragraph 194.3, wherein the pH of the nonequilibrium adjusted composition is not larger than pH 5.0.

194.8. The method of any one of paragraphs 194.3-194.7, wherein the pH of the nonequilibrium adjusted composition is not smaller than pH 2.0.

194.9. The method of any one of paragraphs 194.3-194.8, wherein the pH of the nonequilibrium adjusted composition is not smaller than pH 3.0.

194.10. The method of any one of paragraphs 194.3-194.9, wherein the pH of the nonequilibrium adjusted composition is not smaller than pH 4.0.

Miscellaneous

195. The method or use of any one of paragraphs 174-194.2 and 194.3-194.10, comprising generating singlet oxygen in the presence of the substrate as a consequence of contacting the substrate with the nonequilibrium treatment composition.

196. The method or use of any one of paragraphs 174-195, wherein the use or method does not include (is in the absence of) treatment of a human or animal body by surgery or therapy and does not include (is in the absence of) a diagnostic method practiced on a human or animal body.

197. The method or use of any one of paragraphs 174-196, wherein the substrate is not part of a human or animal body.

Compositions

203. An aqueous, nonequilibrium peracid salt composition for generation of singlet oxygen for use in oxidative treatments, the composition comprising:

dissolved peracid anion of an alkali metal salt of a peracid at a concentration in a range of from 1.0% (weight/volume) to 8.0% (weight/volume);

pH in a range of from pH 12.0 to pH 13.5;

a concentration of dissolved hydrogen peroxide of no more than 1400 mg/L;

a 10-minute stability index ($SI_{10}$) at a temperature of 22° C. of at least 0.80, wherein the 10-minute stability index is calculated according to Equation I:

$$SI_{10} = CA_{10}/CA_0 \qquad \text{Equation I}$$

wherein:

$SI_{10}$ is the 10-minute stability index;

$CA_0$ is the concentration (% weight/volume) of the peracid anion determined for a first time; and $CA_{10}$ is a concentration (% weight/volume) of the peracid anion determined for a second time corresponding to 10 minutes following the first time.

204. The composition of paragraph 203, wherein the pH is at least 12.1.

205. The composition of paragraph 203, wherein the pH is at least 12.2.

206. The composition of paragraph 203, wherein the pH is at least 12.3.

207. The composition of paragraph 203, wherein the pH is at least 12.4.

208. The composition of paragraph 203, wherein the pH is at least 12.5.

208.1 The composition of paragraph 203, wherein the pH is at least 12.6.

208.2 The composition of paragraph 203, wherein the pH is at least 12.7.

209. The composition of any one of paragraphs 203-208.2, wherein the pH is no larger than 13.3.

210. The composition of any one of paragraphs 203-208.2, wherein the pH is no larger than 13.2.

211. The composition of any one of paragraphs 203-208.2, wherein the pH is no larger than 13.1.

212. The composition of any one of paragraphs 203-208.2, wherein the pH is no larger than 13.0.

213. The composition of any one of paragraphs 203-208.2, wherein the pH is no larger than 12.9.

214. The composition of any one of paragraphs 203-213, comprising a concentration of dissolved hydrogen peroxide of no larger than 1200 mg/L.

215. The composition of any one of paragraphs 203-213, comprising a concentration of dissolved hydrogen peroxide of no larger than 1000 mg/L.

216. The composition of any one of paragraphs 203-213, comprising a concentration of dissolved hydrogen peroxide of no larger than 800 mg/L.

217. The composition of any one of paragraphs 203-213, comprising a concentration of dissolved hydrogen peroxide of no larger than 600 mg/L.

218. The composition of any one of paragraphs 203-217, comprising a molar ratio of dissolved hydrogen peroxide to the peracid anion of no larger than ⅙.

219. The composition of any one of paragraphs 203-217, comprising a molar ratio of dissolved hydrogen peroxide to the peracid anion of no larger than 1/10.

220. The composition of any one of paragraphs 203-217, comprising a molar ratio dissolved hydrogen peroxide to the peracid anion of no larger than $\frac{1}{16}$.

221. The composition of any one of paragraphs 203-217, comprising a molar ratio of dissolved hydrogen peroxide to the peracid anion of no larger than $\frac{1}{20}$.

222. The composition of any one of paragraphs 203-217, comprising a molar ratio of dissolved hydrogen peroxide to the peracid anion of no larger than $\frac{1}{25}$.

223. The composition of any one of paragraphs 203-222, wherein the 10-minute stability index is at least 0.83.

224. The composition of any one of paragraphs 203-222, wherein the 10-minute stability index is at least 0.85.

225. The composition of any one of paragraphs 203-222, wherein the 10-minute stability index is at least 0.88.

226. The composition of any one of paragraphs 203-222, wherein the 10-minute stability index is at least 0.90.

227. The composition of any one of paragraphs 203-222, wherein the 10-minute stability index is at least 0.92.

228. The composition of any one of paragraphs 203-222, wherein the 10-minute stability index is at least 0.94.

229. The composition of any one of paragraphs 203-228, wherein the 10-minute stability index is no larger than 1.00.

230. The composition of any one of paragraphs 203-228, wherein the 10-minute stability index is no larger than 0.99.

231. The composition of any one of paragraphs 203-228, wherein the 10-minute stability index is no larger than 0.98.

232. The composition of any one of paragraphs 203-228, wherein the 10-minute stability index is no larger than 0.96.

233. The composition of any one of paragraphs 203-232, comprising a 30-minute stability index ($SI_{30}$) at a temperature of 22° C. of at least 0.65, wherein the 30-minute stability index is calculated according to Equation II:

$$SI_{30} = CA_{30}/CA_0 \qquad \text{Equation II}$$

wherein:

$SI_{30}$ is the 30-minute stability index;

$CA_0$ is the concentration (% weight/volume) of the peracid anion determined for a first time; and $CA_{30}$ is a concentration (% weight/volume) of the peracid anion determined for a third time corresponding to 30 minutes following the first time.

234. The composition of paragraph 233, wherein the 30-minute stability index is at least 0.70.

235. The composition of paragraph 233, wherein the 30-minute stability index is at least 0.73.

236. The composition of paragraph 233, wherein the 30-minute stability index is at least 0.76.

237. The composition of paragraph 233, wherein the 30-minute stability index is at least 0.78.

238. The composition of paragraph 233, wherein the 30-minute stability index is at least 0.80.

239. The composition of paragraph 233, wherein the 30-minute stability index is at least 0.82.

240. The composition of any one of paragraphs 233-239, wherein the 30-minute stability index is no larger than 0.95.

241. The composition of any one of paragraphs 233-239, wherein the 30-minute stability index is no larger than 0.92.

242. The composition of any one of paragraphs 233-239, wherein the 30-minute stability index is no larger than 0.90.

243. The composition of any one of paragraphs 233-239, wherein the 30-minute stability index is no larger than 0.88.

244. The composition of any one of paragraphs 233-239, wherein the 30-minute stability index is no larger than 0.85.

245. The composition of any one of paragraphs 233-244, wherein the 30-minute stability index is smaller than the 10-minute stability index.

246. The composition of paragraph 245, wherein the 30-minute stability index is smaller than the 10-minute stability index by at least 0.05.

247. The composition of paragraph 245, wherein the 30-minute stability index is smaller than the 10-minute stability index by at least 0.10.

248. The composition of any one of paragraphs 245-247, wherein the 30-minute stability index is smaller than the 10-minute stability index by an amount no larger than 0.20.

249. The composition of any one of paragraphs 245-247, wherein the 30-minute stability index is smaller than the 10-minute stability index by an amount no larger than 0.15.

250. The composition of any one of paragraphs 203-249, comprising a weight ratio of total organic carbon to the peracid anion of no larger than 0.60.

251. The composition of any one of paragraphs 203-249, comprising a weight ratio of total organic carbon to the peracid anion of no larger than 0.59.

252. The composition of any one of paragraphs 203-249, comprising a weight ratio of total organic carbon to the peracid anion of no larger than 0.58.

253. The composition of any one of paragraphs 203-249, comprising a weight ratio of total organic carbon to the peracid anion of no larger than 0.57.

254. The composition of any one of paragraphs 203-249, comprising a weight ratio of total organic carbon to the peracid anion of no larger than 0.55.

255. The composition of any one of paragraphs 203-249, comprising a weight ratio of total organic carbon to the peracid anion of no larger than 0.53

256. The composition of any one of paragraphs 203-255, comprising a weight ratio of total organic carbon to the peracid anion of at least 0.48.

257. The composition of any one of paragraphs 203-255, comprising a weight ratio of total organic carbon to the peracid anion of at least 0.50.

258. The composition of any one of paragraphs 203-255, comprising a weight ratio of total organic carbon to the peracid anion of at least 0.52.

259. The composition of any one of paragraphs 203-254, comprising a weight ratio of total organic carbon to the peracid anion of at least 0.54.

260. The composition of any one of paragraphs 203-259, comprising a molar ratio of the peracid anion to the peracid of at least 10,000.

261. The composition of any one of paragraphs 203-259, comprising a molar ratio of the peracid anion to the peracid of at least 15,000.

262. The composition of any one of paragraphs 203-259, comprising a molar ratio of the peracid anion to the peracid of at least 18,000.

263. The composition of any one of paragraphs 203-262, comprising a molar ratio of the peracid anion to the peracid of no larger than 40,000.

264. The composition of any one of paragraphs 203-262, comprising a molar ratio of the peracid anion to the peracid of no larger than 38,000.

265. The composition of any one of paragraphs 203-264, wherein the nonequilibrium peracid salt composition is a nonequilibrium peracetic acid salt composition and the peracid anion is peracetate.

266. The composition of any one of paragraphs 203-265, comprising the peracid anion at a concentration of at least 1.5% (weight/volume).

267. The composition of any one of paragraphs 203-265, comprising the peracid anion at a concentration of at least 2.0% (weight/volume).

268. The composition of any one of paragraphs 203-265, comprising the peracid anion at a concentration of at least 2.5% (weight/volume).

269. The composition of any one of paragraphs 203-265, comprising the peracid anion at a concentration of at least 3.0% (weight/volume).

270. The composition of any one of paragraphs 203-265, comprising the peracid anion at a concentration of at least 3.5% (weight/volume).

271. The composition of any one of paragraphs 203-265, comprising the peracid anion at a concentration of at least 4.0% (weight/volume).

272. The composition of any one of paragraphs 203-265, comprising the peracid anion at a concentration of at least 4.5% (weight/volume).

273. The composition of any one of paragraphs 203-265, comprising the peracid anion at a concentration of at least 5.0% (weight/volume).

274. The composition of any one of paragraphs 203-265, comprising the peracid anion at a concentration of at least 5.5% (weight/volume).

275. The composition of any one of paragraphs 203-265, comprising the peracid anion at a concentration of at least 6.0% (weight/volume).

276. The composition of any one of paragraphs 203-265, comprising the peracid anion at a concentration of at least 6.5% (weight/volume).

277. The composition of any one of paragraphs 203-265, comprising the peracid anion at a concentration of at least 7.0% (weight/volume).

278. The composition of any one of paragraphs 203-277, comprising the peracid anion at a concentration of no larger than 8.0% (weight/volume).

279. The composition of any one of paragraphs 203-277, comprising the peracid anion at a concentration of no larger than 7.5% (weight/volume).

280. The composition of any one of paragraphs 203-277, comprising the peracid anion at a concentration of no larger than 7.0% (weight/volume).

281. The composition of any one of paragraphs 203-276, comprising the peracid anion at a concentration of no larger than 6.5% (weight/volume).

282. The composition of any one of paragraphs 203-275, comprising the peracid anion at a concentration of no larger than 6.0% (weight/volume).

283. The composition of any one of paragraphs 203-274, comprising the peracid anion at a concentration of no larger than 5.5% (weight/volume).

284. The composition of any one of paragraphs 203-273, comprising the peracid anion at a concentration of no larger than 5.0% (weight/volume).

285. The composition of any one of paragraphs 203-272, comprising the peracid anion at a concentration of no larger than 4.5% (weight/volume).

286. The composition of any one of paragraphs 203-271, comprising the peracid anion at a concentration of no larger than 4.0% (weight/volume).

287. The composition of any one of paragraphs 203-270, comprising the peracid anion at a concentration of no larger than 3.5% (weight/volume).

288. The composition of any one of paragraphs 203-269, comprising the peracid anion at a concentration of no larger than 3.0% (weight/volume).

289. The composition of any one of paragraphs 203-268, comprising the peracid anion at a concentration of no larger than 2.5% (weight/volume).

290. The composition of any one of paragraphs 203-267, comprising the peracid anion at a concentration of no larger than 2.0% (weight/volume).

291. The composition of any one of paragraphs 203-265, 269-274 and 282-288, comprising:

the peracid anion at a concentration in a range of from 3.0% (weight/volume) to 6.0% (weight/volume);

the 10-minute stability index ($SI_{10}$) being at least 0.85;

the concentration of dissolved hydrogen peroxide being no larger than 1200 mg/L; and the pH being at least 12.1.

292. The composition of paragraph 291, comprising a pH of at least 12.3.

293. The composition of either one of paragraph 291 or paragraph 292, comprising a weight ratio of total organic carbon to the peracid anion of no larger than 0.58.

294. The composition of any one of paragraphs 291-293, wherein the pH is at least 12.4.

295. The composition of any one of paragraphs 203-269 and 288-290, comprising:

the peracid anion at a concentration in a range of from 1.5% (weight/volume) to 3.0% (weight/volume);

the 10-minute stability index ($SI_{10}$) being at least 0.90;

the concentration of dissolved hydrogen peroxide being no larger than 1200 mg/L; and the pH being at least 12.3.

296. The composition of any one of paragraphs 203-281, comprising:

the peracid anion at a concentration in a range of from 6.5% (weight/volume) to 8.0% (weight/volume);

the 10-minute stability index ($SI_{10}$) being at least 0.88;

the concentration of dissolved hydrogen peroxide being no larger than 1200 mg/L; and the pH being at least 12.2.

297. The composition of any one of paragraphs 203-296, comprising any of the composition properties recited in any of paragraphs 1-197.

Other Methods of Treatment

601. A method of oxidative treating of a substrate in food processing, the method comprising:

contacting the substrate with a nonequilibrium peracid salt composition, the contacting comprising adding the peracid salt composition to the substrate; and after the adding, mixing a mixture with the substrate with the nonequilibrium peracid salt composition for generating singlet oxygen in the mixture; the singlet oxygen providing oxidative treatment to the substrate; wherein the nonequilibrium peracid salt composition as added to the substrate comprises:

a pH in a range of from pH 12.0 to pH 13.5;

a concentration of dissolved hydrogen peroxide of no more than 1400; and a 10-minute stability index ($SI_{10}$) at a temperature of 22° C. of at least 0.80.

602. The method of paragraph 601, wherein the substrate comprises an aqueous liquid at a pH at least two pH units smaller than the pH of the nonequilibrium peracid salt composition immediately prior to the contacting.

603. The method of either one of paragraph 601 or paragraph 602, wherein the pH of the nonequilibrium peracid salt composition is in a range of from 12.5 to 13.2.

604. The method of paragraph 601, wherein nonequilibrium peracid salt composition comprises dissolved peracid anion of the peracid salt at a concentration in a range of from 1.0% (weight/volume) to 8.0% (weight/volume).

605. The method of any one of paragraphs 601-604, wherein the composition properties comprise a molar ratio of dissolved hydrogen peroxide to the peracid anion of no larger than $\frac{1}{10}$.

606. The method of paragraph 604, wherein the composition properties comprise a 10-minute stability index ($SI_{10}$) at a temperature of 22° C. of at least 0.80, wherein the 10-minute stability index is calculated according to Equation I:

$$SI_{10} = CA_{10}/CA_0 \qquad \text{Equation I}$$

wherein:

$SI_{10}$ is the 10-minute stability index;

$CA_0$ is the concentration (% weight/volume) of the peracid anion determined for a first time; and $CA_{10}$ is a concentration (% weight/volume) of the peracid anion determined for a second time corresponding to 10 minutes following the first time.

607. The method of paragraph 606, wherein the 10-minute stability index is at least 0.90.

608. The method of paragraph 606, wherein the composition properties comprise a 30-minute stability index ($SI_{30}$) at a temperature of 22° C. of at least 0.65, wherein the 30-minute stability index is calculated according to Equation II:

$$SI_{30} = CA_{30}/CA_0 \qquad \text{Equation II}$$

wherein:

$SI_{30}$ is the 30-minute stability index;

$CA_0$ is the concentration (% weight/volume) of the peracid anion determined for a first time; and $CA_{30}$ is a concentration (% weight/volume) of the peracid anion determined for a third time corresponding to 30 minutes following the first time.

609. The method of paragraph 608, wherein the 30-minute stability index is at least 0.80.

610. The method of paragraph 601, wherein the substrate further comprises solid object surfaces, particulates and liquids amenable to contact with the improved formulation for cleaning and sanitization during food processing.

611. The method of paragraph 601, wherein the composition properties comprise a molar ratio of the peracid anion to the peracid in a range of from 10,000 to 40,000.

612. The method of paragraphs 601, wherein the composition properties comprise a weight ratio of total organic carbon to the peracid anion of no larger than 0.58.

613. The method of any one of paragraphs 601-612, further comprising a combination of reaction feedstocks having a first molar ratio of the alkali metal hydroxide to the acyl donor groups in a range of from 1.00 to 1.40; and a second molar ratio of hydrogen peroxide to the acyl donor groups in a range of from 0.80 to 1.00.

614. The method of any one of paragraphs 601-613, wherein the composition properties comprise a molar ratio of the peracid anion to the peracid in a range of from 10,000 to 40,000.

615. The method of paragraph 601, wherein during the contacting the substrate has a temperature from between about 2° C. to about 95° C.

616. The method of paragraph 601, wherein the temperature accelerates the generation of reactive oxygen species from the parent oxidant solution in the mixture.

617. The method of any one of paragraphs 601-616, wherein the nonequilibrium peracid salt composition is a nonequilibrium peracetic acid salt composition and the peracid anion is peracetate.

618. The method of paragraph 601, further comprising extracting solids from the substrate through action of the nonequilibrium peracetic acid salt composition.

619. The method of paragraph 601, further comprising, after the contacting, sanitizing the substrate.

620. The method of paragraph 601, wherein the processing results in lower COD, BOD 621. The method of paragraph 601, wherein the processing results in microbial control reducing bacterial growth.

622. The method of paragraph 601, sanitizing the substrate in a sanitization stage.

623. The method of paragraph 622, wherein the contacting occurs before the sanitization stage.

624. The method of paragraph 601, wherein the nonequilibrium peracid salt composition is acidified to a pH between 2 to 8.

625. A method for preparing a nonequilibrium peracid salt composition in relatively stable form for short-term storage and handling prior to use to generate singlet oxygen during oxidative treatments in food processing including cleaning and sanitization, the method comprising:

reacting components in an aqueous reaction mixture prepared from a combination of chemical feedstocks to form an aqueous nonequilibrium peracid salt composition, the chemical feedstocks comprising acyl donor with acyl donor groups, hydrogen peroxide and alkali metal hydroxide in amounts and proportions, including to account for yield losses, to prepare the nonequilibrium peracid salt composition with composition properties comprising:

dissolved peracid anion of the peracid salt at a concentration in a range of from 1.0% (weight/volume) to 8.0% (weight/volume); and pH in a range of from pH 12.0 to pH 13.5; and wherein the combination of reaction feedstocks comprises:

a first molar ratio of the alkali metal hydroxide to the acyl donor groups in a range of from 0.95 to 1.40; and a second molar ratio of hydrogen peroxide to the acyl donor groups in a range of from 0.80 to 1.10; and continuing the reacting at least until the nonequilibrium peracid salt composition is prepared including the composition properties.

The foregoing description of the present invention and various aspects thereof has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the a-ppended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrated processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. A method of oxidative treatment of a food processing substrate, comprising:
preparing a nonequilibrium peracetic acid salt composition; and
contacting a food processing substrate with an aqueous nonequilibrium treatment composition, wherein the nonequilibrium treatment composition comprises:
the nonequilibrium peracetic acid salt composition without an additive to adjust composition properties prior to the contacting; or
a nonequilibrium adjusted composition prepared by combining one or more additives with the nonequilibrium peracetic acid salt composition prior to the contacting; and
wherein the preparing the nonequilibrium peracetic acid salt composition comprises:
reacting components in an aqueous reaction mixture prepared from a combination of chemical feedstocks to form the nonequilibrium peracetic acid salt composition, the chemical feedstocks comprising acetyl donor with acetyl donor groups, hydrogen peroxide and alkali metal hydroxide in amounts and proportions, including to account for yield losses, to prepare the nonequilibrium peracetic acid salt composition with composition properties comprising:

dissolved peracetate anion at a concentration in a range of from 1.0% (weight/volume) to 8.0% (weight/volume); and
pH in a range of from pH 12.0 to pH 13.5; and
wherein the combination of chemical feedstocks comprises:
a first molar ratio of the alkali metal hydroxide to the acetyl donor groups in a range of from 0.95 to 1.40; and
a second molar ratio of hydrogen peroxide to the acetyl donor groups in a range of from 0.80 to 1.10; and
continuing the reacting at least until the nonequilibrium peracetic acid salt composition is prepared including the composition properties.

2. The method of claim 1, wherein the nonequilibrium treatment composition comprises the nonequilibrium adjusted composition having, immediately prior to the contacting, a combined concentration of peracetate and peracetic acid, determined as an equivalent concentration of peracetic acid, at a concentration in a range of from 1 part per million to 8000 parts per million on a weight basis.

3. The method of claim 2, wherein the food processing substrate comprises a food product.

4. The method of claim 2, wherein the food processing substrate comprises a vegetable.

5. The method of claim 2, wherein the food processing substrate comprises beans, beets, carrots, corn, cucumber, onion, pepper, artichoke, cabbage, celery, kale, lettuce, broccoli, asparagus, peas, radishes, rice, spinach, cauliflower, eggplant, mushrooms, truffles, or turnips, or combinations thereof.

6. The method of claim 2, wherein the food processing substrate comprises potato.

7. The method of claim 2, wherein the food processing substrate comprises a fruit.

8. The method of claim 2, wherein the food processing substrate comprises pome, apple, berries, cherries, citrus, peach, plum, olive, banana, dates, melon, persimmon, papaya, pineapple, or tomato, or combinations thereof.

9. The method of claim 2, wherein the food processing substrate comprises a meat.

10. The method of claim 2, wherein the food processing substrate comprises beef, lamb, veal, turkey, ham, pork, chicken, fish, or seafood, or egg.

11. The method of claim 2, wherein the food processing substrate comprises poultry meat.

12. The method of claim 11, wherein the nonequilibrium adjusted composition has, immediately prior to the contacting, a combined concentration of peracetate and peracetic acid, determined as an equivalent concentration of peracetic acid, at a concentration in a range of from 2 parts per million to 4500 parts per million on a weight basis.

13. The method of claim 11, wherein the food processing substrate comprises a poultry carcass or a portion thereof comprising the poultry meat.

14. The method of claim 11, wherein during the contacting the nonequilibrium adjusted composition is at a temperature of no more than 4° C.

15. The method of claim 3, wherein the contacting comprises disposing the food product in the nonequilibrium adjusted composition in a tank.

16. The method of claim 15, comprising adding the nonequilibrium peracetic acid salt composition to the tank.

17. The method of claim 15, wherein the pH of the nonequilibrium adjusted composition in the tank is at least pH 8.0.

18. The method of claim 3, wherein the contacting comprises spraying the nonequilibrium adjusted composition onto the food product.

19. The method of claim 3, wherein the contacting comprises washing or rinsing the food product with the nonequilibrium adjusted composition.

20. The method of claim 3, wherein the contacting comprises sanitizing the food product.

21. The method of claim 1, wherein the food processing substrate comprises a food contact surface.

22. The method of claim 21, wherein the food contact surface comprises a surface of food processing or preparation equipment not in use to process a food product.

23. The method of claim 22, wherein the surface of the food processing or preparation equipment comprises an interior surface of a food processing vessel; a food conveyance surface; a food cutting surface; a food cutting blade surface; a food blender surface; a food mincer surface; a food grinder surface; a food masher surface; a food cooking surface; a food preparation utensil surface; or combinations thereof.

24. The method of claim 22, wherein the contacting comprises clean-in-place treatment of the surface of the food processing or preparation equipment.

25. The method of claim 22, wherein immediately prior to the contacting, the nonequilibrium treatment composition has a pH of at least pH 9.0.

26. The method of claim 22, wherein immediately prior to the contacting the nonequilibrium treatment composition has a pH in a range from pH 2.0 to pH 9.0.

27. The method of claim 1, wherein the food processing substrate comprises a food process liquid to be treated, the food process liquid comprising food soil contaminants.

28. The method of claim 27, wherein the food process liquid comprises effluent liquid from contacting a food product during food processing, effluent liquid from cleaning of food preparation or processing equipment, effluent liquid from sanitization of food preparation or processing equipment, effluent liquid from cleaning of food preparation utensils, effluent liquid from sanitization of food preparation utensils, or combinations thereof.

29. The method of claim 1, wherein:

the composition properties comprise the dissolved peracetate anion at a concentration in a range of from 3.0% (weight/volume) to 6.5% (weight/volume);

the first molar ratio is in a range of from 1.02 to 1.20; and the second molar ratio is in a range of from 0.87 to 0.97.

30. The method of claim 29, wherein the composition properties comprise a concentration of dissolved hydrogen peroxide of no larger than 1200 mg/L.

* * * * *